US007183989B2

(12) United States Patent
Tietjen

(10) Patent No.: US 7,183,989 B2
(45) Date of Patent: Feb. 27, 2007

(54) TRANSPORTABLE ROLLING RADAR PLATFORM AND SYSTEM

(75) Inventor: Byron W. Tietjen, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/197,016

(22) Filed: Aug. 4, 2005

(65) Prior Publication Data
US 2006/0139224 A1 Jun. 29, 2006

Related U.S. Application Data

(63) Continuation-in-part of application No. 11/074,495, filed on Mar. 8, 2005, now Pat. No. 7,129,901, which is a continuation-in-part of application No. 10/334,434, filed on Dec. 31, 2002, now Pat. No. 6,882,321, which is a continuation-in-part of application No. 10/119,576, filed on Apr. 10, 2002, now Pat. No. 6,812,904.

(51) Int. Cl.
H01Q 3/00 (2006.01)
H01Q 3/02 (2006.01)

(52) U.S. Cl. .................... 343/757; 343/766; 343/882

(58) Field of Classification Search ............... 343/757, 343/758, 761, 766, 882
See application file for complete search history.

(56) References Cited

U.S. PATENT DOCUMENTS 4,044,396 A  8/1977  Haws et al. ............... 361/385
4,312,002 A * 1/1982  Stewart ..................... 343/725
4,975,811 A  12/1990 Fraser et al. ................ 362/96
5,025,262 A  6/1991  Abdelrazik et al. ........ 343/705
5,049,891 A  9/1991  Ettinger et al. ............ 343/705
5,357,259 A  10/1994 Nosal ......................... 342/398
5,398,035 A  3/1995  Densmore et al. ......... 343/713
5,422,477 A  6/1995  de La Chapelle et al. ................ 250/227.12

(Continued)

FOREIGN PATENT DOCUMENTS

EP          0286069        10/1988

(Continued)

OTHER PUBLICATIONS

"Mechanically-Steered, Mobile Satellite-Tracking Antenna", NTIS Tech Notes, US Department of Commerce. Springfield, VA, US, May 1, 1990, pp. 394, 1-2, XP000137363, ISN: 0889-8464.

(Continued)

Primary Examiner—Shih-Chao Chen
(74) Attorney, Agent, or Firm—Plevy, Howard & Darcy, PC

(57) ABSTRACT

A transportable platform for a rolling radar array system has a base whereupon a track for an array wheel is provided. A segment of the track can be folded for transportation and deployed when the rolling radar array system is to be in an operational mode. The transportable platform has several adjustable supports for stabilizing and leveling the foldable segment of the track upon which the array wheel revolves as well as the base. The transportable platform may include a hitching element and a pair of wheels for towing and transportation.

25 Claims, 56 Drawing Sheets

U.S. PATENT DOCUMENTS

| | | |
|---|---|---|
| 5,569,912 A | 10/1996 | Turk et al. ............. 250/231.14 |
| 5,653,476 A | 8/1997 | Su et al. ................. 285/272.1 |
| 5,746,574 A | 5/1998 | Czachor et al. ............. 415/115 |
| 5,760,826 A | 6/1998 | Nayar ......................... 348/36 |
| 5,825,457 A | 10/1998 | Luce et al. ................. 351/221 |
| 5,842,767 A | 12/1998 | Rizkin et al. ................. 362/32 |
| 6,111,542 A | 8/2000 | Day et al. ................... 342/359 |
| 6,188,300 B1 | 2/2001 | Rodeffer ..................... 333/261 |
| 6,188,367 B1 | 2/2001 | Morrison et al. ........... 343/765 |
| 6,218,999 B1 | 4/2001 | Bousquet et al. ........... 343/765 |
| 6,404,385 B1 | 6/2002 | Croq et al. ................. 342/359 |
| 6,407,714 B1 | 6/2002 | Butler et al. ................ 343/766 |
| 6,446,755 B1 | 9/2002 | Varailhon et al. .......... 184/6.12 |
| 6,449,103 B1 | 9/2002 | Charles ...................... 359/725 |
| 6,486,845 B2 | 11/2002 | Ogawa et al. .............. 343/765 |
| 6,512,490 B1 | 1/2003 | Lee ............................ 343/882 |
| 6,572,609 B1 | 6/2003 | Farr et al. ..................... 606/15 |
| 6,646,616 B2 * | 11/2003 | Tietjen ....................... 343/757 |
| 6,753,822 B2 * | 6/2004 | Tietjen ....................... 343/757 |
| 6,812,904 B2 * | 11/2004 | Tietjen ....................... 343/757 |
| 6,850,201 B2 | 2/2005 | Tietjen ....................... 343/757 |
| 6,882,321 B2 * | 4/2005 | Tietjen ....................... 343/757 |
| 6,912,341 B2 * | 6/2005 | Tietjen ......................... 385/26 |
| 2001/0046258 A1 | 11/2001 | Wise et al. .................. 375/219 |

FOREIGN PATENT DOCUMENTS

| | | |
|---|---|---|
| FR | 1323892 | 4/1963 |
| GB | 1576914 | 10/1980 |
| GB | 2266996 | 11/1993 |

OTHER PUBLICATIONS

Cauchois et al., "Absolute Locallization with the Calibrated SYCLOP Sensor", pp. 1-14.

European Search Report dated Aug. 4, 2003 for related European Patent Application No. EP 03252428.

European Search Report dated Apr. 29, 2004 for related European Patent Application No. EP 03252280.

* cited by examiner

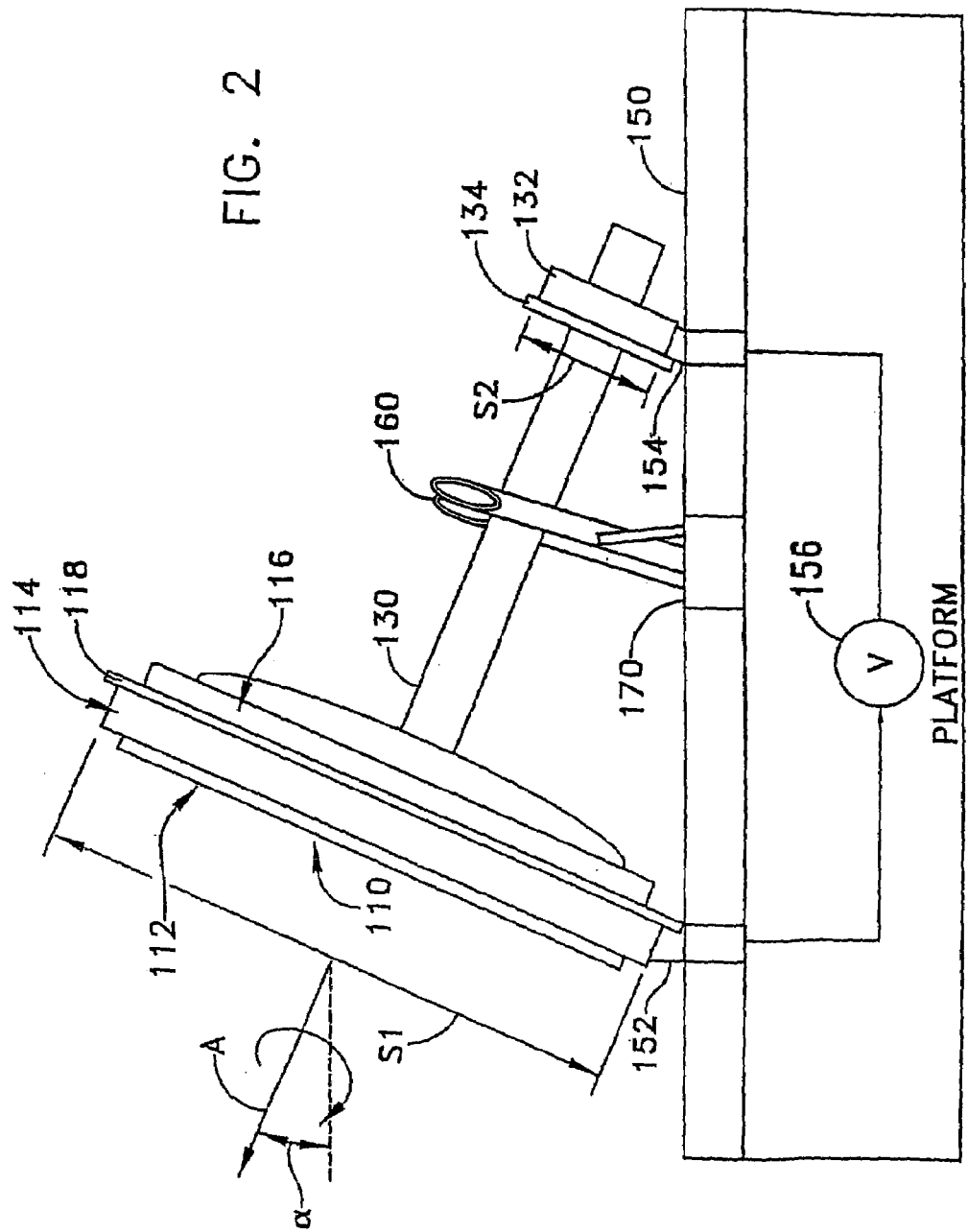

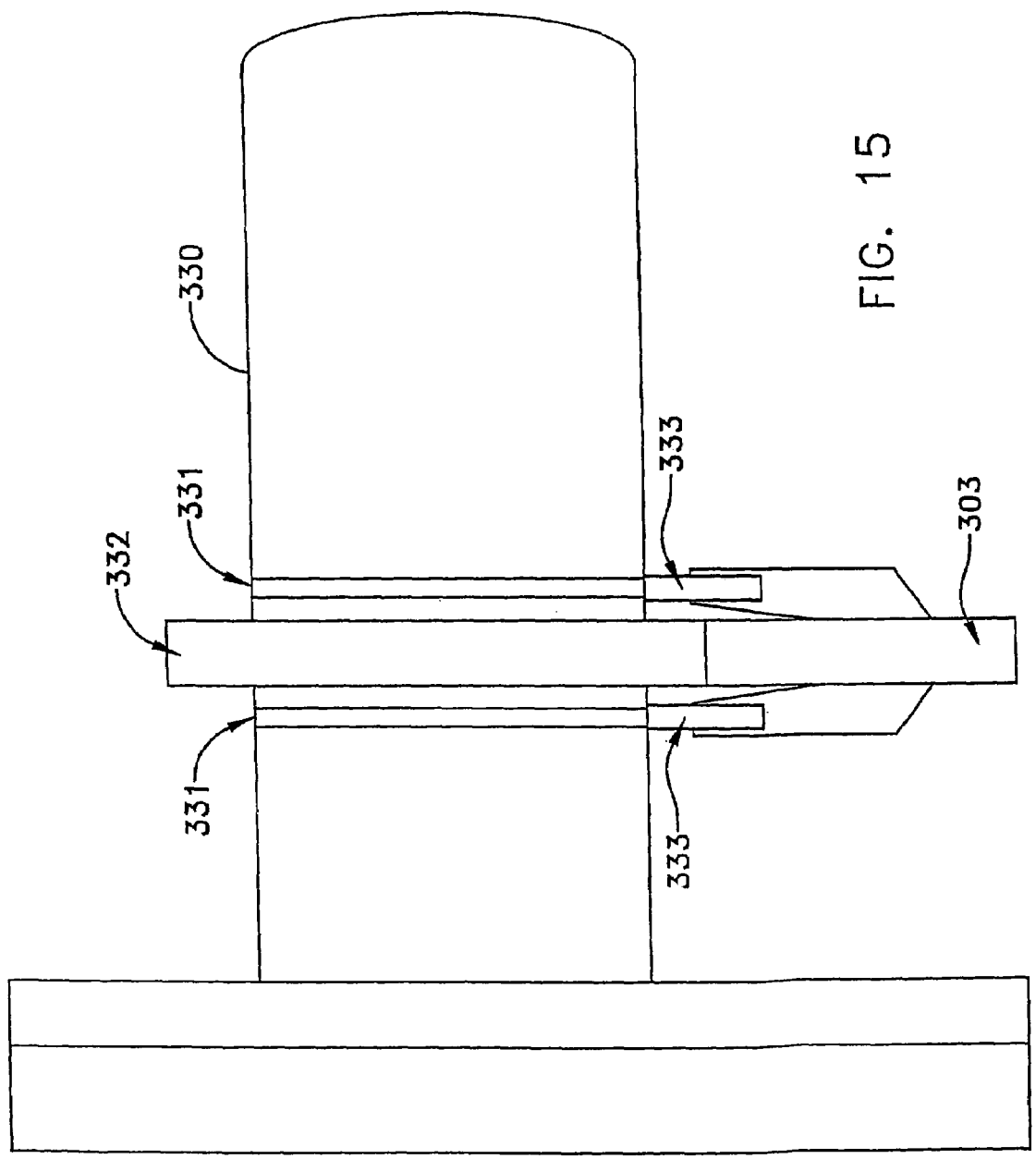

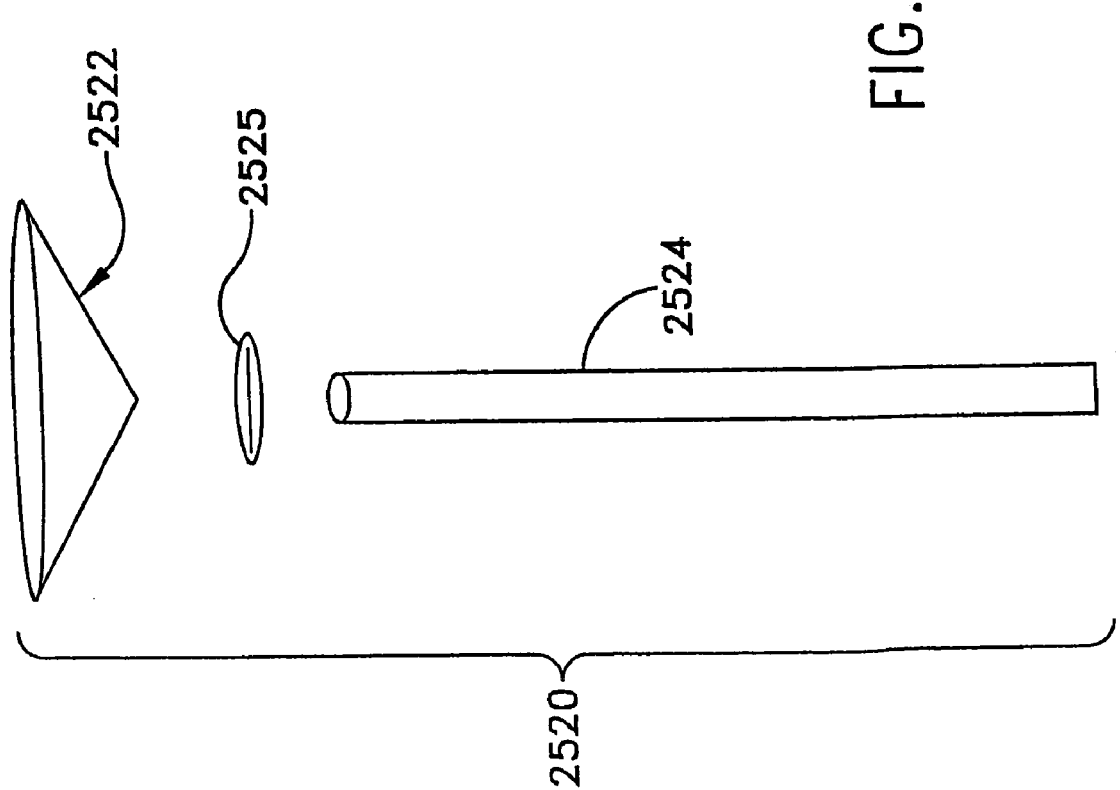

TRANSPORTABLE ROLLING RADAR PLATFORM AND SYSTEM

RELATED APPLICATIONS

The present application is a continuation in part of U.S.patent application Ser. No. 11/074,495 filed on Mar. 8, 2005, issued as U.S. Pat. No. 7,134,901 which is a continuation in part of U.S. patent application Ser. No. 10/334,434, file on Dec. 31, 2002, issued as U.S. Pat. No. 6,882,321, on Apr. 19, 2005, which is a continuation in part of U.S. patent application Ser. No. 10/119,576, filed on Apr. 10, 2002, issued as U.S. Pat. No. 6,812,904, on Nov. 2, 2004, the subject matter of each of the foregoing applications incorporated herein by reference in their entireties.

FIELD OF THE INVENTION

The present invention relates generally to radar array systems, and more particularly to a transportable platform for radar array systems.

BACKGROUND OF THE INVENTION

Arrays such as RF beam scanning arrays and the like are often implemented using large rotating array platforms that revolve the array in the azimuth direction. For example, the platform may rotate so as to slew the array by a predetermined azimuth angle, or to scan the entire range of azimuth angles available to the antenna at a constant angular rate. Traditional approaches to implementing rotating radar array platforms involve the use of a variety of mechanical or electromechanical parts including sliprings for providing array power, and large load-bearing bearings to support the rotating platform. However, these components are subject to significant stress, resulting in mechanical fatigue and ultimately component failure. This of course impacts on the reliability of the platform and overall, on the revolving radar antenna system.

Sliprings are a limiting feature in revolving antenna designs. Commercially available sliprings have limited current transmission capability. This limits the power that can be supplied to a conventional radar array. Future radar arrays may require 1000 amps or more, and may not be adequately supported using sliprings.

Fluid cooling presents another limitation on conventional arrays. Coolant has conventionally been transmitted to radar arrays using rotary fluid joints, which have a tendency to leak.

An apparatus and method for providing a reliable rotating array that is not subject to such component fatigue is highly desired.

There is also a need for a transportable platform upon which a rolling radar system can be transported and deployed at a selected location with a rapid set-up time.

SUMMARY OF THE INVENTION

One aspect of the invention is a transportable platform for use in a rolling radar array system. The transportable platform includes a base having a peripheral edge. A first circular track is mounted on the base. A second circular track, which is concentric with the first circular track, is also mounted on the base. The second circular track has at least one segment rigidly mounted on the base, while at least one more segment is foldably mounted on the base. The foldable segment can move between a folded position and a deployed position. When the foldable segment of the track is deployed, it extends beyond the peripheral edge of the base. In an exemplary embodiment, the foldable segment is hingedly connected with the base.

The transportable platform may include supports depending from the base and the foldable segment of the second circular track. The support has at least one longitudinal member and a flat load-bearing member attached to the longitudinal member. The longitudinal member has an adjustable height.

The transportable radar array platform includes a mechanism to fold and unfold the foldable segment of the track. In an exemplary embodiment, a hydraulic mechanism is used. Other such mechanisms are well-known in the art.

The transportable radar platform may also include a sighting system, such as a laser sighting system, to verify the positioning of the foldable segment of the second circular track, when it is deployed.

The transportable may further include an independently rotating Identify Friend-or-Foe (IFF) antenna.

Another aspect of the invention is a radar antenna system which is transportable. The radar antenna system has a radar array mounted on a wheel. The wheel has a circumferential portion shaped to engage a circular track for revolving the radar array about the track. The radar array has an axis normal to the radar array. The wheel rotates about the axis as the radar array revolves around the circular track during operation. The system includes a transportable platform which has a base having a peripheral edge. A second circular track is mounted on the base. The first circular track, which is concentric with the second circular track, is also mounted on the base. The first circular track has at least one segment rigidly mounted on the base, while at least one more segment is foldably mounted on the base. The foldable segment can move between a folded position and a deployed position. When the foldable segment of the first track is deployed, it extends beyond the peripheral edge of the base.

The radar antenna system may have supports depending from the base and the foldable segment of the first circular track. The support may have at least one longitudinal member and a flat load-bearing member attached to the longitudinal member. The longitudinal member may have an adjustable height.

The radar system may include an independently rotating IFF mounted on the base.

Yet another aspect of the invention is a method for providing a transportable rolling radar system. A base with a peripheral edge is provided. A circular track is laid on the base. A second circular track is laid on the base, such that the second circular track is concentric with the first circular track. A segment of the second circular track is rigidly mounted on the base, while a second segment is foldably mounted on the base. The foldable segment can move between a folded position and a deployed position. When the foldable segment of the track is deployed, it extends beyond the peripheral edge of the base. A radar array is mounted on a wheel, which has a circumferential portion shaped to engage the second circular track for revolving the radar array about the second circular track. The radar array has an axis normal to the radar array. The wheel rotates about the axis as the radar array revolves around the circular track during operation.

The method may include a step of providing a mechanism for folding and unfolding the foldable second segment of the second circular track. In an exemplary embodiment, a hydraulic mechanism is provided. Other such mechanisms are well-known in the art.

The method may further include a step of providing supports, depending from the base and the foldable second segment of the second circular track. The support has at least one longitudinal member and a flat load-bearing member attached to the longitudinal member. The longitudinal member may have an adjustable height.

The method may include a step of providing a sighting system for verifying location of the foldable second segment of the second circular track, when the foldable segment is unfolded and the wheel is rotating on the second circular track. For example, a laser sighting system may be provided.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which:

FIG. 2 is a side elevation view of the assembly shown in FIG. 1A.

FIG. 15 shows a detail of the drive mechanism of FIG. 14.

FIGS. 25A–25C show three methods to interface an optical fiber to a conical reflector.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical array radar systems. However, because such elements are well known in the art, and because they do not facilitate a better understanding of the present invention, a discussion of such elements is not provided herein. The disclosure herein is directed to all such variations and modifications known to those skilled in the art.

Figure 1A:
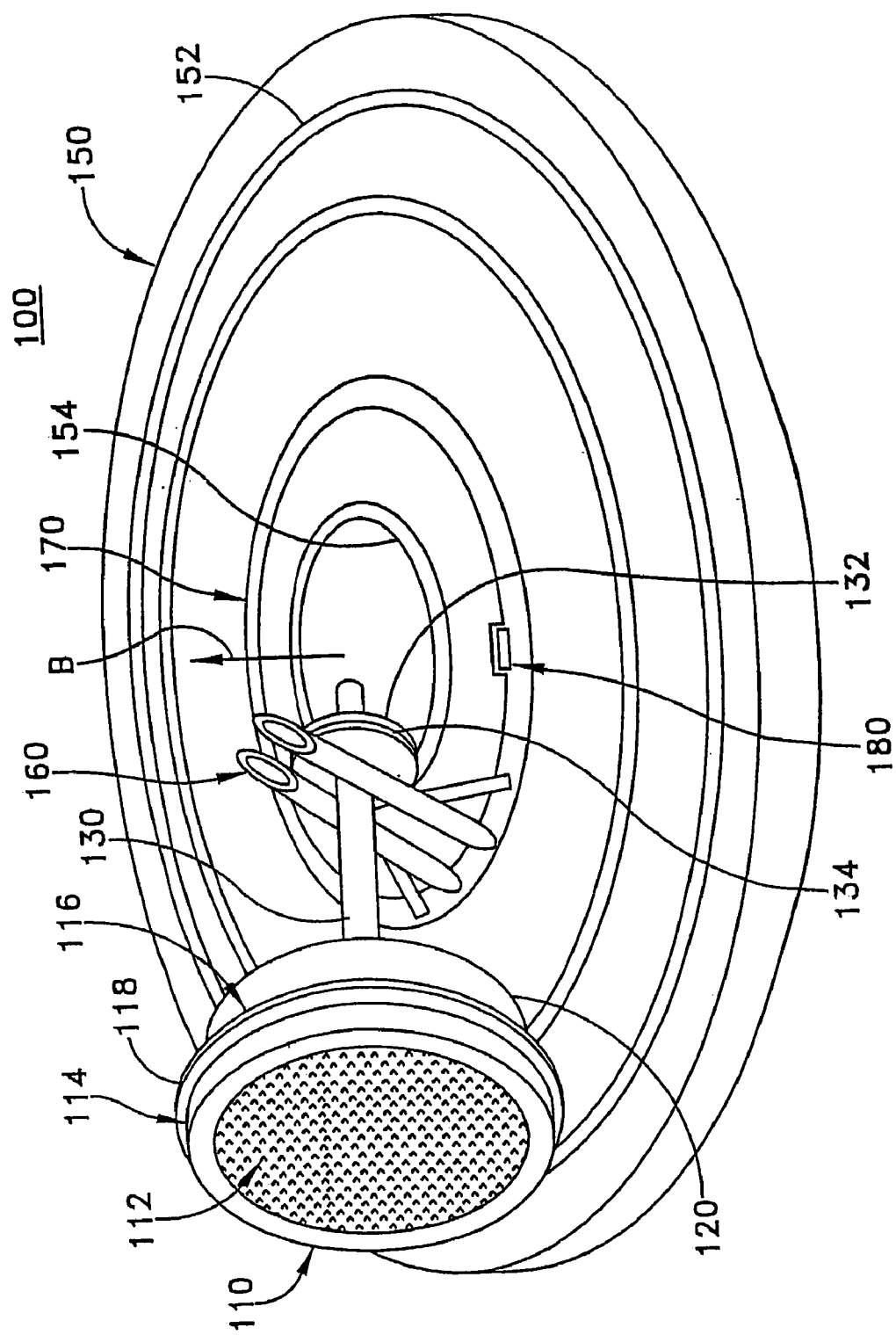
FIG. 1A is an isometric view of an exemplary radar system according to the present invention.
Figure 1B:
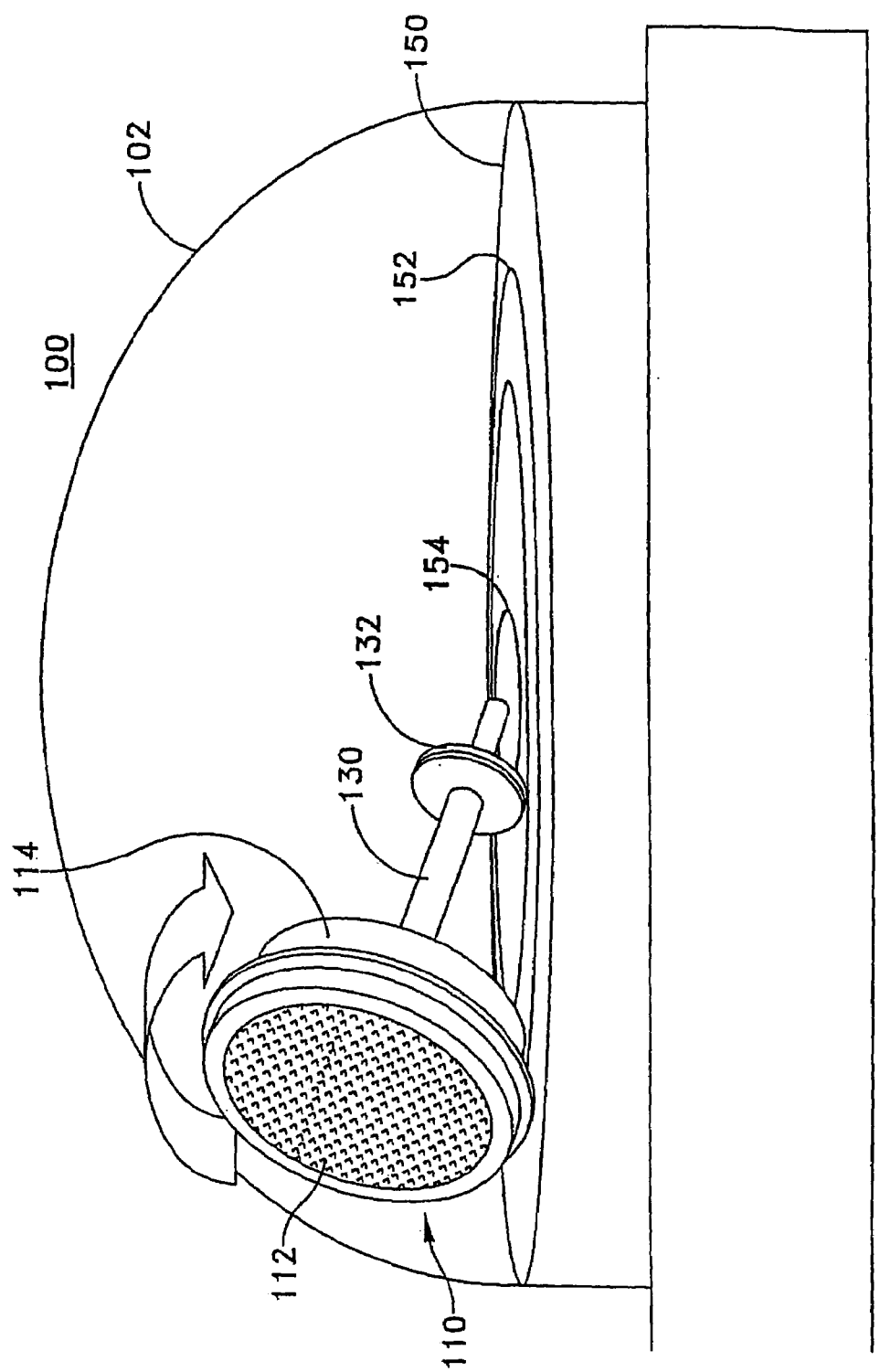
FIG. 1B shows the radar array of FIG. 1A, covered by a radome.

FIGS. 1A, 1B and 2 show a first exemplary embodiment of a radar system 100 according to the present invention. FIGS. 1A and 2 show the array assembly 110 and platform 150. FIG. 1B also shows a radome 102 covering the assembly 110 and platform 150. The radar system 100 comprises an array assembly 110 and a platform 150. The array assembly 110 includes a radar array 112 mounted on a first circular wheel 114 having a first size S1. In addition to the array 112, the first wheel 114 may contain transmitters, receivers, processing and cooling mechanisms. The first wheel 114 has a circumferential portion adapted to engage a path 152 disposed on a platform 150 for revolving the radar array 112 about the platform. An axle 130 is coupled to the first wheel 114. The wheel 114 rotates about the axle 130 as the radar array 112 revolves around the platform 150 during operation. In a preferred embodiment of the invention, the radar array 112 rotates with the first wheel 114, as both the radar array 112 and the first wheel 114 revolve around the platform 150.

As used below, the terms "rotate" and "roll" refer to the rotation of the first wheel 114 and/or the radar array 112 about a roll Axis "A" (shown in FIG. 2) normal to the radar array, located at the center of the array. The term "revolve" is used below to refer to the "orbiting" motion in the tangential direction of the array assembly 110 about a central axis "B" of the platform 150 (shown in FIG. 1A).

The system 100 includes a means to support the array 112 in a tilted position, so that the axis "A" is maintained at a constant angle∀ with respect to the plane of the platform 150. In some embodiments, the radar system 100 also includes a second wheel 132 coupled to the axle 130. Preferably, if present, the second wheel 132 has a second size S2 different from the first size S1 (of the first wheel 114). For example, as shown in FIGS. 1A and 2, the second size S2 is smaller than the first size S1, and the second wheel 132 engages a second path 154 on the platform 150. The first and second paths 152 and 154 are concentric circles, so that the radar array 112 is tilted at a constant angle∀ between vertical and horizontal as it rotates around the axle 130. The first wheel has a flange 118, and the second wheel has a flange 134. The two flanges 118, 134 help maintain the array assembly 110 on the tracks 152, 154 without any fixture locking the assembly 110 in place. This configuration eliminates the need for very large support structures, such as the bearing mounted platform and bracket structures that supported conventional arrays. Without these large support structures, it is possible to eliminate the large load-bearing bearings that lay beneath the support structures. In other embodiments (not shown), instead of the second wheel 132, the end of the axle 130 opposite the radar array 112 can be supported by a universal joint or other means providing an alternative means for supporting the array in a tilted position.

In the exemplary embodiment of FIGS. 1A and 2, the first path 152 and second path 154 are conductive tracks. The circumferential portion of the first wheel 114 and the circumferential portion of the second wheel 132 are conductive. The tracks 152, 154 may be connected to power source 156 to provide power and ground to the radar array 110, similar to the technique used to provide power to an electrically powered train by way of conductive tracks. This mechanism allows the elimination of sliprings used to provide power to conventional radar arrays, which revolve around a platform without rotating around the axis normal to the array front face. The signals from the array can be transferred to by an infrared (IR) link, to improve isolation and eliminate crosstalk, so that sliprings are not required to transfer signals, either.

The exemplary system 100 includes a radar array 112 having just one face on it, but capable of covering 360° of azimuth revolution. This configuration can support a very large and heavy array 112 that is very high powered. Sliding surface contacts are not required. The contact between the first wheel 114 and the first path (track) 152, and the contact between the second wheel 132 and the second path (track) 154 are both rolling surface contacts. In a rolling contact, the portions of the wheels 114 and 132 that contact the tracks 132 and 154, respectively, are momentarily at rest, so there is very little wear on the conductive wheels and tracks. This enhances the reliability of the system. In addition, the wheels 114 and tracks 132 can be made of suitably strong material, such as steel, to minimize wear and/or deformation.

FIGS. 1A and 2 also show a drive train 160 that causes the first wheel 114 to revolve around the platform 150. The drive mechanism 160 is described in greater detail below. A variety of drive mechanisms 160 may be used. All of these mechanisms fall into one of two categories: mechanisms that apply a force to push or pull the array assembly 110 in the tangential direction, and mechanisms that apply a moment to cause the array assembly to rotate about the central axis "A" of the array 112. Both systems are capable of providing the desired rolling action that allows the array assembly 110 to revolve around the platform 150 to provide the desired 360° azimuth coverage.

The example in FIGS. 1A and 2 includes a drive mechanism 160 that pushes against the axle 130 in the tangential direction, causing the array assembly 110 to roll. Other pushing drive mechanisms (not shown) may be used to push against either the first wheel 114 or second wheel 132 in the tangential direction.

Various methods are contemplated for operating a radar system comprising the steps of: revolving a wheel 114 housing a radar array 112 around a platform 150 (wherein the radar array has a front face), and rotating the wheel about an axis "A" normal to the front face, so the wheel rotates as the wheel revolves. The method shown in FIGS. 1A and 2 includes revolving a radar array 112 around a platform 150, the radar array having a front face; and rotating the radar array about an axis "A" normal to the front face as the radar array revolves. Other variations are contemplated.

For example, the wheel 114 may rotate without rotating the radar array 112. The radar array 112 may rotate relative to wheel 114, while wheel 114 rolls around the first track 152 of the platform 150. If the rotation rate of the radar array 112 has the same magnitude and opposite sign from the rotation of the wheel 114, then the radar array 112 does not rotate relative to a stationary observer outside of the system 100. This simplifies the signal processing of the signals returned from the assembly, because it is not necessary to correct the signals to account for the different rotational angle of the array. Rotation of the radar array 112 relative to the wheel 114 may be achieved using a motor that applies a torque directly to the center of the array, or a motor that turns a roller contacting a circumference of the radar array or the inner surface of the circumference of the wheel 114.

Although the example shown in FIG. 1A includes only two wheels 114, 132 and two conductive paths 152, 154 on the platform 150, any desired number of wheels may be added to the axle 130, with a respective electrical contact on the circumferential surface of each wheel, and a corresponding conductive path located on the platform 150. The additional wheels (not shown) would be sized according to their radial distances from the center of the platform 150, so that all of the additional wheels can contact the additional conductive paths (not shown) at the same time that wheels 114 and 132 contact paths 152 and 154. The additional conductive paths may be used to provide additional current sources, to avoid exceeding a maximum desired current through any single electrical path. The additional conductive sources may also be used to provide power at multiple voltages.

Figure 33:
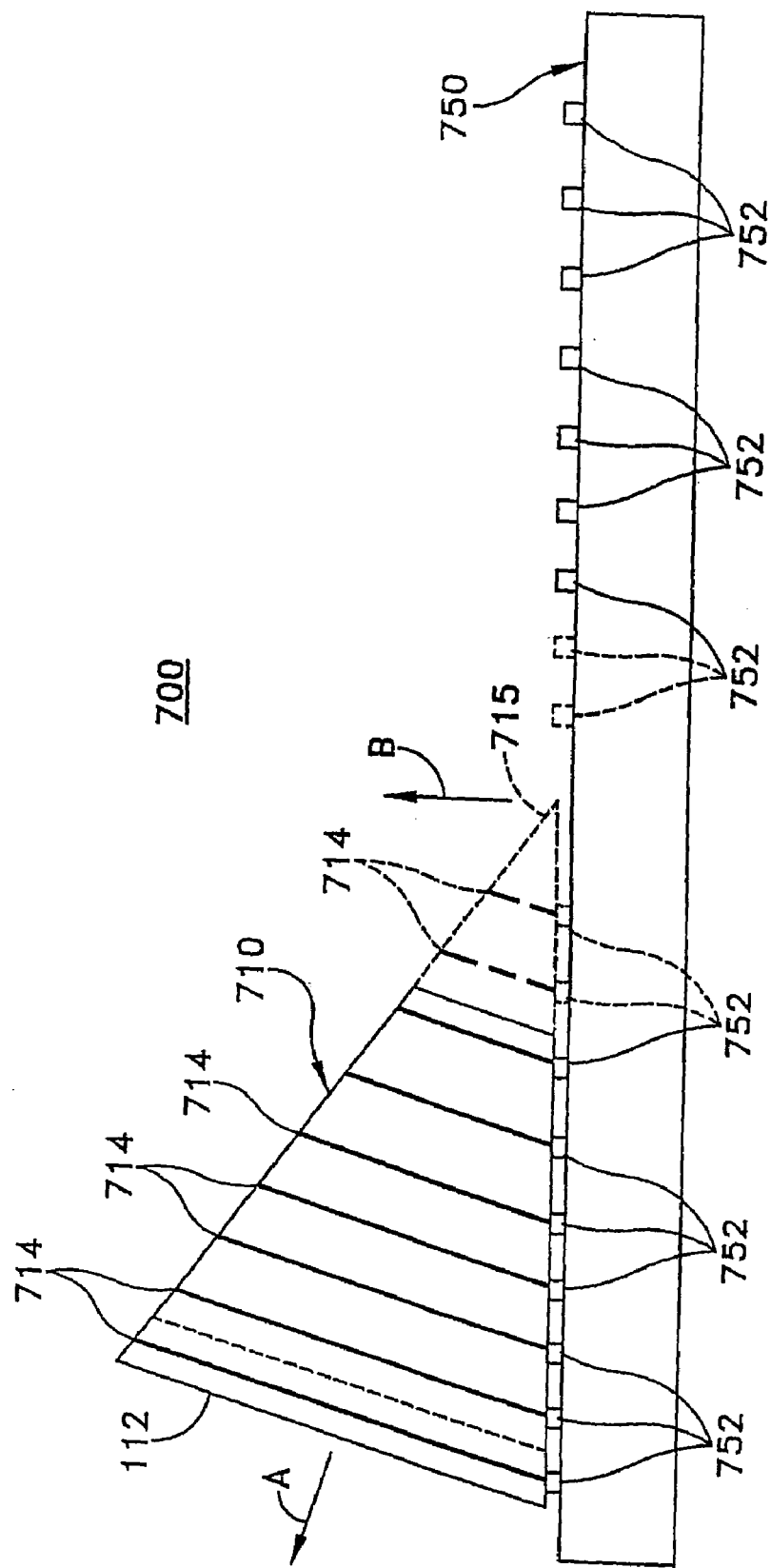
FIG. 33 shows a variation of the system, in which radar array is positioned at the base of a cone or frustum.

FIG. 33 shows another variation of the system 700, including an array assembly in which radar array 112 is positioned at the base of a housing in the shape of a circular cone 715 or frustum 710. In the frustum array assembly configuration 710, the apex section of the cone 715 (shown in phantom) is omitted. The frustum or cone configurations allow the addition of any desired number of contacts 714 on the circumferential surface. Each contact 714 maintains an electrical connection with a corresponding conductive path 752 as the cone 715 or frustum 710 rolls around its own axis "A" and revolves around the axis "B" of platform 750. These configurations can allow a very even weight distribution across the platform 750. The cone 715 and frustum 710 configurations also inherently provide a means for supporting the array 112 in a tilted position.

Depending on the interior design of the cone 715 or frustum 710, the system 700 may or may not have an axle coupled to the radar array 112. The continuous housing of cone 715 or frustum 710 provides the capability to mount components of the radar antenna system 700 to the side walls of the cone or frustum in addition to, or instead of, mounting components to an axle. Further, the cone 715 or frustum 710 may have one or more interior baffles or annular webs (not shown) on which components may be mounted.

Each variation has advantages. Although the cone 715 provides extra room for more contacts 714, the frustum 710 allows other system components to occupy the center of platform 750 such as, for example, a roll angle sensing mechanism, described further below with reference to FIG. 29.

The rotating array has many advantages compared to conventional arrays. For example, maintenance can be made easier. If an array element must be repaired or replaced, the array can be wheeled to a position in which that element is easily accessed. Also, the rotating array has very few moving parts, enhancing reliability. The rolling array assembly 110 has much lower mass and moment of inertia than the rotating platform of conventional revolving radar systems, so the azimuth drive 160 of the rolling array should not require as powerful a motor as is used for conventional rotating platform mounted radars. Also, the azimuth drive assembly does not have to support the weight of the antenna (whereas prior art rotating platform azimuth drives did have to support the weight of both the array and its support). This should improve the reliability of the azimuth drive.

Azimuth Drive

Bullring Gear and Pinion Drive

FIGS. 3–7 show a first exemplary azimuth drive 160 for a rolling radar array assembly 110 of the type described above. Azimuth drive 160 is of the general type in which the array assembly 110 is pushed in the tangential direction. The exemplary drive 160 can either rotate the array assembly 110 with a constant angular velocity, or train the array to a specific desired azimuth position.

Drive 160 includes a rotatable bullring gear 170, including a rotatable ring portion 172 rotatably mounted to the platform 150 by way of a fixed ring portion 171. Bullring gear 170 has bearings 173 for substantially eliminating friction between the fixed portion 171 and the rotatable ring portion 172. A motor 181 having a pinion gear 180 drives the rotatable ring portion 172 of bullring gear 170 to rotate.

Figure 4:
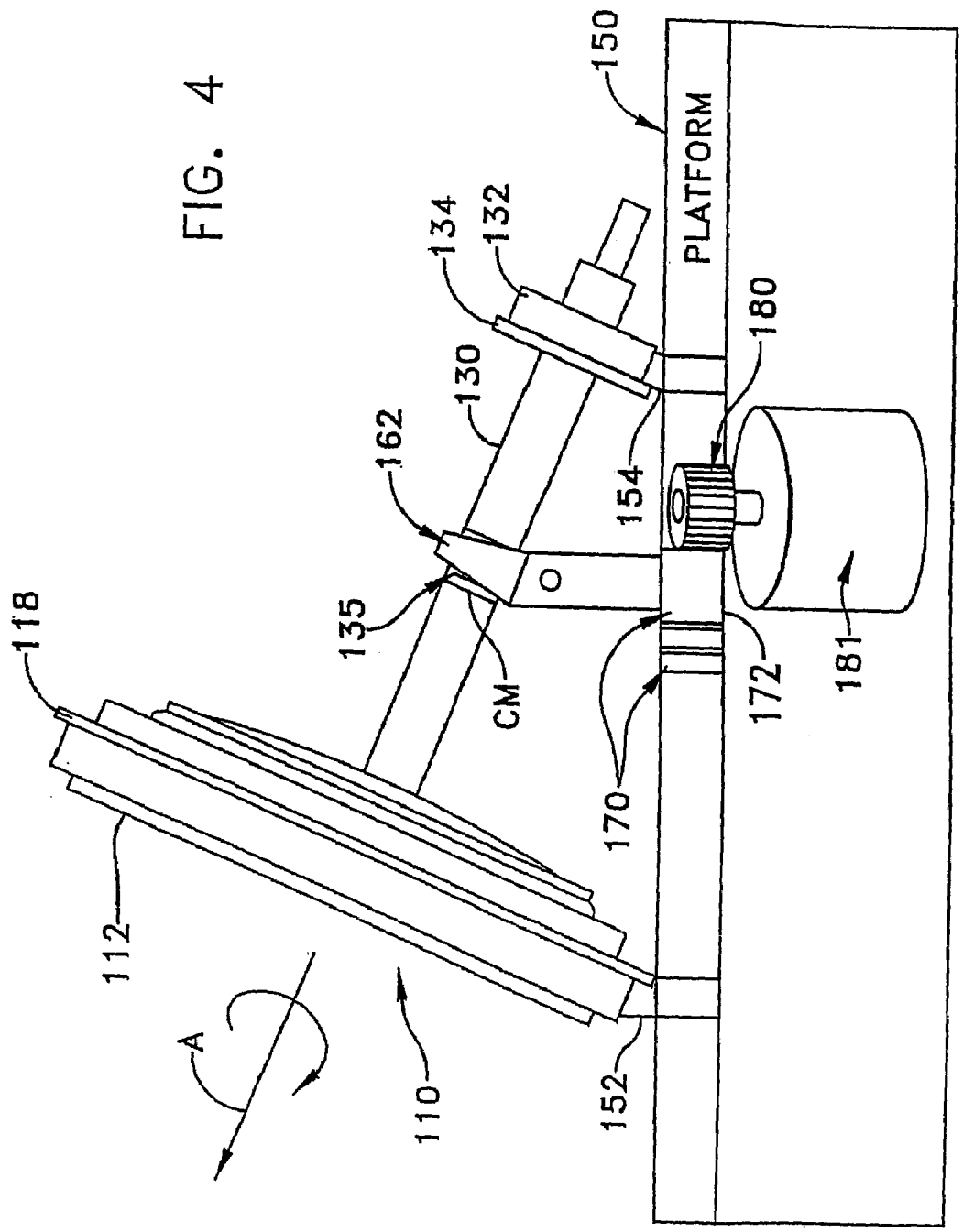
FIG. 4 is a side elevation view of the azimuth drive mechanism of FIG. 3.
Figure 7:
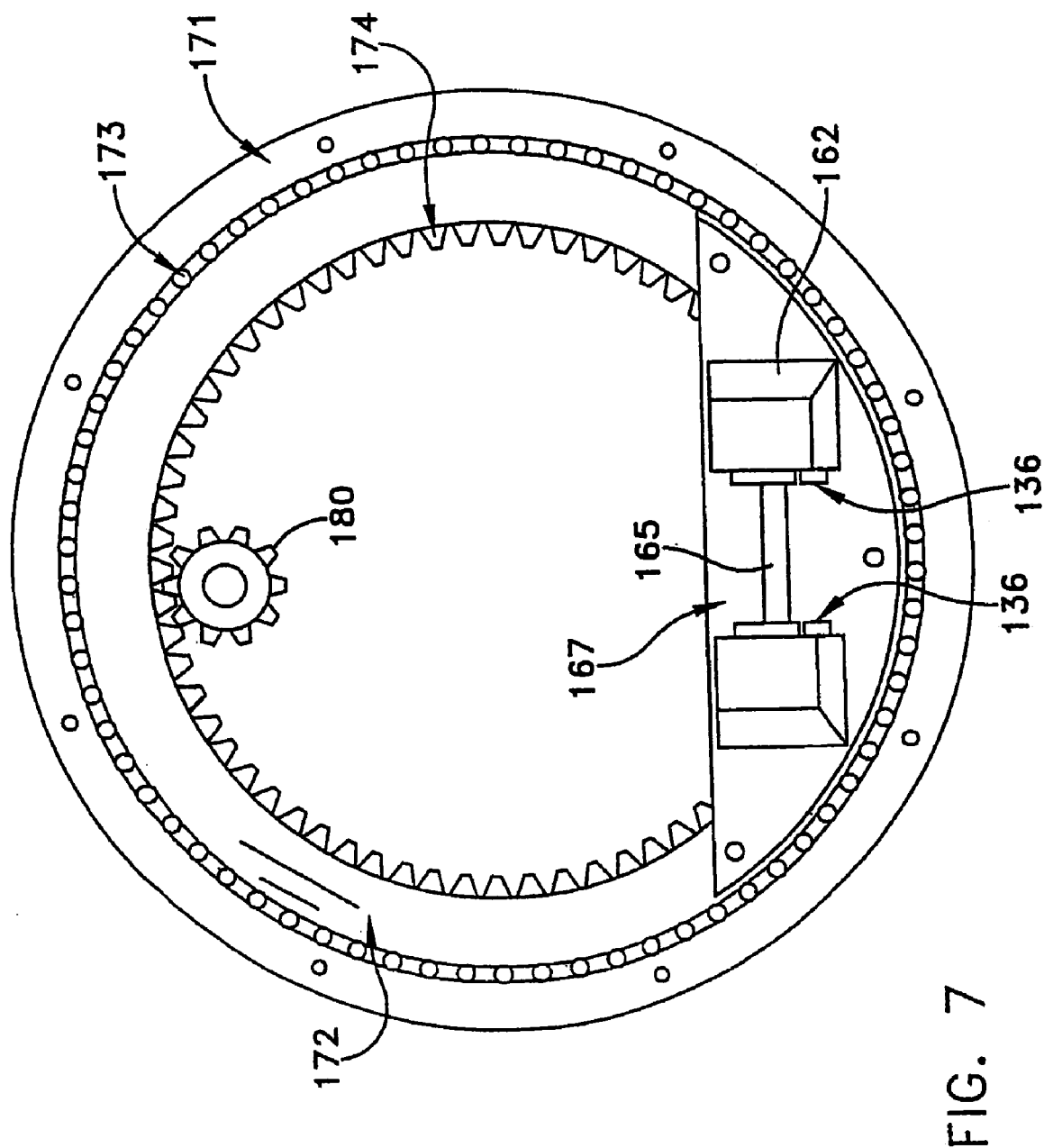
FIG. 7 is a plan view of the azimuth drive mechanism of FIG. 3.

At least one bracket portion 162 is coupled to the rotatable ring portion 172. An exemplary support platform for mounting the bracket 162 is shown in FIG. 7. A drive bracket bearing support platform 167 is mounted on a portion of the movable ring portion 172. The at least one bracket portion 162 may include one bracket arm, or two bracket arms connected by a connecting portion 165. Other bracket configurations are also contemplated. The bracket portion 162 pushes in the tangential direction against the array assembly 110 that includes the radar array 112, causing the radar array to rotate about the axis "A" normal to the radar array (as shown in FIG. 4) and revolve about the platform 150 with a rolling motion.

The bracket portion 162 is arranged on at least one side of the axle 130 for pushing the axle in the tangential direction. Although the exemplary bracket portion 162 pushes against the axle 130, the bracket portion 162 can alternatively apply the force against other portions of the array assembly, such as one or both of the wheels 114, 132 or against the conical housing 715 or frustum-shaped housing 710 shown in FIG. 33.

Figure 5:
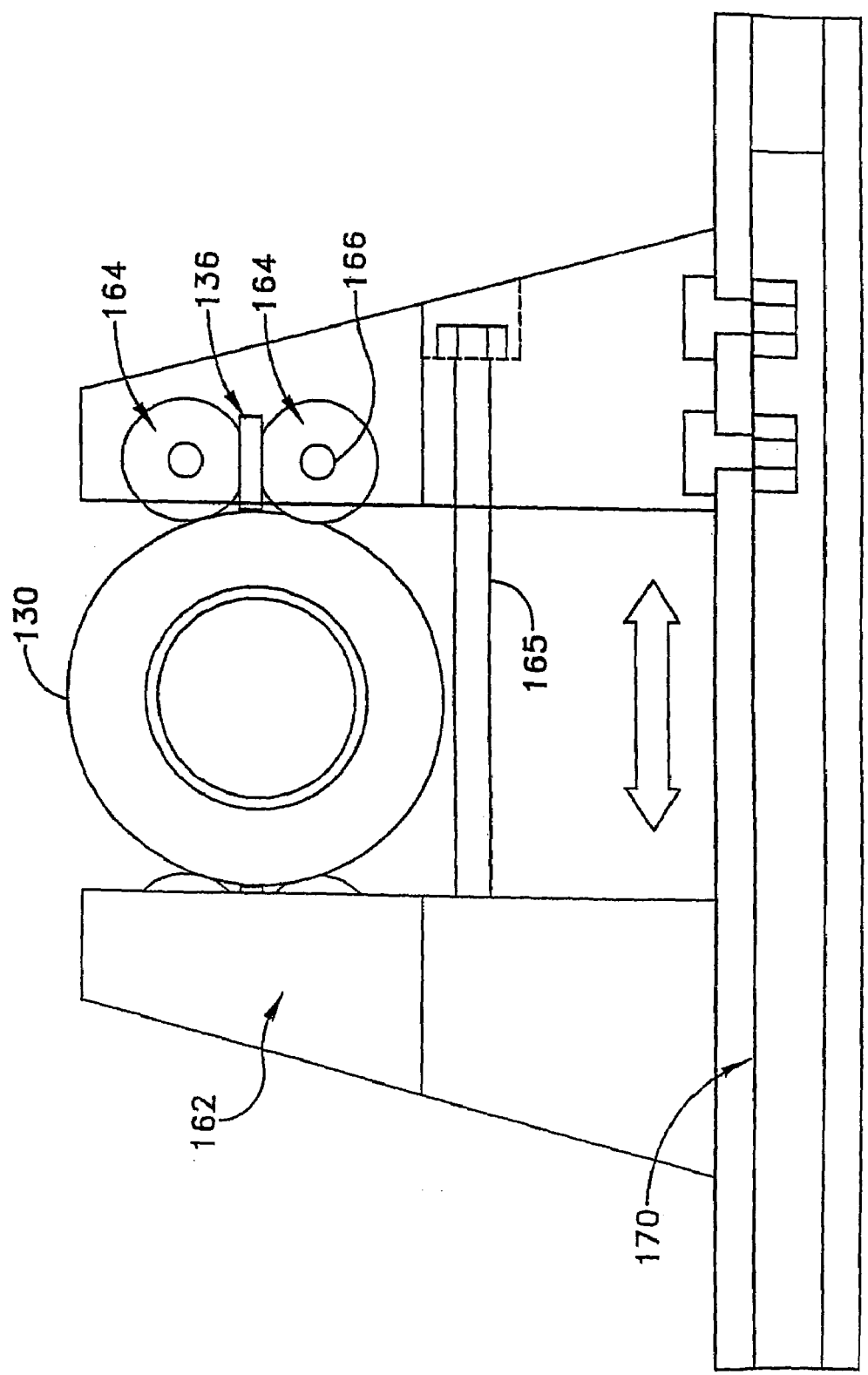
FIG. 5 is a front elevation view of the azimuth drive brackets shown in FIG. 4.

As best shown in FIG. 5, there are preferably two bracket portions 162 with at least one roller 164 on each bracket portion 162. The rollers 164 allow the bracket portions 162 to apply force against the axle 130 with substantially no friction, thus allowing the array assembly 110 to roll freely around the platform 150. In the example, each bracket portion 162 has two rollers 164 mounted on bearings 166, contacting the axle 130 above and below the center of the axle 130. If only a single roller 164 is included on each bracket portion 162, then it may be desirable to position the roller at the same height as the center of the axle 130. In either of these configurations, the resultant force applied by the one or two rollers 164 is applied in the direction parallel to the platform 150 (e.g., horizontal for a horizontal platform). In the two roller configuration of FIG. 5, the vertical force components of the two rollers above and below the axle on each side are equal and opposite to each other, canceling each other out.

In some embodiments (not shown), there may be only a single bracket portion 162 for pushing the axle 130 in one direction. In some cases, this would require the array to rotate by more than 180 degrees to reach an azimuth angle that could be achieved by a turn of less than 180 degrees if two brackets 162 are provided.

Figure 6:
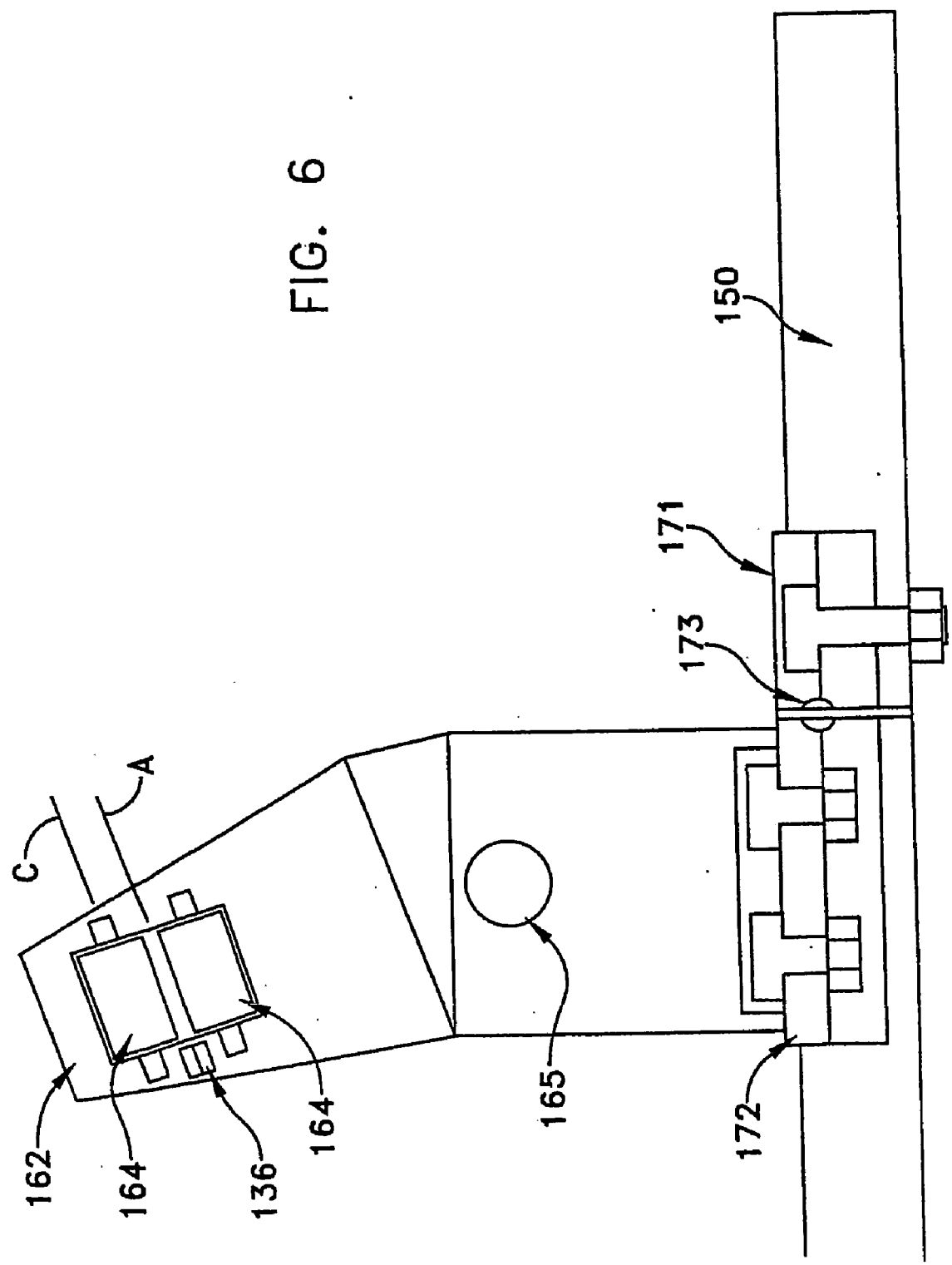
FIG. 6 is a side elevation view of the azimuth drive brackets shown in FIG. 4.

As shown in FIGS. 4 and 6, the axle 130 is tilted away from horizontal, and each roller 164 is mounted so as to have an axis of rotation "C" parallel to an axis of rotation "A" of the axle. Also, the bracket portions 162 are preferably oriented in a direction parallel to a face of the radar array 112.

The bracket design of FIGS. 4 and 6 performs well when the center of mass CM of the array is near the brackets 162. However, if the point of application of the force by the brackets 162 on the axle 130 is further from the center of mass, it is possible that a large unbalanced moment would cause the second wheel 132 to lift out of the smaller track 154. Even if the unbalanced moment is not large enough to cause the wheels 114, 132 to lift out of the tracks 152, 154, the unbalanced moment is likely to cause uneven wear of the wheels 114, 132 and/or the tracks 152, 154. For a straight bracket 162 as shown in FIG. 4, the location of the bracket is limited by the availability of a bullring gear 170 of appropriate size to allow the bracket 162 to be mounted proximate to the center of mass CM.

Figure 3:
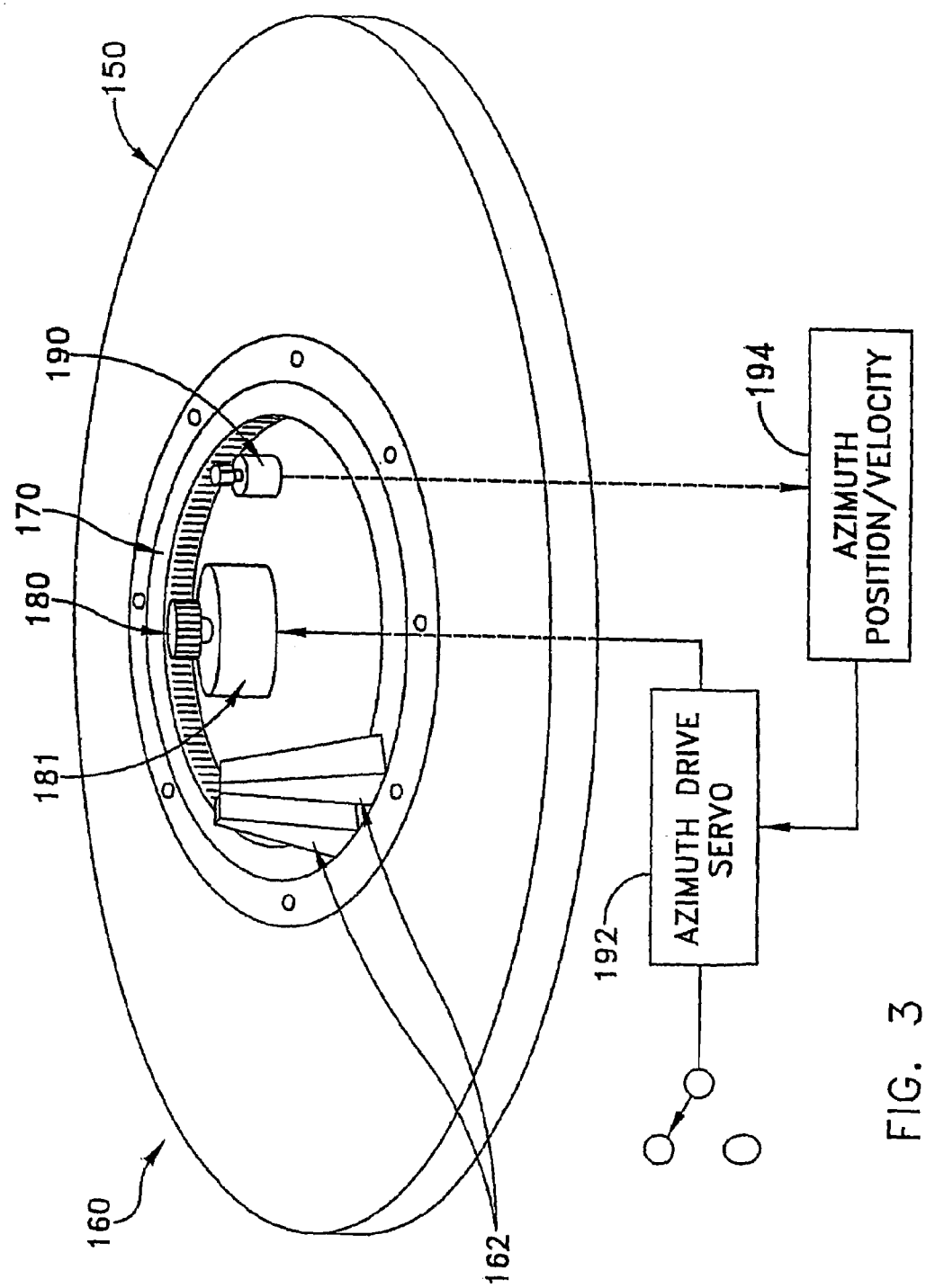
FIG. 3 is a perspective view of a first exemplary azimuth drive mechanism for the radar system of FIG. 1A.
Figure 8:
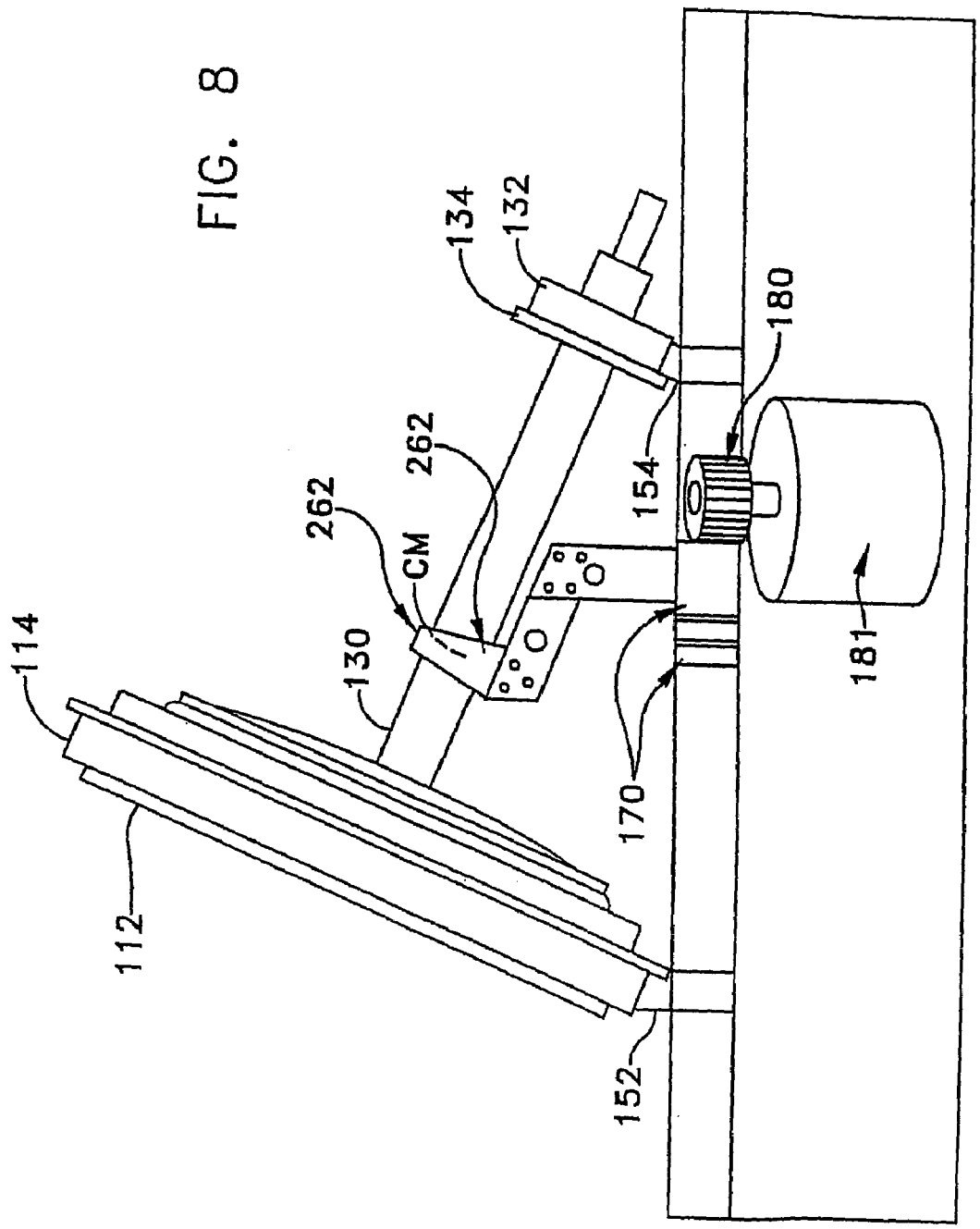
FIG. 8 is a side elevation view showing a variation of the azimuth drive bracket shown in FIG. 6.
Figure 9:
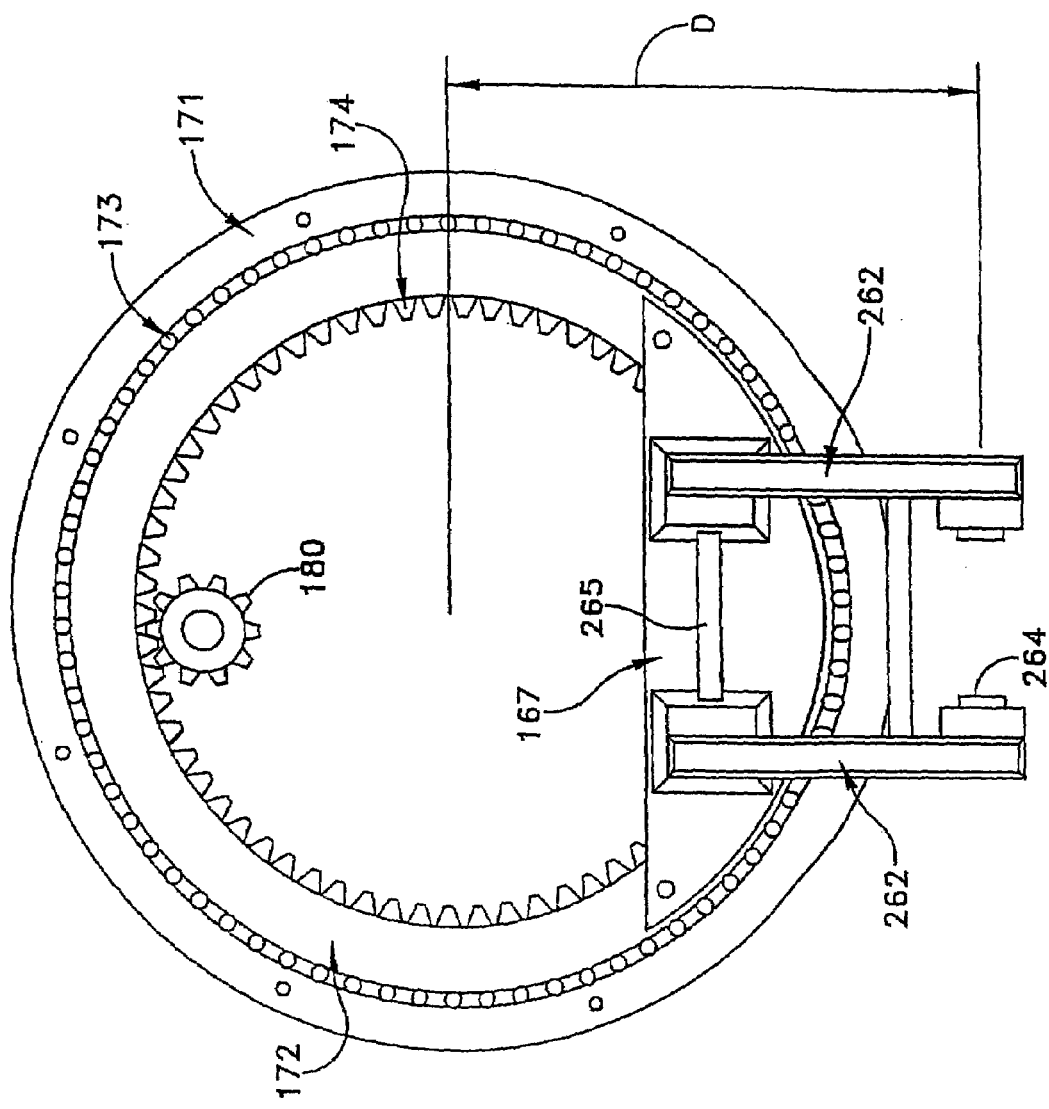
FIG. 9 is a plan view of the drive mechanism shown in FIG. 8.
Figure 10:
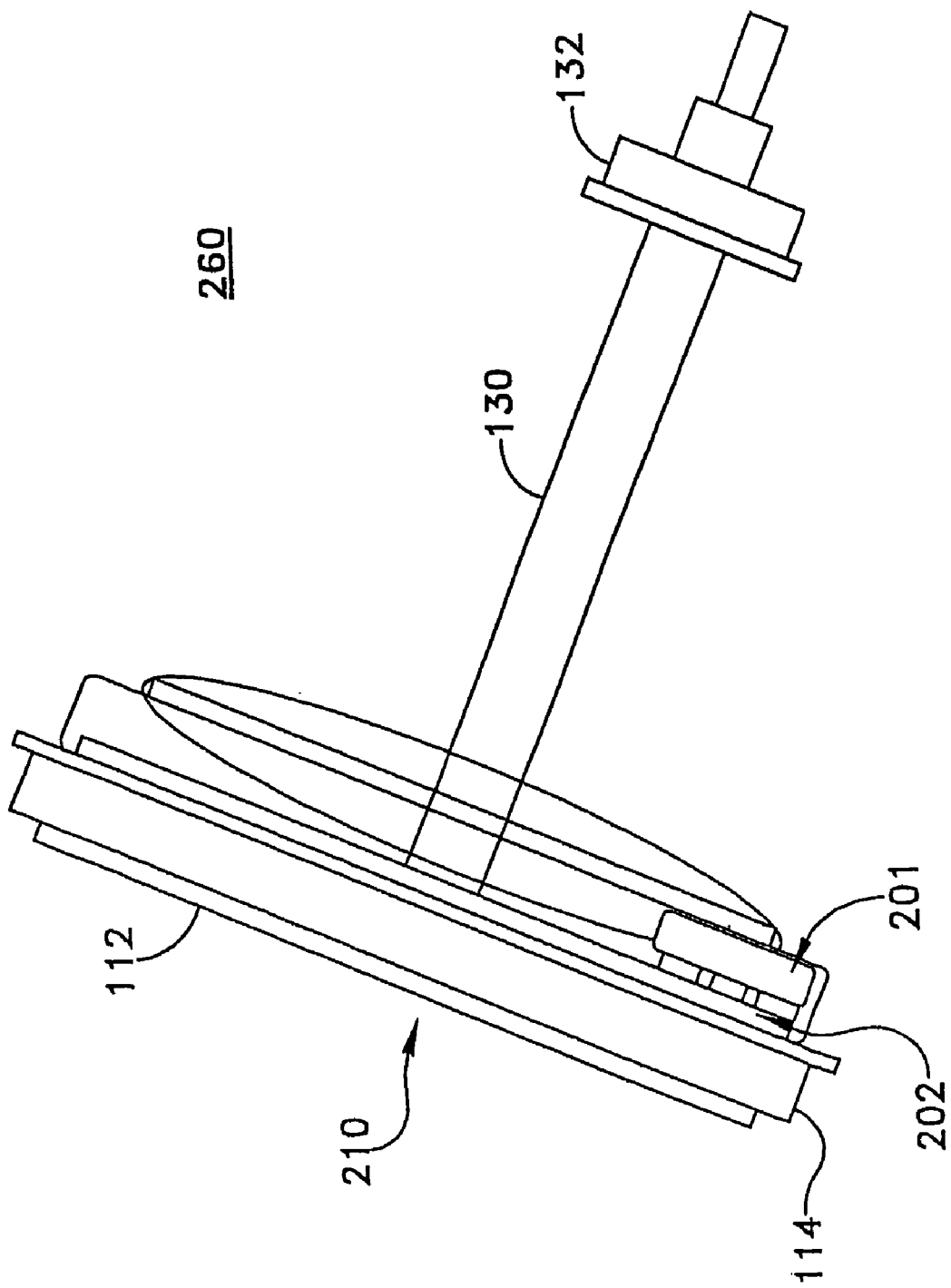
FIG. 10 is a side elevation view of a second azimuth drive mechanism.

FIGS. 8 and 9 show a variation of the azimuth drive of FIG. 3, wherein the bracket portions 262 are offset from the attachment point to the drive bracket bearing support platform 167. The bracket portions 262 are located at a radial distance from a center of the rotatable ring portion 172 greater than the radius of the rotatable ring portion. This allows the bracket rollers 164 to be positioned near the center of mass CM of the array assembly 110, regardless of the radius of the movable ring 172 of the bullring gear 170. As shown in the drawings, it is not necessary to provide elaborate fixtures to maintain the array assembly 110 on the platform 150.

Offsetting the brackets 262 to apply the force at the center of mass CM as shown in FIG. 8 avoids the application of an unbalanced moment to the array assembly 110. Applying the force at the center of mass CM leaves the wheels 114 and 132 safely on their respective tracks. Because any unbalanced moment is eliminated, there is no need to support or restrain the end of the axle 130 opposite the array 112. The opposite end of the axle 130 can float freely.

The system 100 has an azimuth position control mechanism. An azimuth position sensor 190 is provided. The azimuth position sensor 190 may be, for example, a tachometer or a synchro. A tachometer is a small generator normally used as a rotational speed sensing device. A synchro or selsyn is a rotating-transformer type of transducer. Its stator has three 120°-angle disposed coils with voltages induced from a single rotor coil. The ratios of the voltages in the stator are proportional to the angular displacement of the rotor. An azimuth position/velocity function receives the raw sensor data from sensor 190 and provides the position as feedback to the azimuth drive servo 192. The type of sensor processing function 194 required is a function of the type of sensor used.

The azimuth drive servo 192 is capable of controlling the motor 181 to drive the rotatable ring portion 172 to cause the radar array 112 to revolve about the platform 150 at a constant angular velocity. The servo 192 is also capable of controlling the motor 181 to drive the rotatable ring portion 172 to cause the radar array 112 to revolve about the platform 150 to a specific desired azimuth position.

When the drive mechanism 160 is used to train the array 112 at a specific azimuth position, three general techniques may be used. First, the array can always be moved in the same direction. This approach may cause uneven wear on the teeth of the bullring gear 170 and pinion 180. Second, the array can be moved in a direction that requires the least travel from its current position, so that the array does not have to move through more than 180 degrees. Third, the direction of rotation can alternate each time the array is moved, so that any wear on the bullring gear 170 and 180 is more even.

Reference is again made to FIGS. 4–6. FIGS. 4–6 also show a first exemplary position sensing system, which is described in detail further below in the section entitled, "Angular Position Sensing."

FIGS. 34–37 show another embodiment of the system, in which the array 112 rotates about a track assembly 3400 that is not mounted to a fixed platform. The tracks 3452, 3454 may be free standing, or the tracks may be mounted to a skeletal support frame or truss of any desired height (not shown). Elimination of the platform makes the entire system easy to transport and rapidly deploy in the field.

System 345 includes a plurality of tracks 3452 and 3454. Although only two tracks are shown, the system may include any desired number of tracks. The outer track 3452 and the inner track 3454 are connected by a plurality of frame members or "spokes" 3455. Although six spokes 3455 are shown, any desired number of spokes may be included.

Preferably, any relatively large track (e.g., 3452) comprises a plurality of arc-shaped track sections 3452a–3452d that are separable from each other and separately transportable. Although four sections 3452a–3452d are shown, the track 3452 may be divided into any desired number of sections. Criteria for determining whether a track is divided into a plurality of sections 3452a–3452d, and the criteria for determining how many sections may include size and/or weight. Preferably, each section of the track is sized so that it can be transported in the bed of a standard automotive vehicle, such as a truck, or a trailer. In some embodiments, each section of the track may be sized to be lightweight enough to be handled and lifted by humans without any mechanical equipment. As explained further below in the signal processing section, in some configurations a large track diameter is desired to provide a large "virtual aperture." A large track diameter is easily accommodated, without increasing the size or weight of each arc section, by increasing the number of track sections, and reducing the angle of arc subtended by each arc section.

The track sections 3452a–3452d may be joined using a variety of fastening mechanisms. For example, the track sections 3452a–3452d may have (or receive) pins or bolts 3457 that connect to the spokes 3455. A similar fastening mechanism can be used to attach the spokes 3454 to the inner track 3454. Preferably, the fasteners 3457 are of a type that allows rapid disconnection, so that the track assembly 3400 can be easily disassembled for transport. If additional concentric tracks are included, similar fasteners 3457 can be used at intermediate locations along the length of each spoke 3455.

Optionally, the track assembly 3400 may include means for leveling the first track 3452 and the second track 3454. This allows deployment of the system on non-level terrain, such as in a field or desert. The leveling means may include shims, blocks, or flat support pads 3456. Other leveling means may include jack-stands, mechanical or hydraulic jacks, or other adjustable-height support devices. If the track assembly is to be deployed on a hard (as opposed to loosely packed or granular) surface, the leveling means may be a plurality of adjustable threaded bolts that screw into the bottom of the frame members. Similarly, the leveling means may include casters having threaded rods extending therefrom. The leveling means may include pins or bolts 3457 or other fastening mechanism to attach the track 3452 to the leveling means. If each shim, block or pad 3456 is positioned so as to straddle a pair of adjacent track sections (position not shown in FIG. 34), then the shim block or pad 3456 can be used to join the two track sections together. If the tracks 3452, 3454 are mounted on a skeletal support frame or truss (not shown), the leveling means may be built into the support frame.

Figure 34:
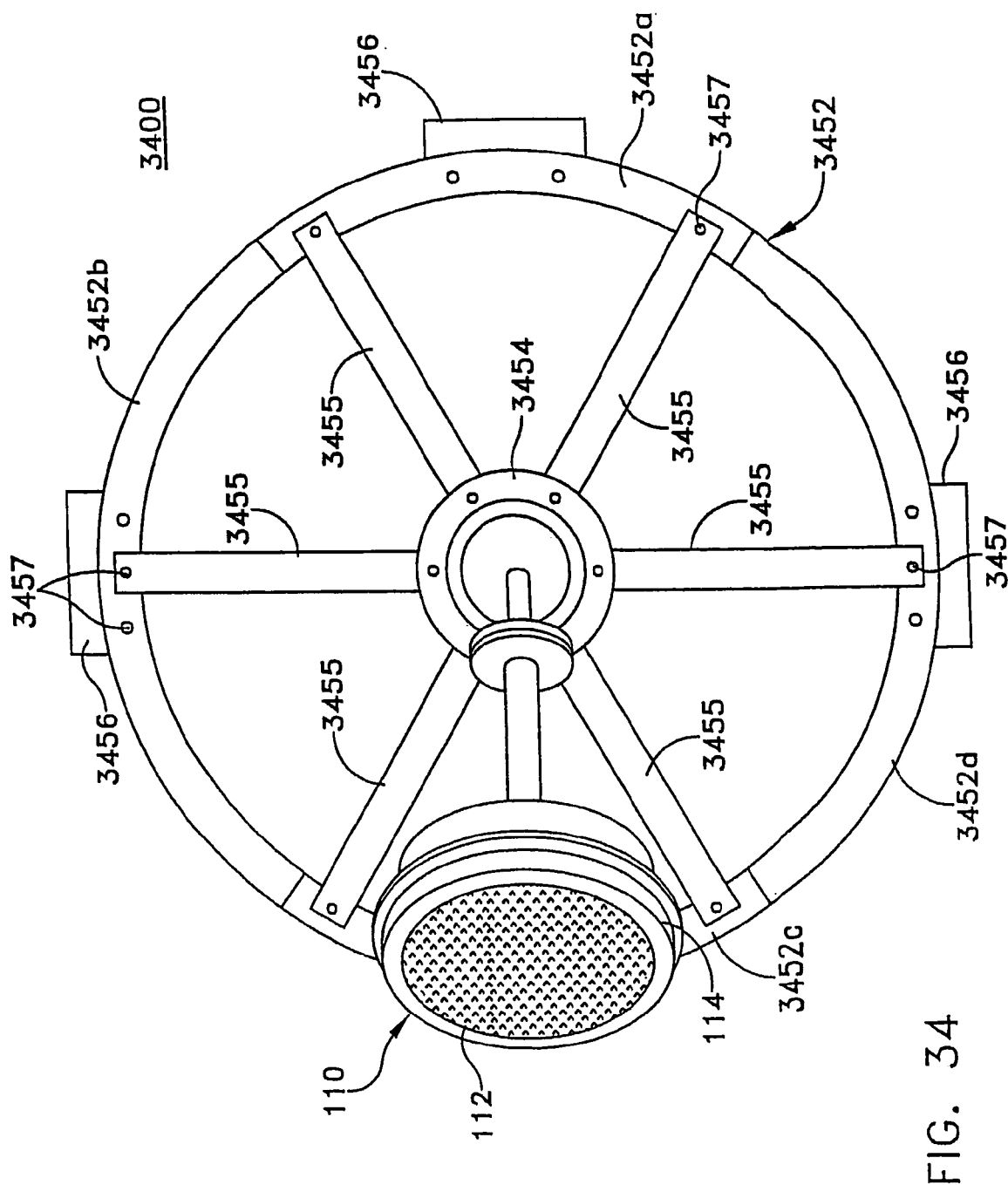
FIG. 34 shows a variation of the system, in which the radar array rotates about a track without a platform.
Figure 35A:
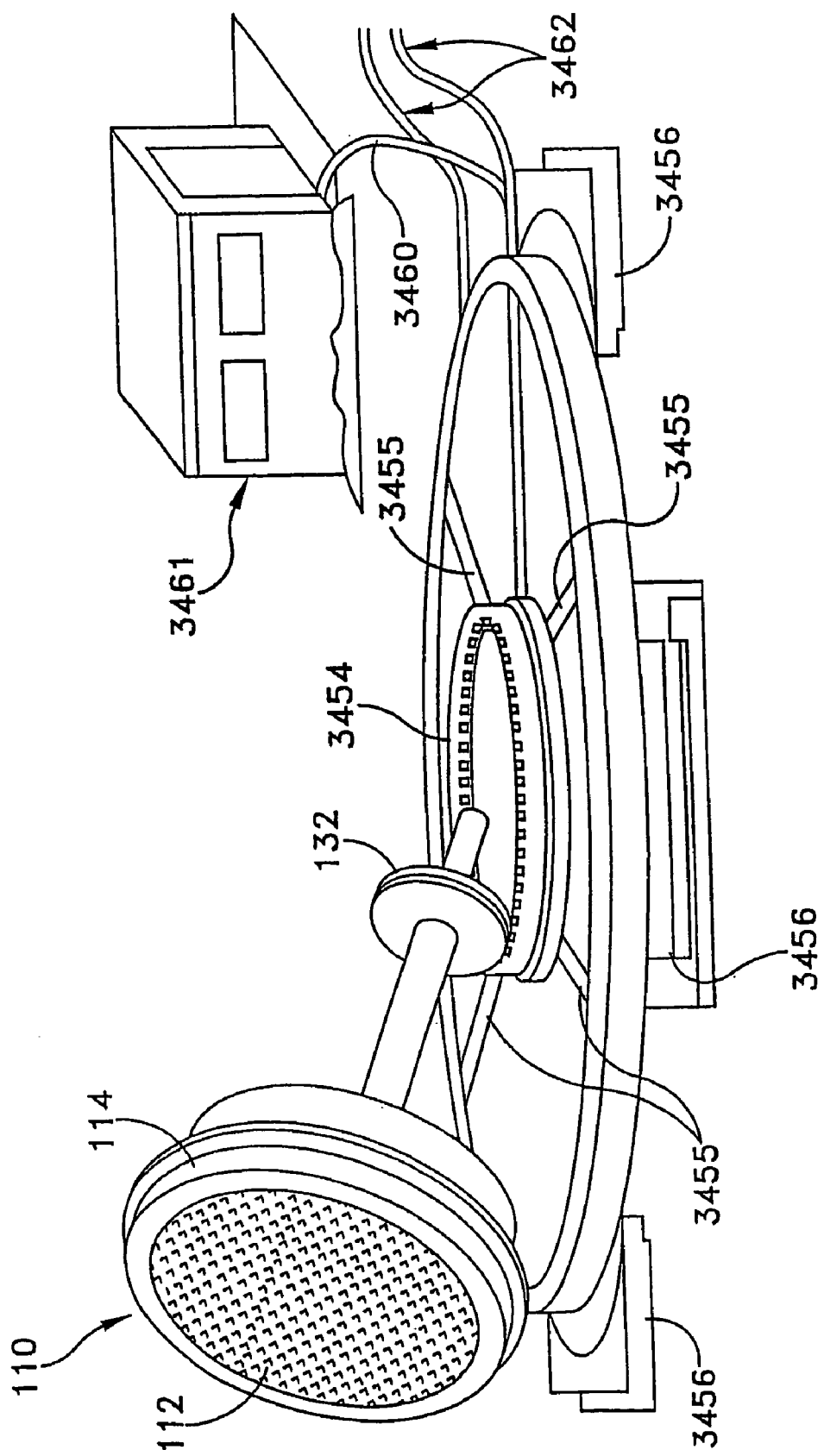
FIG. 35A is an isometric view of the system of FIG. 34.

FIG. 35A is an isometric view of the system of FIG. 34, deployed. The system may be connected via cables 3460 and 3462, to provide signals and power, respectively. A generator, command and control equipment, and signal processing equipment may be stored in a separate shelter 3461.

Figure 35B:
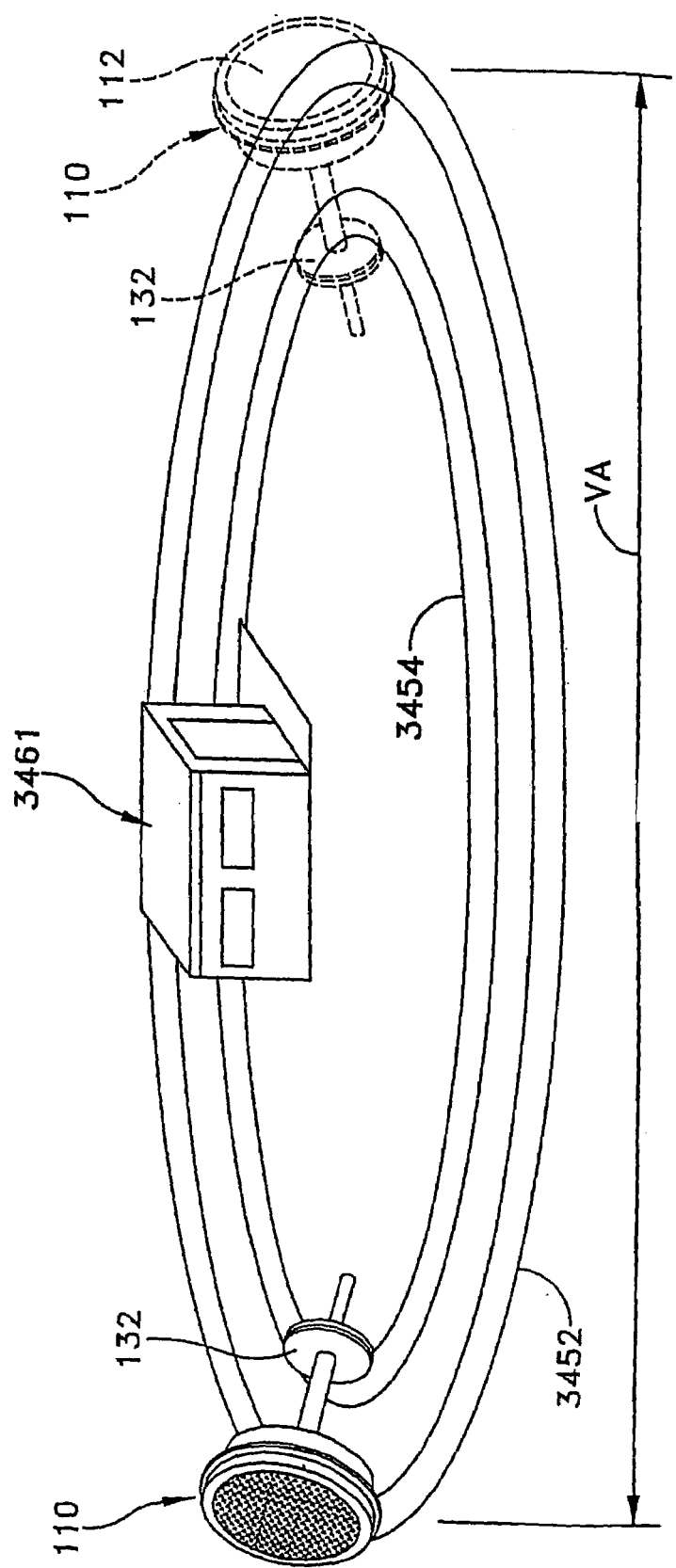
FIG. 35B is an isometric view of an alternative configuration for the system of FIG. 34.

FIG. 35B is an isometric view of another exemplary deployment configuration. In FIG. 35B, the equipment shelter 3461 is located inside the track, where protection against own EMI is inherent.

Figure 36:
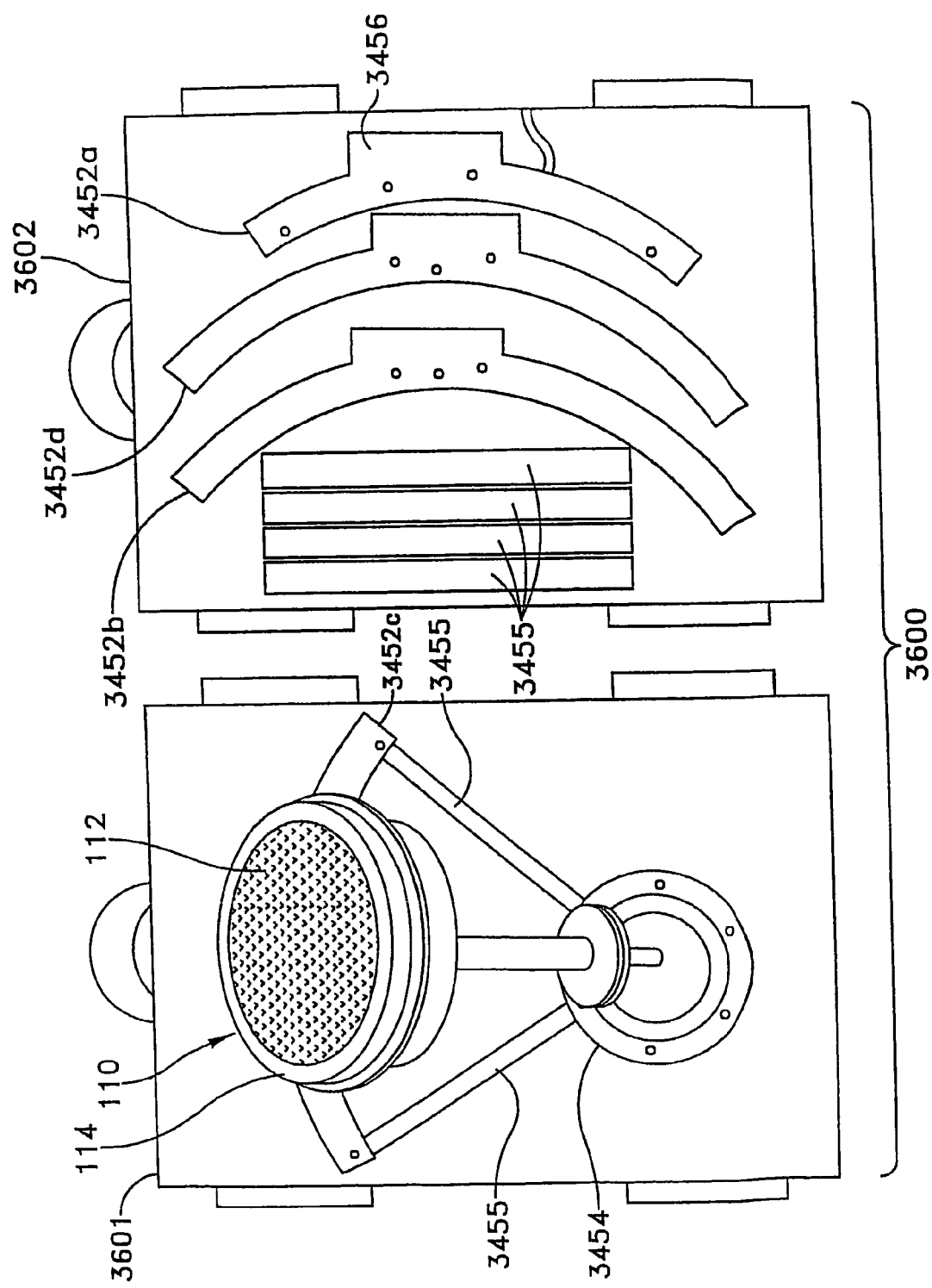
FIG. 36 shows a first transport configuration in which the radar array and track of FIG. 34 are transported on two trailers.

FIG. 36 is a plan view showing a first transport configuration 3600 of the system, including two trucks or trailers 3601, 3602. In the exemplary embodiment, arc section 3452c of the track is transported on truck or trailer 3601 while connected to two spokes 3455 and the inner track 3454. In alternative embodiments, section 3452c, the two spokes 3455 and the inner track 3454 may be permanently fastened as an integral unit, or formed as a single component. In all of these variations, section 3452c, two spokes 3455 and the inner track 3454 fit on a single truck or trailer bed, and the array assembly 110 can optionally be mounted on the track section 3452c for transport. Means for preventing shifting of the array during transport (e.g., blocks, cables, and the like, not shown) are used. In addition, weight may be applied to the bottom portion of the wheel 114 to resist rotation during transport, for example, using the internal gravity drive described below, which is also used during operation to control rotation of the array 112.

The second truck or trailer 3602 carries the remaining arc sections 3452a, 3452b and 3452d, the leveling means 3456, and the frame members 3455. If the track is to be supported on an optional skeletal support structure comprising additional frame members, the additional members can also be transported on the truck or trailer 3602.

Figure 37:
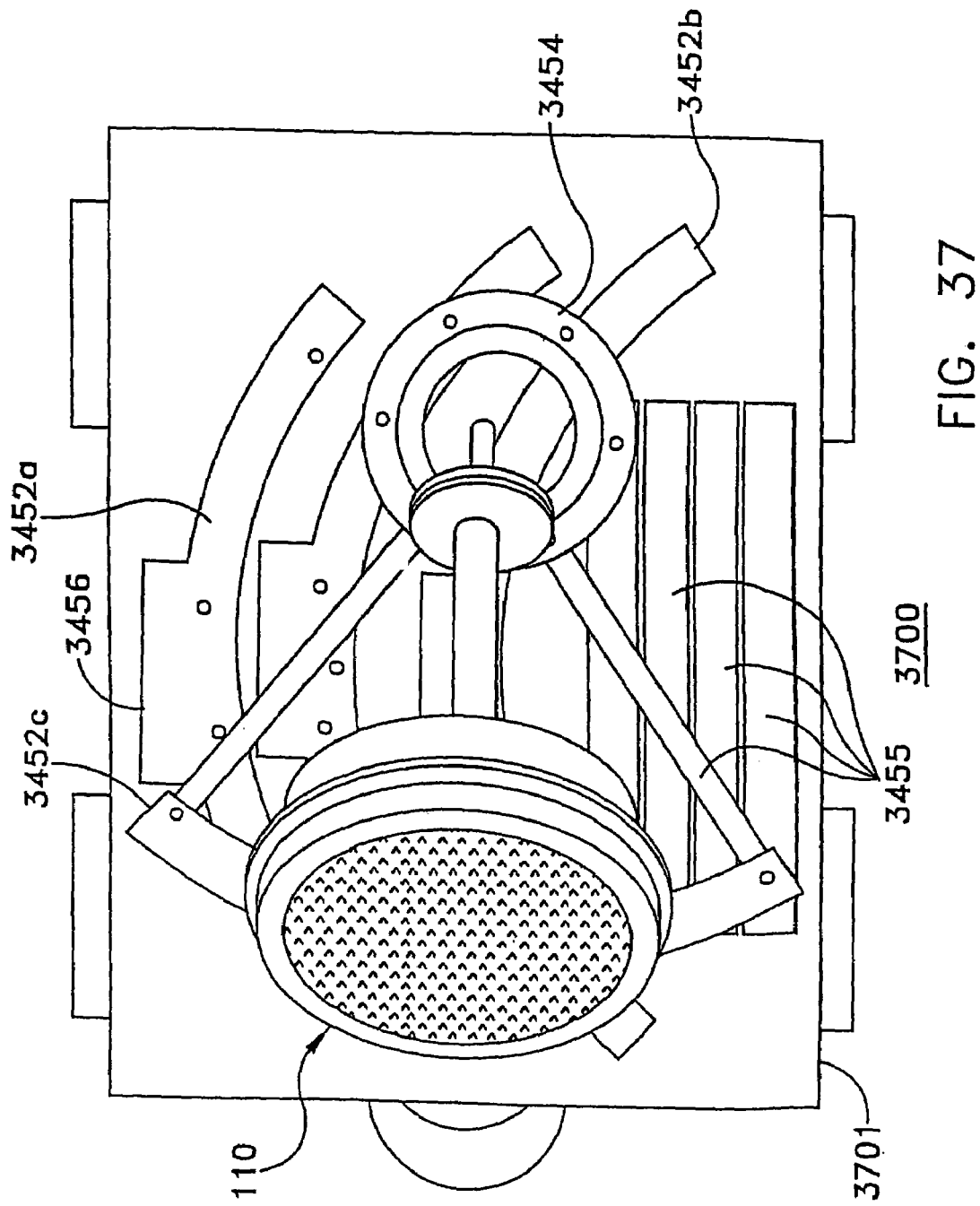
FIG. 37 shows a second transport configuration in which the radar array and track of FIG. 34 are transported on one trailer.

FIG. 37 shows an alternative transport configuration 3700, in which the complete system is transported on the bed of a single truck or trailer 3701. In FIG. 37, section 3452c, track 3454 and two spokes 3455 are laid across the remaining track components. Optionally, the bottom surfaces (not shown) of track section 3452, track 3454 and the two spokes 3455 may have grooves or channels shaped to conformably seat on the remaining track components during transport. As in the configuration of FIG. 36, means (not shown) are provided for preventing shifting of the array during transport.

Alternative transport configurations for the deployable track system are contemplated, including those employing one, two or more than two trucks or trailers.

Once the system is transported to the deployment site, deployment is accomplished by leveling the support surface if necessary before laying the track. Leveling can either be achieved by leveling the ground, or by placing the supports (leveling means) 3456 on the surface before laying the first portable track, so there is substantially no vertical or horizontal deviation by the tracks 3452, 3454 from the desired path. If the tracks are to be elevated by a skeletal support frame or truss, the frame is assembled from the frame members. The first portable track 3452 is assembled and laid on the support surface (or the optional skeletal support frame or truss, if present). The spokes 3455 are mounted on the first track 3452. A second portable track 3454 is laid on the spokes 3455, the first support surface or a second support surface, so that the second portable track is concentric with the first portable track. Additional concentric tracks are also assembled at this time, if used. The system is dis-assembled by following the same steps in reverse order. The deployment steps are then repeated each time the system is deployed at a new location.

Although an exemplary order has been described for laying down the components of the portable track, the components may be laid down in other sequences. For example, the second portable track 3454 may be laid down before the spokes 3455 and first track 3452.

The basic principles of a rolling array system are described above in the context of a single array system. Some missions require the use of multiple frequencies. For example, in the National Missile Defense program, a UHF radar is used for initial search and detection, and a separate X-band radar is used for high resolution targeting. This type of mission could be serviced using two separate radar systems.

Figure 38:
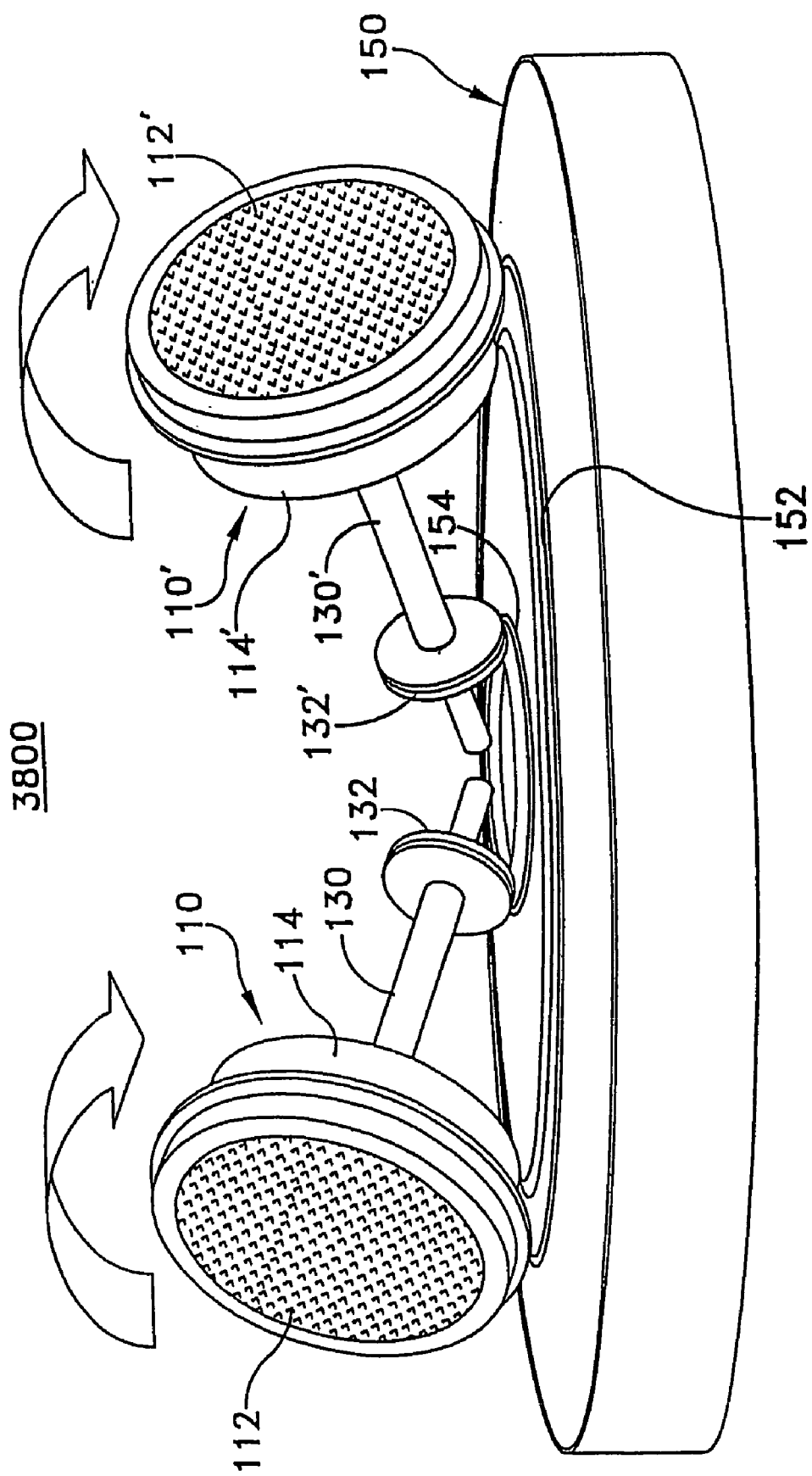
FIG. 38 shows a system having a plurality of rolling axle arrays for multiple frequency operation on a single pair of tracks.

FIG. 38 shows an embodiment of a multiple frequency rolling array system 3800 having two different rolling array assemblies 110, 110' on a single set of tracks 152, 154, which may be on a platform 150. The second array assembly 110' may be similar to the array assembly 110 described above, including a first wheel 114' containing the radar array 112', axle 130', and second wheel 132'.

Each array assembly 110, 110' rolls around the set of tracks 152, 154 to provide a full 360-degree coverage. Each array assembly 110, 110' has its own radar signal and data processing and drive system. The above described internal gravity drive and servo drive systems provide for the arrays' rotation while preventing them from mechanically interfering with each other.

Although FIG. 38 shows two arrays 110, 110', any desired number of arrays may be placed on an appropriately sized track. In general, as the number of rolling arrays deployed on a single platform 150 or set of tracks 152, 154 increases, it becomes more desirable to use large tracks. By using a single set of tracks 152, 154 and a single platform 150 (if a platform is used), the cost and real estate of the track and/or platform can be reduced to that of a single radar array system. This may be particularly advantageous if a portable rolling radar array system is deployed in terrain that is difficult to clear and/or difficult to level. Additionally, the reduction in the amount of equipment may reduce transportation costs.

Each of the two or more arrays 110, 110' may have a respectively different frequency. Although an example of a system using UHF and X-bands is described above, any combination of frequency bands may be used.

Figure 39:
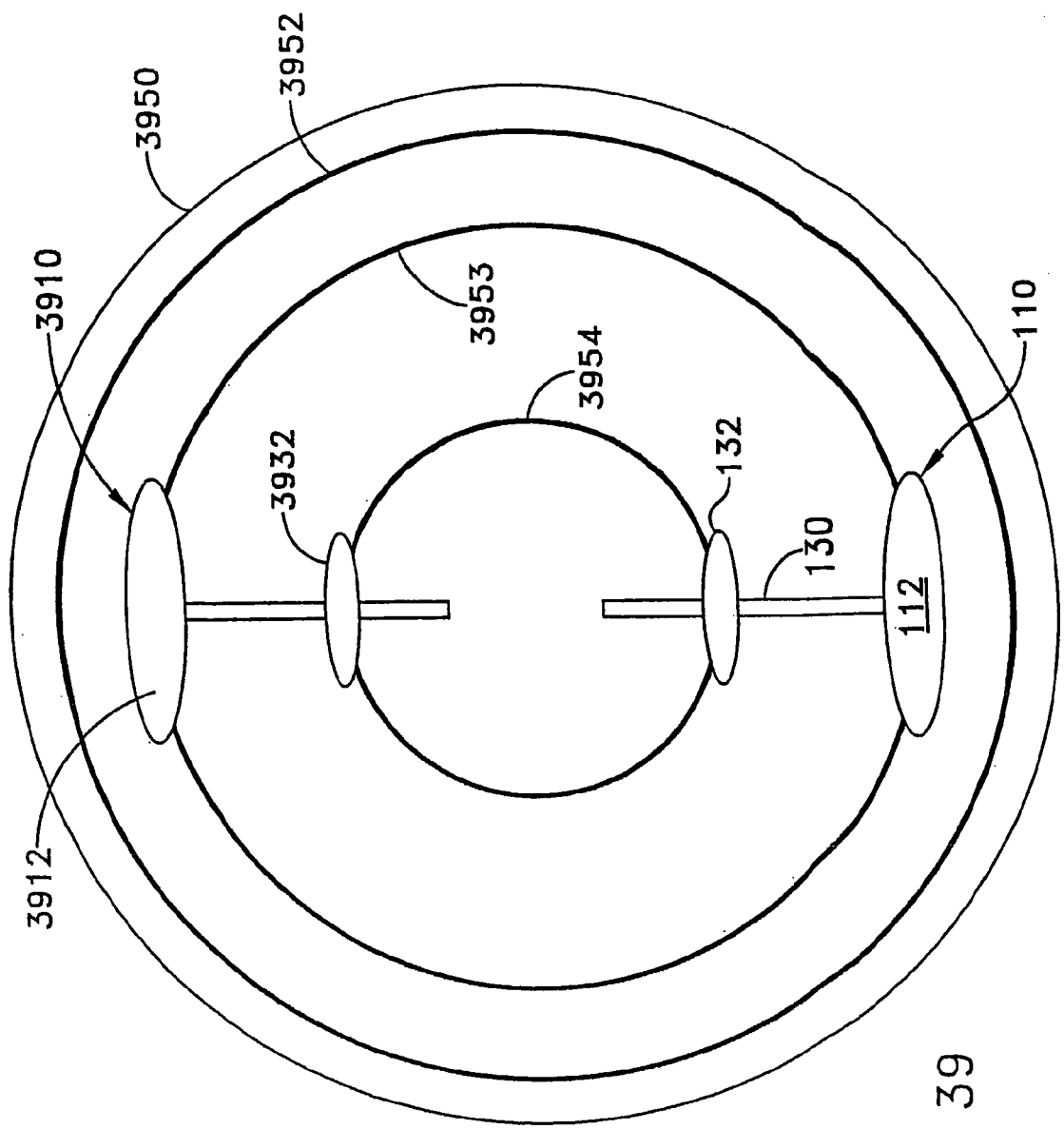
FIG. 39 shows a variation of the system of FIG. 38, in which the multiple arrays have respectively different tracks.

FIG. 39 shows another embodiment of a multiple frequency system, in which the second array assembly 3910 uses a different outer track 3953 from the track 3952 used by array assembly 110. In FIG. 39, both array assemblies 110 and 3910 share the inner track 3954, but in other embodiments, the array assemblies 110 and 3910 may have separate inner and/or outer tracks. In embodiments having more than two array assemblies 110, each array can rotate about a separate outer track. This option may be useful if the tracks 3952 and 3953 are used to transmit different power levels or signals to the respective arrays 112 and 112'.

Although the angle between the normal to the array 112 and the ground may be controlled by varying the diameters of wheels 114 and 132, the use of separate tracks provides an alternative method of controlling the angle between the normal to the array 112 and the ground. As the difference between the diameters of the inner and outer tracks increases, the angle between the normal to the array 112 and the ground decreases.

Internal Gravity Drive

FIGS. 10–13 show an example of a second type of azimuth drive system 260, using a gravity drive. Items which are the same as shown in the embodiment of FIGS. 3–9 have the same reference numerals in FIGS. 10–13. This drive system 260 performs the steps of moving a weight 201 to relocate a center of mass of a wheel 114 on which a radar array 112 is mounted, allowing the wheel to roll under operation of gravity, and guiding the wheel to revolve around a platform 150, thereby to adjust the azimuth position of the radar array. When the center of mass CMW of the wheel 114 moves, a moment results, causing the wheel to rotate. The array assembly 210 seeks a new equilibrium position in which the center of mass is at the bottom, as close to the platform as possible. Thus, the array assembly 210 rolls till the center of mass CMW is directly beneath the axle 130. The principle of operation of this embodiment is to relocate the center of mass CMW of the wheel 114 to have an angular position about the axle 130 corresponding to a desired angular position of the radar array 112. The desired rotation of the array 112 in turn translates into a desired azimuth angle displacement around the platform 150.

Figure 11:
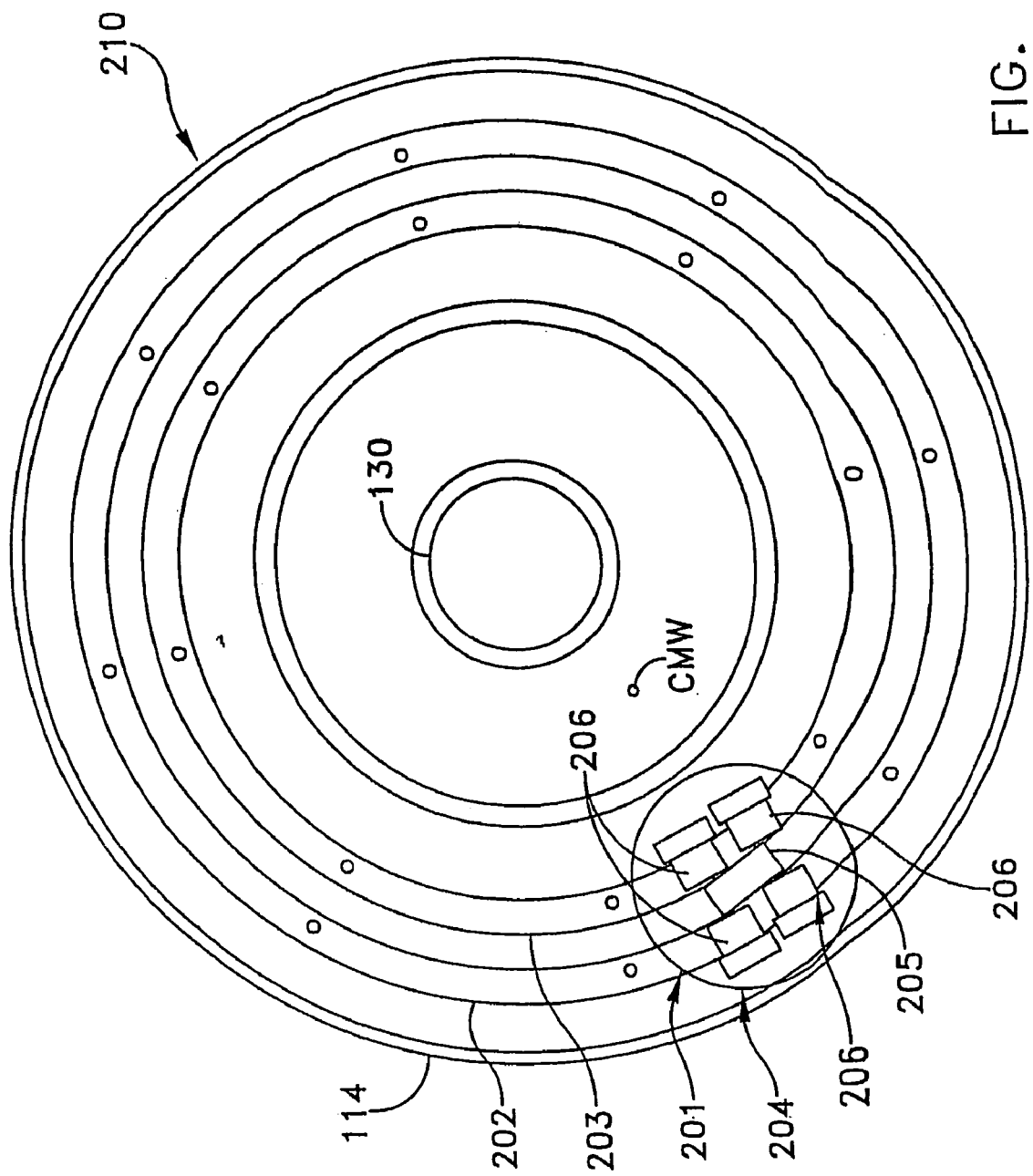
FIG. 11 is a rear elevation view of the radar array shown in FIG. 10.
Figure 12:
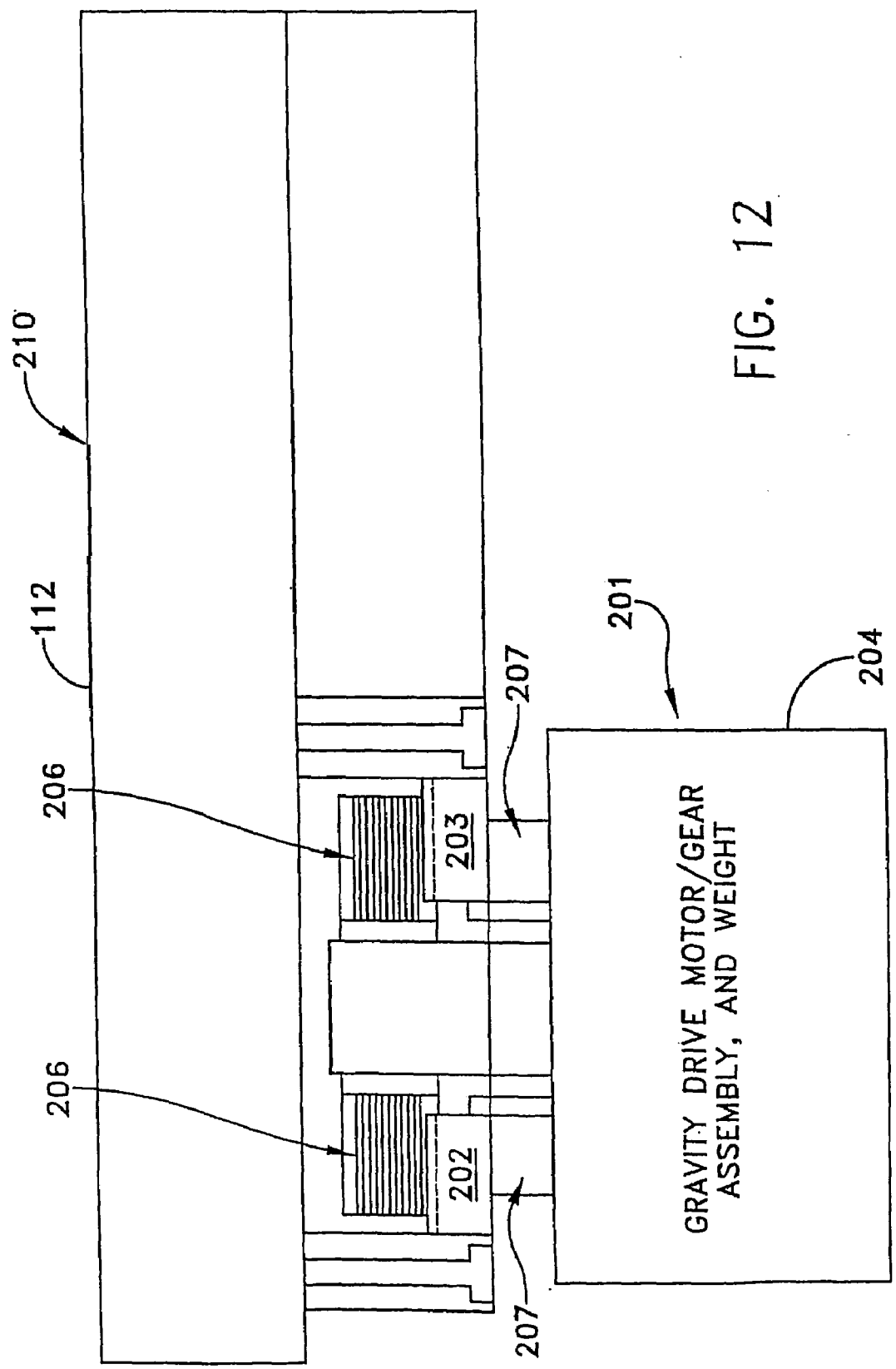
FIG. 12 is a plan view showing the motor-weight assembly of FIG. 11.
Figure 13:
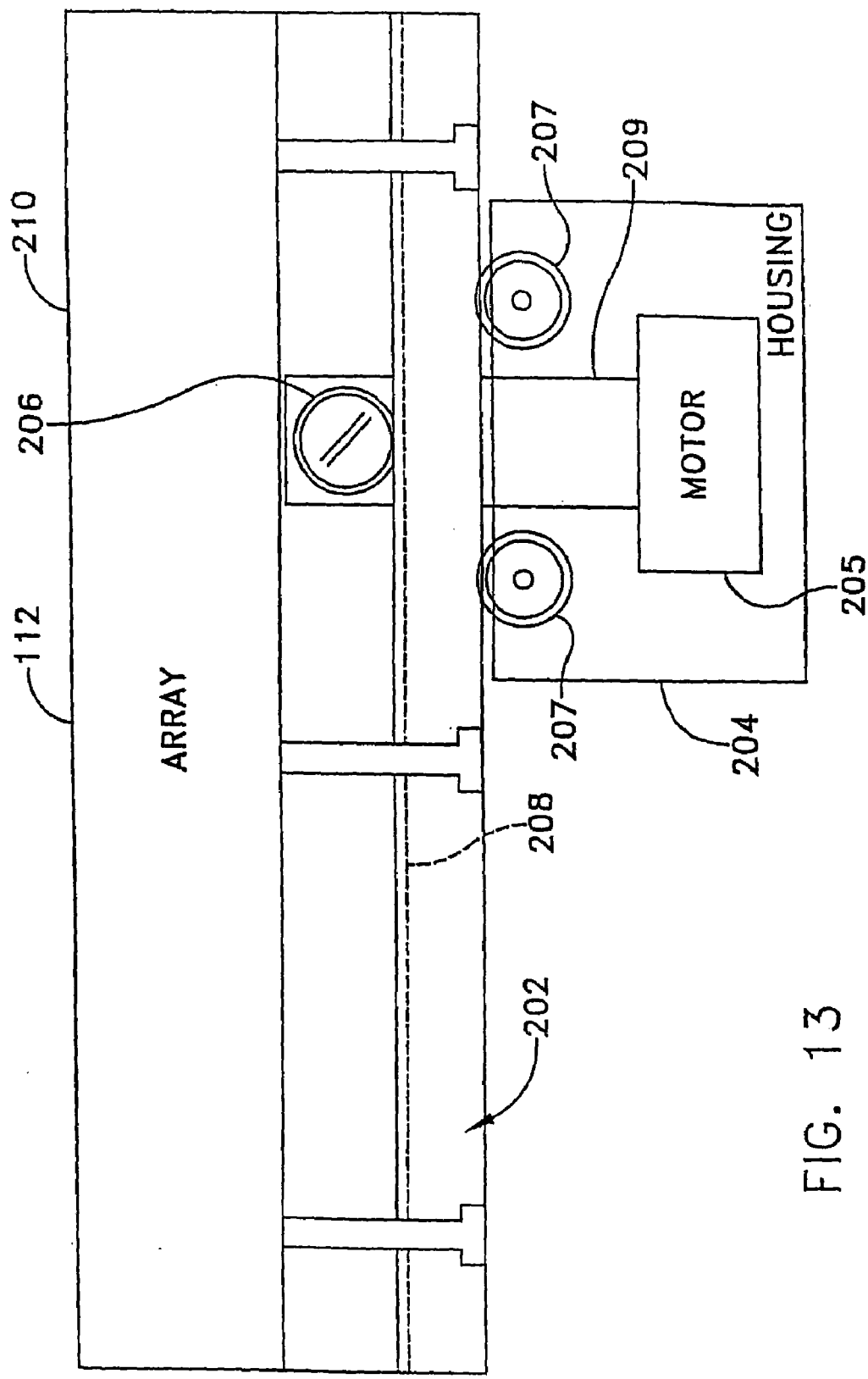
FIG. 13 is a side elevation view showing the motor-weight assembly of FIG. 11.

Drive 260 includes at least one circular track 202 mounted to a wheel 114 on which the radar array 112 is mounted. FIGS. 11 and 12 show both an outer track 202 and an inner track 203. A motorized weight assembly 201 moves along the track(s) 202, 203. A motor 205 is coupled to the circular tracks 202, 203 and is capable of moving along the tracks in the tangential direction, to relocate the center of mass CMW of the wheel 114 on which the radar array 112 is mounted. The motor 205 is contained within a housing 204, along with a gearbox 209 and flanged wheels 207. The flanged wheels 207 lock the assembly 201 to the tracks 202, 203. The gearbox 209 is connected to one or more pinions 206, which accurately move the assembly 201 relative to the tracks. A differential mechanism may be provided, so that the inner and outer pinions subtend the same angle per unit time (i.e., the linear travel of the inner pinions 206 along the inner track 203 is less than the linear travel of the outer pinions along the outer track 202). The inner pinions 206 may either be geared to rotate more slowly than the outer pinions, or the spacing of the teeth 208 (shown in phantom in FIGS. 12 and 13) on the inner track 203 may be slightly less than the spacing on the outer track 202.

In this embodiment, movement of the motor 205 causes the wheel 114 to roll along a path formed by tracks 202, 203 under operation of gravity and revolve about a platform 150. The tracks 202 and 203 are positioned close to the circumference of the wheel 114. This provides the greatest torque for any angular displacement of the motor-weight assembly 201. If the weight of the motor is not sufficient to provide the desired rotational acceleration, then the housing 204 of motor assembly 201 may provide any amount of additional weight desired.

In the embodiment of FIGS. 10–13, the circular first and second circular tracks 202 and 203 provide power and ground to the motor 205. This simplifies the design of the mechanism.

The azimuth drive of FIGS. 10–13 also includes a servomechanism (not shown in FIGS. 10–13) that controls movement of the motor 205. The servomechanism can be driven by a positional servo to cause the radar array 112 to revolve about the platform 150 to a specific desired position, or the servomechanism can be driven by a constant angular velocity servo to cause the radar array to revolve about the platform with a constant angular velocity. The control for the gravity drive mechanism of FIGS. 10–13 is somewhat more complex than the control of the bullring gear 170 described above.

For example, consider the case where it is desired to move the array 112 to a fixed position. If the motor-weight assembly 201 is moved away from directly beneath the axle 130 to any other fixed position, an underdamped natural oscillator is formed. That is, the array 112 would tend to roll past the equilibrium position and then roll back past the equilibrium position again, and the cycle is repeated. To prevent the oscillations, the motor 201 can be moved backwards before the array reaches the desired position. This causes the assembly to decelerate as it reaches its destination.

One of ordinary skill in the control arts can readily provide a control circuit to control the weight assembly to avoid overshooting the destination angle. For example, a tachometer may be placed on the axle 130 to measure the relative rotational rate between the motor assembly 201 (including the weight 204, the drive motor 205 and the gear box 209) and the axle 130, and the difference can be fed to a constant velocity servo. Then, position feedback (described further below) can be provided to a position servo. This will allow the array assembly 210 to be slewed to a certain spot. To keep at a constant velocity, the tachometer may be used. The tachometer output can be integrated to provide position information. Alternatively, because the position of the array can be measured, the derivative of the position provides the velocity. To use as few mechanical parts as possible optical feedback can be used to obtain position or velocity feedback for the servo. Operation is similar to the first servo diagram in FIG. 3, except instead of the position sensor being a synchro or tachometer it could just be an optical feedback.

When the internal gravity drive mechanism 260 is used to train the array 112 at a specific azimuth position, three general techniques may be used. First, the motor-weight assembly 201 (and the array 112) can always be moved in the same direction. This approach may cause uneven wear on the tracks 202, 203 and pinions 206. Second, motor-weight assembly 201 (and the array 112) can be moved in a direction that requires the least travel from the current position of the motor-weight assembly. In some cases, where the wheel 114 travels by a distance greater than the circumference of the track 202, the assembly 201 must move more than 360 degrees around the track 202 regardless of the direction chosen. In the third scheme, the direction of rotation of motor-weight assembly 201 can alternate each time the array 112 is moved, so that any wear on the tracks 202, 203 and pinions 206 is more even.

Using the internal gravity drive to operate the array in a constant azimuth velocity mode is simpler. The motor-weight assembly 201 is simply rotated around the tracks 202, 203 at the same angular rate as the desired rotational speed of the wheel 114 to provide the desired azimuth velocity. That is, to have the radar array 112 revolve around the platform with an azimuth angle velocity $T_1$ (in radians per second) about the axis "B", the wheel 114 must roll at a (linear) speed of $T_1*R1$, where R1 is the radius of the track 152 on which wheel 114 moves. For the wheel 114 to roll at this linear speed, the angular speed $T_2$ of the wheel 114 about its own axis "A" must be given by $T_2=T_1*R1/R2$, where R2 is the radius of the wheel 114. The motor-weight assembly 201 must then revolve around the tracks 202, 203 with the same angular velocity $T_2$. It is understood that there is a transient response, as the wheel 114 speeds up from a velocity of zero to a velocity of $T_2$. The transient response is recognized and factored into the radar signal processing, using array angular position sensing, described further below.

Although the exemplary internal gravity drive includes the tracks 202, 203 on a wheel 114 at the end of an axle 130, the wheel may be a separate wheel attached to the same axle.

In the case of a conical array assembly 715 or a frustum shaped array assembly 710 of the types shown in FIG. 33, the wheel may be at or near the base of the conical or frustum shaped housing, in which case the radar array 112 may be mounted to the wheel. Alternatively, the wheel to which the gravity drive is mounted may be an annular flange or baffle inside such a conical or frustum shaped array assembly.

The self-contained gravity drive system allows the use of arbitrarily large tracks for large virtual arrays (described below in the "signal processing" section) with no increase in array complexity.

Internal Gravity Drive with Moment Arm

Figure 14:
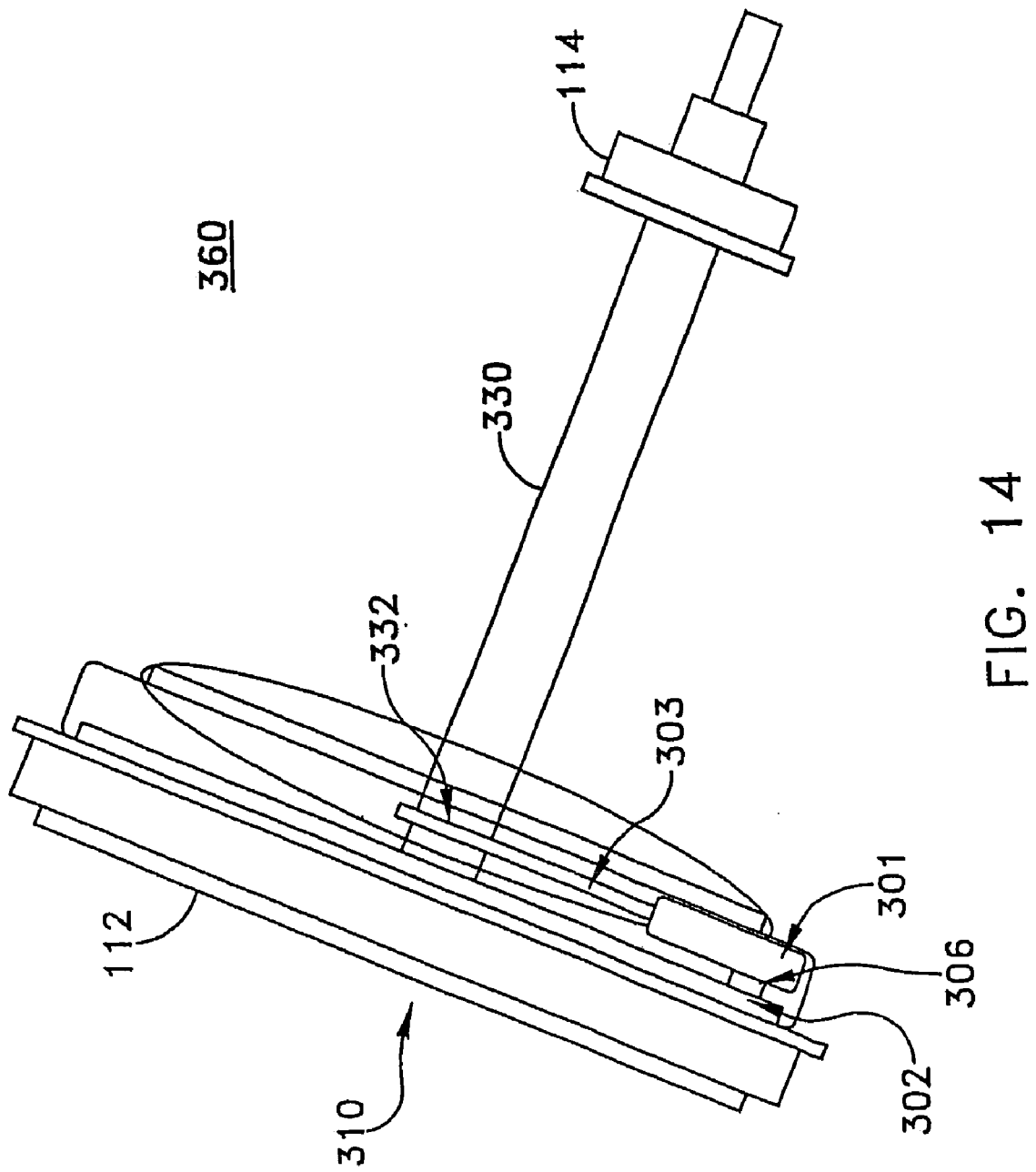
FIG. 14 is a side elevation view of a variation of the azimuth drive mechanism of FIG. 10.

FIGS. 14 and 15 show another variation 360 of the internal gravity drive. The drive 360 includes a moment arm 303 having one end pivotally mounted to the axle 330 (by a bearing 332 rotatably mounted on the axle 330) and another end connected to the motor assembly 301. The moment arm 303 supports the motor assembly 301, while allowing the motor to revolve around the axle 330 as the motor moves along the circular track 302. The drive 360 only requires a single track 302, because of the added support provided by the moment arm. Motor assembly 301 can operate with a single pinion gear 306, because there is only one track 302. Because only a single track 302 is involved, the problem of providing differential movement of the pinions about the two tracks is obviated. Also, the motor assembly 301 need not be mounted rigidly to the rail 302. The moment arm 303 holds the motor assembly 301 in place with respect to the axle 330. Instead of the flanged wheels 207 that lock the assembly 201 to tracks 202 and 203, motor assembly 301 can use rollers or bearings that merely rest on the track 302.

With the moment arm 303 present but only a single track 302, a different power transmission technique is used to provide power to the motor assembly 301. For example, in FIG. 15, the axle 330 has first and second commutators 331 for providing power and ground, respectively, to the motor assembly 301. The moment arm 303 has a pair of brushes or rolling surface contacts 333 that form power and ground connections with the first and second commutators 331, respectively. Rolling surface contacts cause less wear on the commutators 331, and may be preferred for that reason. The rolling surface contacts 333 may be spring loaded to ensure adequate contact with the commutators 331. Inside the moment arm, lines (not shown) are provided to transmit the power to the motor assembly 301.

With a moment arm 303, it is possible to have a motor located in the axle 330 provide the torque to rotate a weight around the circumference. However, the configuration in FIGS. 14 and 15 has the advantage that a motor that provides a much smaller torque can be used if the motor is located near the circumference. The configuration of FIGS. 14 and 15 also provides better positioning accuracy and less wear on the motor than placing a high torque motor in the center axle 330.

Other moment-based systems may be used to rotate the wheel 114 and/or array assembly 310. For example, a motor at the circumference of the radar array 112 may drive a roller or gear that engages the inner circumferential surface of wheel 114, causing the wheel to roll without rolling the radar array 112. This technique has the advantage that processing the array signals is simpler, because the array does not rotate about its axis "A" when the wheel 114 rolls. This variation may include, but does not require a second wheel 132. It is possible to support the end of axle 130 opposite the radar array 112 using a universal joint or the like.

Alternatively, a motor in or coupled to the axle may apply a torque to rotate the wheel 114 and/or radar array 112 relative to the motor. This variation also would not require a second wheel 132 and could support the axle 130 through a universal joint. It would, however, require a motor capable of producing a greater torque than the other methods described above.

One of ordinary skill in the art can readily construct other drive mechanisms suitable for revolving radar array 112 about the platform 150.

Figure 46:
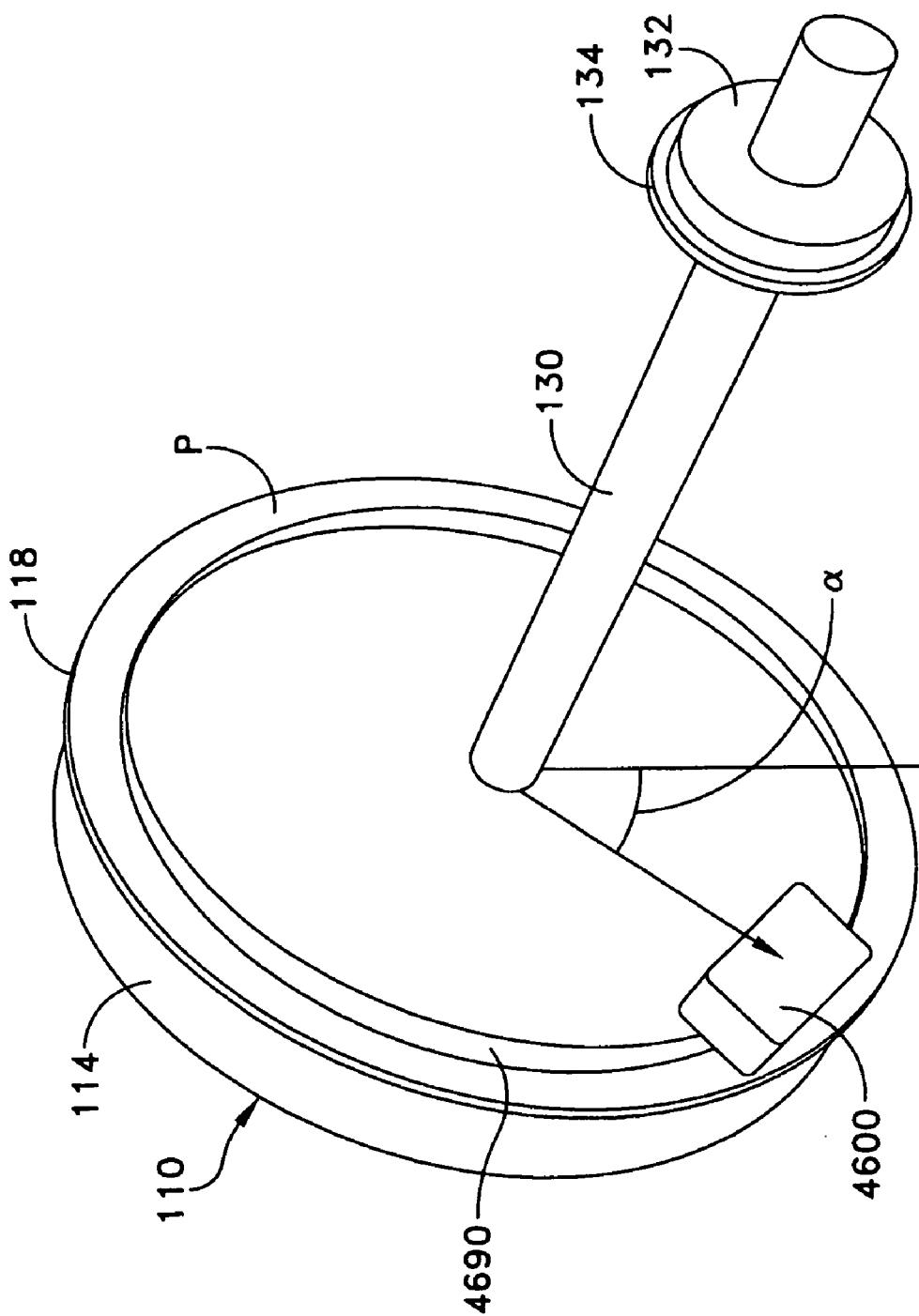
FIG. 46 is an oblique rear view of a rolling radar array assembly illustrating an electromagnetic drive mechanism according to another embodiment of the invention.
Figure 47:
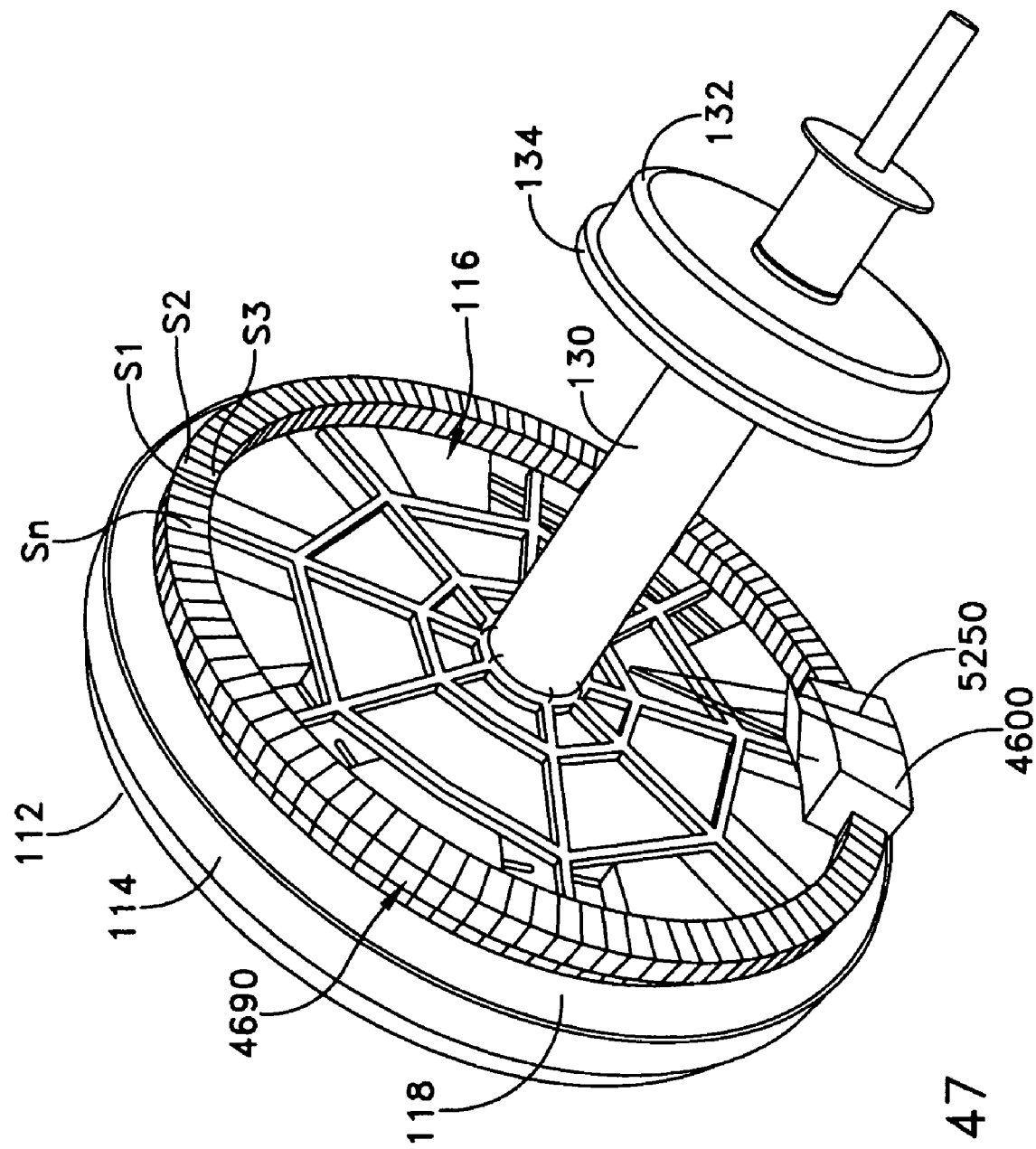
FIG. 47 is a more detailed illustration of an oblique rear view of the electromagnetic drive mechanism of FIG. 46.
Figure 49:
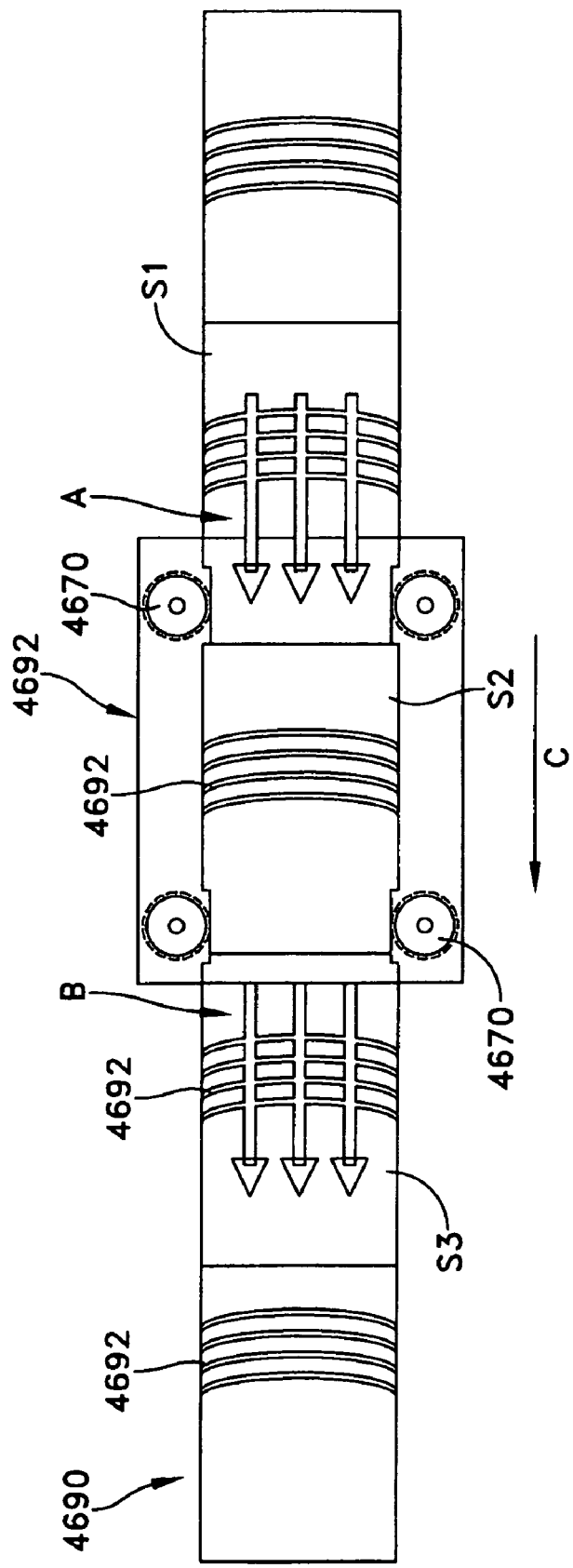
FIG. 49 is a partial side view showing the propulsion principle of the electromagnetic drive mechanism of FIG. 47.
Figure 50:
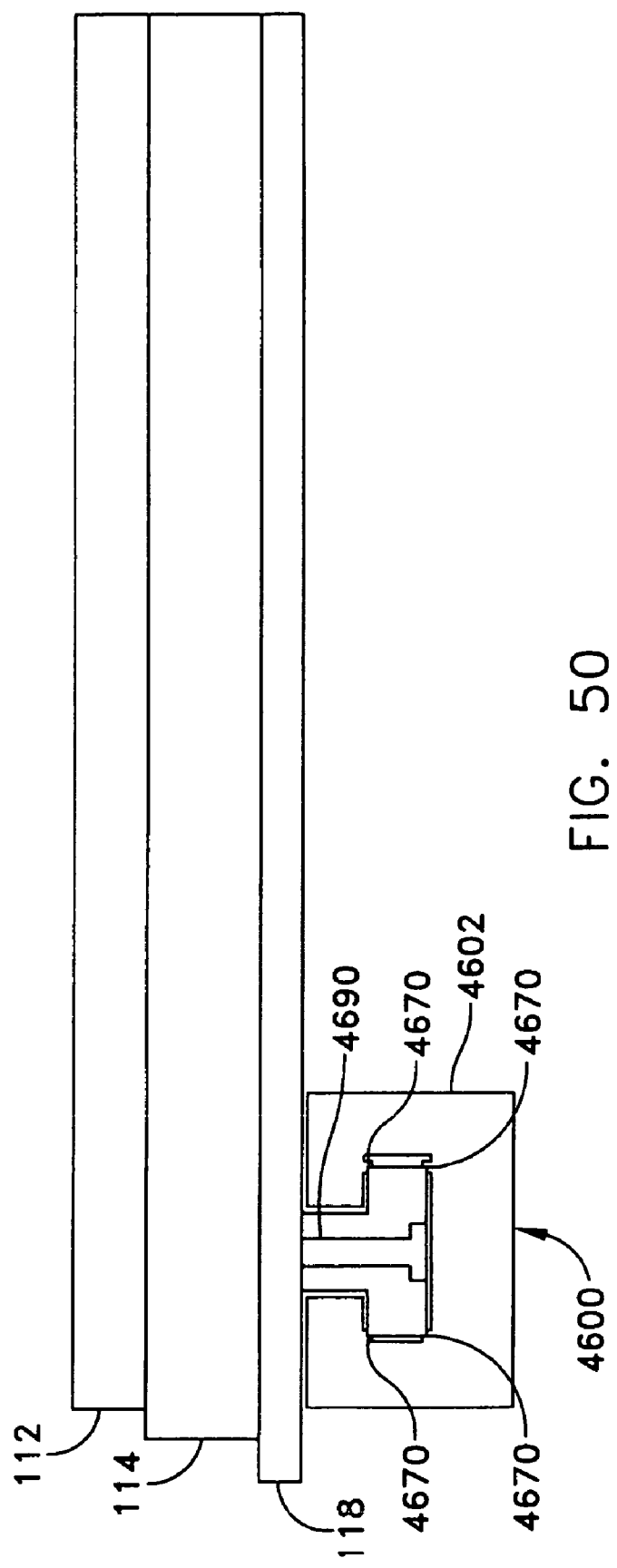
FIG. 50 is a cutaway side view showing a detail of the drive mechanism of FIG. 47.
Figure 51:
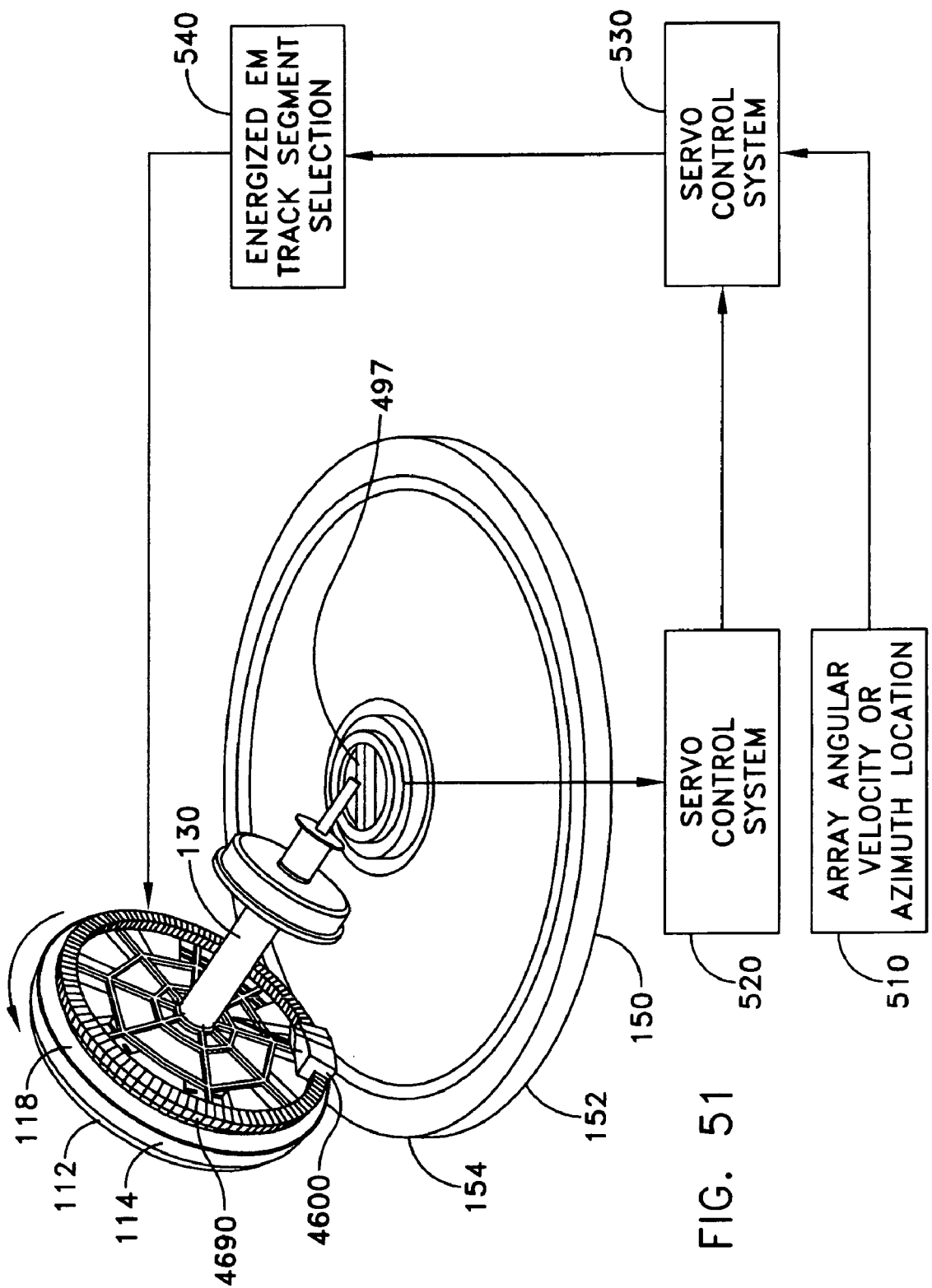
FIG. 51 is a schematic illustration of a control loop for controlling operation of the electromagnetic drive circuitry of the present invention.

For example, in yet another alternative embodiment, and referring now generally to FIGS. 46–51, an azimuth drive system for the rolling axle array comprises a magnetic or magnetized carriage or weight assembly 4600 which is operatively coupled to a segmented electromagnetic (EM) track 4690 mounted to the interior of the array wheel 114. The carriage assembly is constructed at least in part of magnetic or magnetizable material including a peripheral portion thereof and capable of moving along the track in response to an energization of selected portions of EM track 4690 to produce a moment that is used to rotate the wheel about platform 150 (FIG. 51). In one configuration, the carriage assembly is movably attached, via rollers 4670 for example (FIG. 50), to the segmented electromagnetic track 4690 affixed to the rolling axle array wheel near the perimeter P on the circumference of the rear face of the wheel. By mounting the electromagnetic track 4690 near the perimeter P of the array as shown in FIGS. 46–47, a maximum moment may be provided.

FIG. 47 provides a more detailed exemplary illustration of the electromagnetic gravity drive for the rolling radar array assembly depicted generally in FIG. 46. In one configuration, the EM track 4690 is composed of multiple segments S1, S2, . . . , Sn, wherein each of the segments can be independently energized to generate an electromagnetic force operative to either attract or repel the magnetized carriage assembly. The segments may be constructed to have alternating polarities, depending on the application required and the electromagnetic force to be generated.

As one of ordinary skill in the pertinent arts would understand, by properly energizing segments of the EM track, motion of the carriage may be induced. If the track segments are appropriately magnetized (e.g. by individually addressing through sequentially activating/deactivating selected segments of the track according to the present and/or desired location of the carriage assembly and the azimuth displacement and rate thereof), the EM track segments may either pull the carriage along; or can push the carriage; or a combination of both pushing and pulling may be realized.

Figure 48:
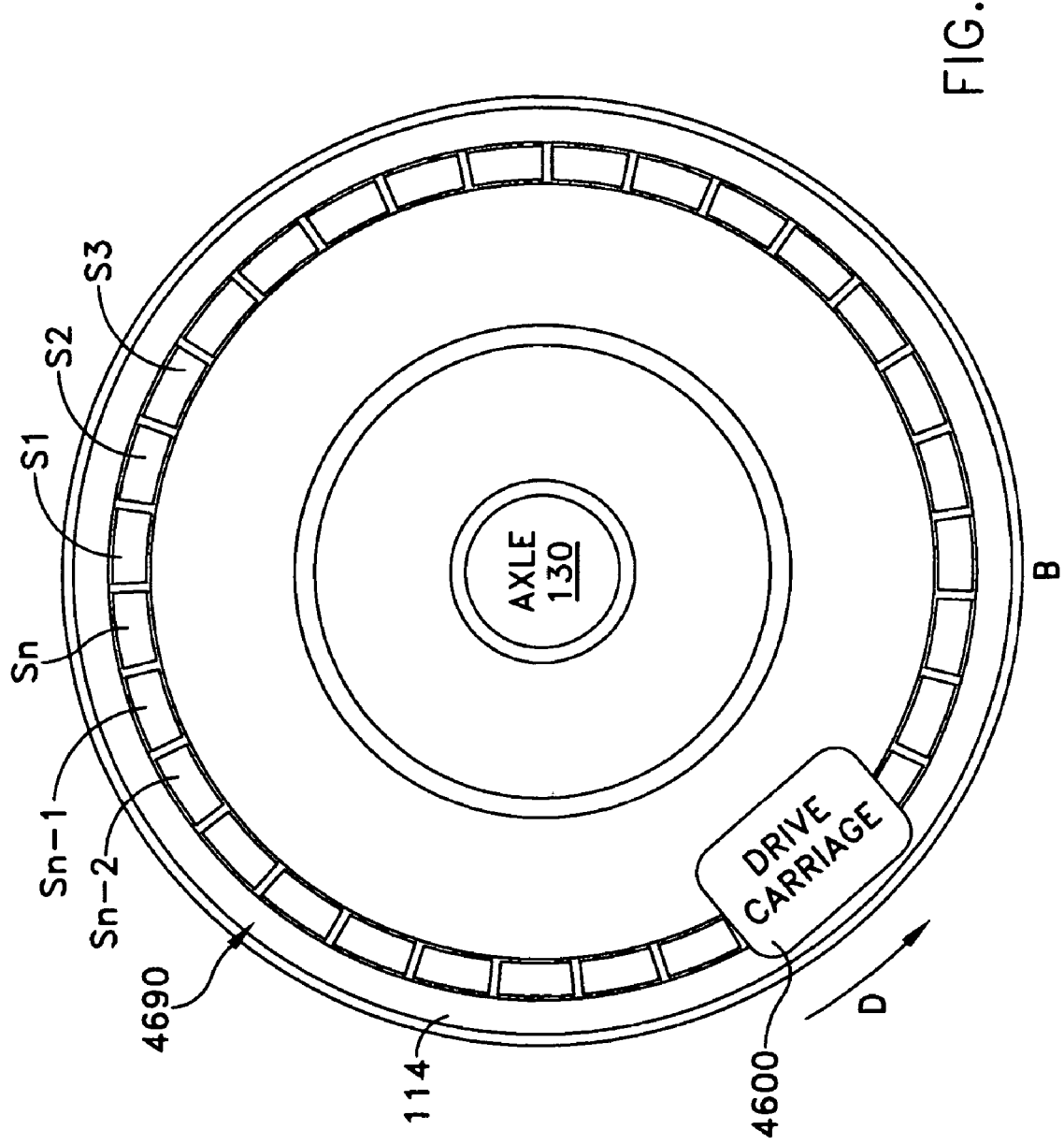
FIG. 48 is a plan rear view showing the carriage weight assembly of FIG. 47.

As best illustrated in FIGS. 48–49, sections S1, S2, . . . , Sn of the EM track 4690 are sequentially energized to create a magnetic force on the magnetized weight or carriage assembly 4600, which will push and/or pull the assembly around the track. Gravity will attempt to pull the weight of the carriage 4600 downward in the direction of D, while the EM track moves the weight assembly 4600 against it. The resulting moment causes the array to roll around the platform 150 along its one or more tracks 152, 154, (FIG. 51) and relies on the friction between the array and its tracks to do so.

The selection of the energized EM track segments may be controlled by control circuitry associated with the radar array such as a servomechanism, which can be driven by either a constant angular velocity servo to rotate the array, or a positional servo for training the array to a predetermined azimuth position, based on array azimuth position and velocity. In one configuration as illustrated generally with respect to FIGS. 46 and 51, a servo loop will maintain a constant angle $\alpha$ between the carriage position and the bottom B of the wheel and thus provide constant angular velocity for the array assembly to roll about the platform. By utilizing an electromagnetic track about the perimeter of the array, the drive mechanism provides a means for moving the array without the need for an electric motor. This in turn improves the reliability of the device by reducing the number of moving parts while requiring no load bearing bearings and enabling a straightforward system implementation.

FIG. 49 provides a schematic illustration of the electromagnetic gravity drive propulsion principle embodied in the azimuth gravity drive system of the present invention. As shown therein, the electromagnetic track 4690 is segmented into sections S1, S2, . . . , Sn with each section having means of being individually energized to generate a magnetic force capable of inducing motion of carriage 4600 positioned about the track. In one configuration, electric windings 4692 having a given number of turns are respectively disposed upon a corresponding segment S1, S2, . . . , Sn of the EM track for carrying electric current for thereby generating a magnetic force to induce motion of the carriage about the EM track. In the exemplary embodiment of FIG. 49, EM track segment S1 may be energized with a given polarity by means of an electric current and associated electric winding so as to push or repel the carriage away from S1 and in the direction of arrows A, while EM track segment S3 may be energized with a polarity so as to attract the carriage toward S3 and in the direction of arrows B, thereby inducing motion of the carriage in the direction C. During this time, section S2 may not be energized and thereby allow carriage 4600 to move via rollers 4670 along EM track 4690 in the direction C. FIG. 50 illustrates a transparent cutaway side view of the carriage assembly 4600 and electromagnetic track 4690 wherein the assembly housing 4602 constructed of a magnetic or magnetized material includes flanged wheels or rollers 4670 operable to lock the assembly onto the track 4690 which is mounted onto wheel 214 of the array via flange 118.

FIG. 51 illustrates an exemplary servomechanism loop control system capable of selectively energizing the EM track segments in order to drive the carriage assembly to cause the radar array 112 to revolve about the platform 150 to a specific desired azimuth position. The servomechanism can be driven by positional data including array angular velocity or azimuth location information (block 510) and array sensor feedback data including array orientation and azimuth information (block 520) for input to servo control unit 530. The control unit 530 responsive to the input positional data 510, 520 operates to selectively energize the EM track segments (block 540), which are preferably of uniform size and structure, in order to induce and maintain a smooth carriage motion and control the radar as it rolls about the platform.

Angular Position Sensing

It is important for the processing of any signals received by the array 112, and for any servomechanism used to rotate or position the array, to know the position of the array 112 in azimuth, and the array's angular orientation at any given time as it rotates about its own axis "A". The array angle determination is unique to an array that rotates about its own central axis.

In a system where the circumferential length of the first track 152 is an integer multiple of the circumferential length of the first wheel 114, the azimuth angle serves as a relatively crude measure of the rotation angle of the radar array 112 about its axis "A." However, over time, positional errors (e.g., due to wheel slippage on the track 152) could add up so that the rotation angle measurement is out of tolerance.

In a more general rolling axle array system 100, it is not desirable to restrict the circumference of the track 152 to even multiples of the circumference of wheel 114. In other words, the radius of platform 150 is not restricted to an even multiple of the radius of wheel 114. In this more general case, there is no one-to-one correspondence between azimuth angle and array rotation angle. The array 112 can revolve in the same direction about the axis "B" of the platform 150 any number of times, and each time there is a different array rotation angle when the array 112 passes through the zero azimuth angle position. Although it is theoretically possible to determine the rotation angle if the complete history of the rotation of the array 112 is known, such a measure would be subject to the same positional errors mentioned above for the integer relationship between track and wheel circumferences. Therefore, it is desirable to make a direct measurement of the rotation angle of the array.

It is desirable to achieve this position determination without adding any mechanical links between the array assembly 110 and its stationary platform 150. (For purpose of describing the angular position sensing system, the reference numerals of FIGS. 1–9 are used, but similar techniques may be used with the systems of FIGS. 10–15.). Either an active system or a passive system may be used for this purpose.

Axle Mounted Optical Bar Code

Figure 16B:
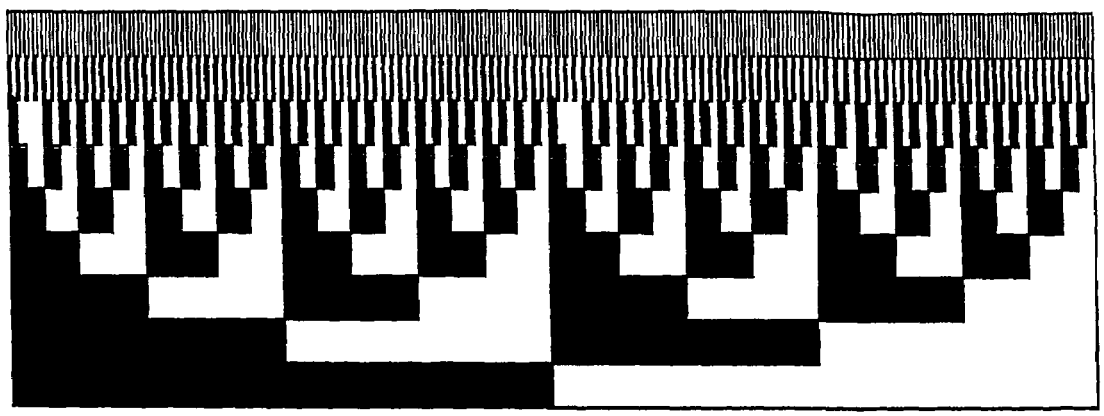
FIG. 16B shows the bar code pattern of FIG. 16A "unwrapped," with zero degrees at the top and 360 degrees at the bottom.
Figure 16A:
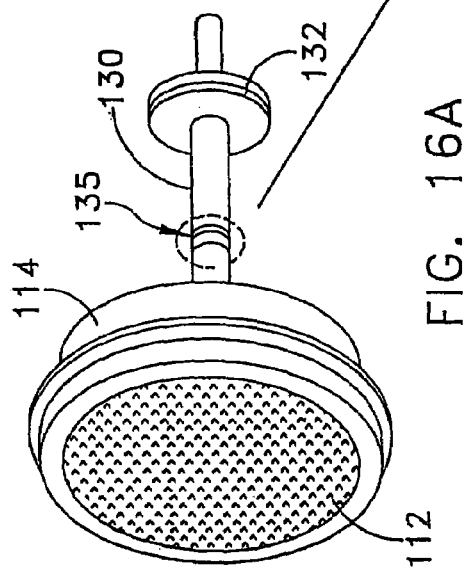
FIG. 16A is an isometric view of an array assembly having a bar code pattern on the axle.
Figure 17:
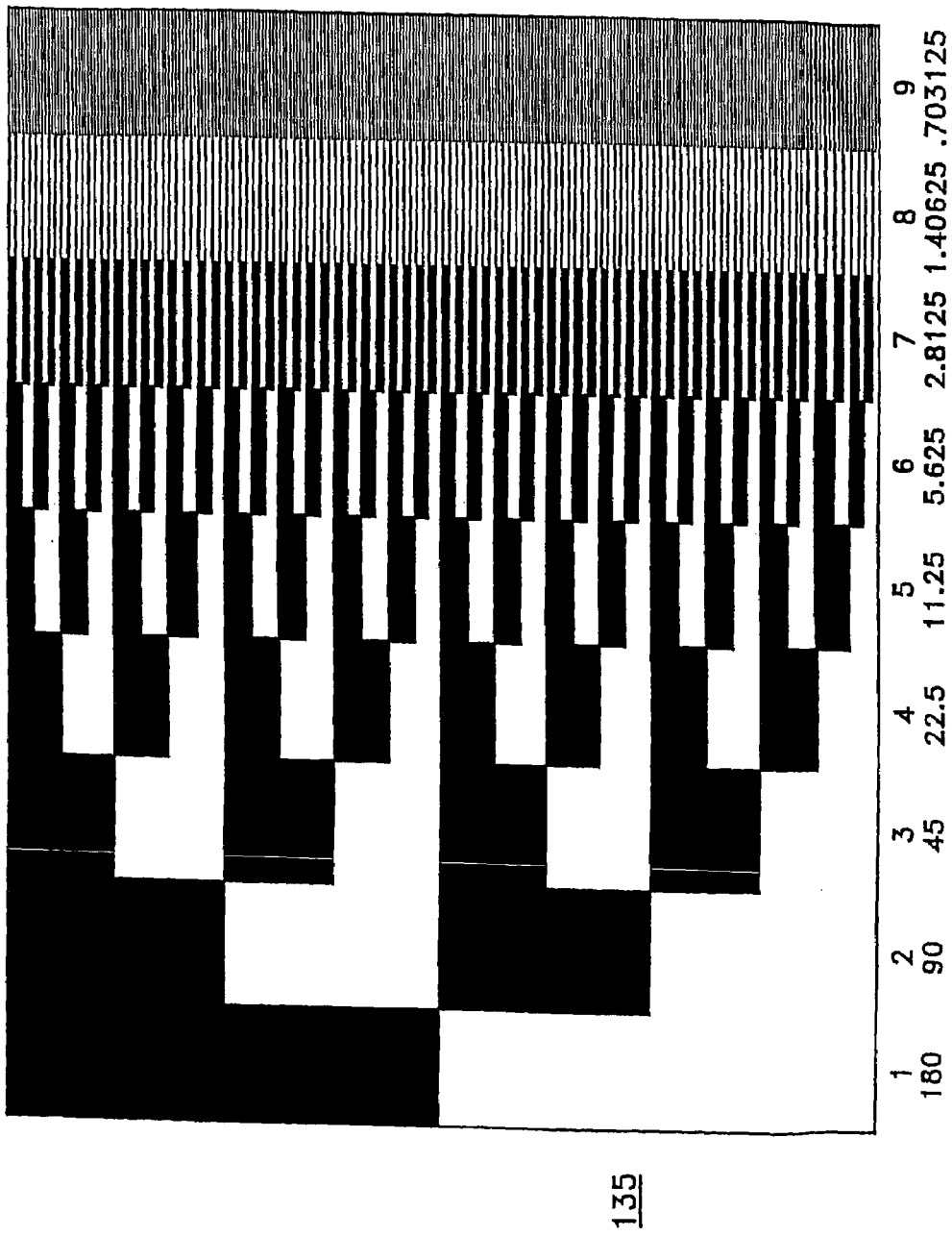
FIG. 17 is a stretched view of the bar code of FIG. 16B, showing the precision attainable with each additional bit of data.

Reference is again made to FIGS. 4–6, which show a first exemplary position sensing system using an axle mounted bar code 135. FIG. 16A shows an exemplary marker—bar code 135—that can be read by the system in FIGS. 4–6. The marker 135 wraps completely around a perimeter of the axle 130, allowing measurement at any array rotation angle. FIG. 16B is an enlarged detail of FIG. 16A, showing the bar code 135 in an "unwrapped" state, laid flat. FIG. 17 is an exaggerated view of the bar code 135, in which the horizontal dimensions are exaggerated to better show the angular resolution and the correspondence between bits and degrees of precision. The first column has two bars, the second column has 4 bars, and so on. The angle resolution (in degrees) is equal to $360/2^b$, where b is the number of columns of bars. With nine columns of bar codes, resolution down to 0.7 degrees is achieved. In practice, 12 or 13 columns or more may be used, to achieve precision of 0.09 or 0.04 degrees, respectively. The bar code at any angular position is read by scanning across the bar code 135 in the direction parallel to the axis "A" of the array 112. Given the orientation shown in FIG. 17, a horizontal row of the bars is scanned. (It is understood that in operation, the array 112 and the marker 130 can be tilted in any orientation). The code read has nine bits, each identified by a black or white region. The corresponding rotation angle is easily determined from this binary representation of the angle.

Referring again to FIGS. 4–6, the bar code reading mechanism may be conveniently located on the azimuth drive brackets 162. The position sensing system for radar array 112, comprises a marker, such as bar code 135 located on a portion of array assembly 110, and an optical sensor 136 that detects the marker to sense an angular position of the radar array, as the radar array rotates about its axis "A" normal to a radiating face of the radar array 112 during operation.

In the example of FIG. 4, the marker 135 is located on an axle 130 of the array assembly 110, which is in turn connected to the wheel 114, on which the radar array is mounted on the wheel. In other embodiments (not shown), the marker may be positioned in other locations that can be read to provide an angle measurement, including, but not limited to, markings on either the first wheel 114 or the second wheel 132, or the rear face of the housing of the radar array 112.

In the system of FIGS. 4–6, the marker 135 includes the optical bar code pattern of FIGS. 16A, 16B and 17, and the optical sensor 136 may include a conventional scanner, such as a bar code reader. The bar code reader can be positioned at any location on the assembly that revolves around the platform 150 with the radar array 112, but does not rotate about the axis "A" of the array. For the bullring gear drive system of FIGS. 3–9, the sensor 136 can be mounted to the movable portion 172 of the bullring gear, the platform 167, or to any structural members attached to the movable portion 172 or the platform 167. In the example, two optical sensors 136 are attached to a portion of a drive system that causes the array assembly 110 to rotate, namely, the bracket portions 162. This location is convenient because it allows the sensor 136 to be placed very close to the bar code. The system can be operated with a single bar code reader 136, and the second unit can be provided for redundancy. Alternatively, the second reader 136 may be omitted.

One of ordinary skill can readily determine a desirable location to mount an optical sensor 136 corresponding to any given location of the marker 135. For example, in a smaller array (not shown) where the bullring gear 170 can be near the circumference of the platform 150, the marker can be placed on the circumferential surfaces of the first wheel 114 (e.g., behind flange 118). In this configuration, the sensor 136 may be positioned on the movable portion 172 of the bullring gear 170, or on a platform 167, with the sensor facing up towards the circumferential edge of the array.

Figure 18:
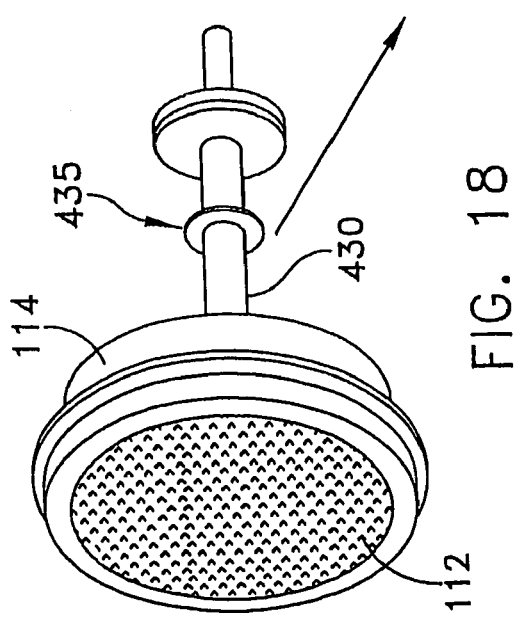
FIG. 18 is an isometric view of an array assembly having an optical encoding disk on the axle.
Figure 20:
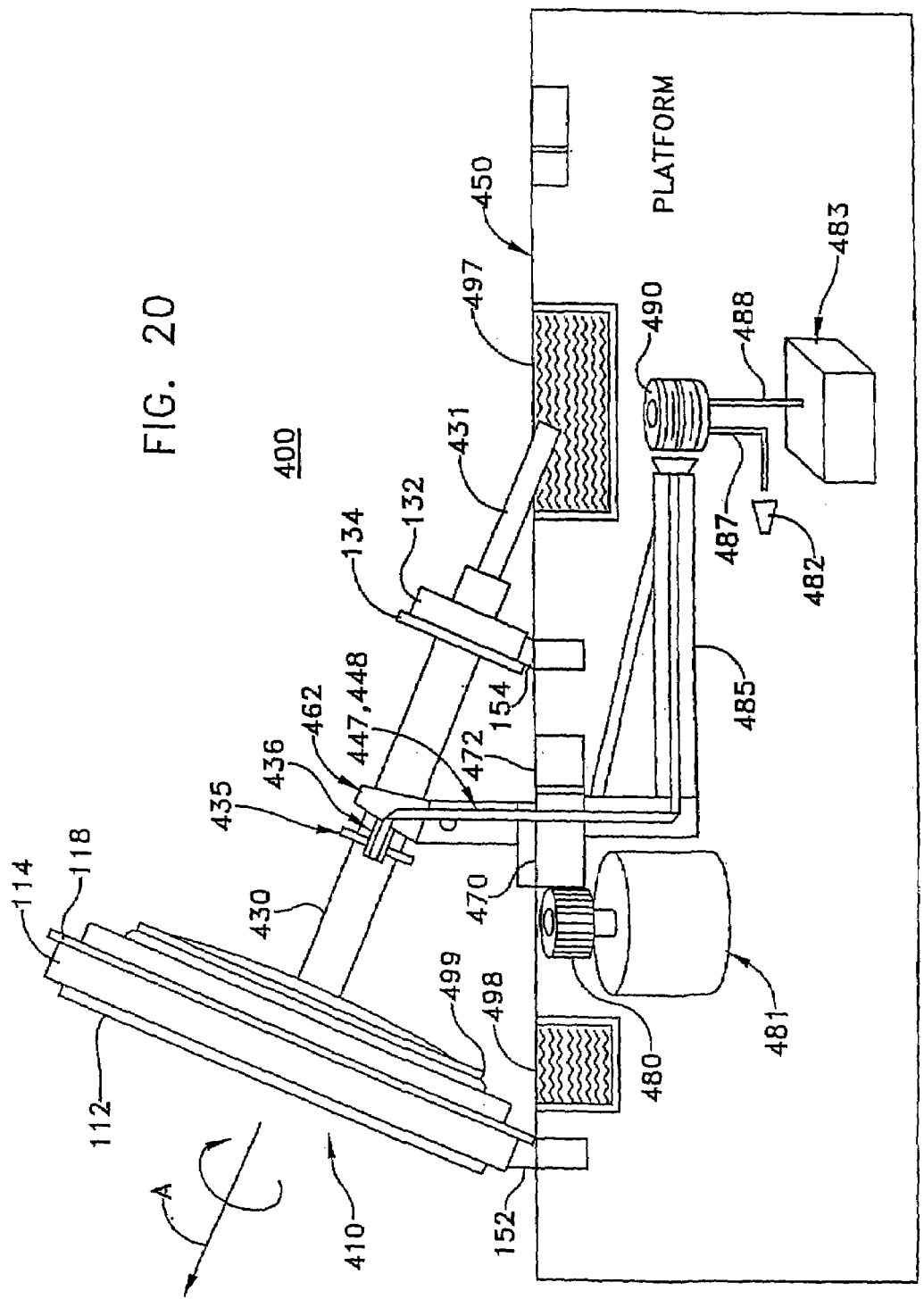
FIG. 20 is a side elevation view of a system including the optical encoding disk of FIG. 19, with an optical reading apparatus and a passive fiber optic link.

Alternatively, the marker may be a disk shaped pattern placed on the rear surface of the radar array 112 itself, in which case the sensor 136 can be mounted on one of the brackets 162 facing the array, or on a separate bracket coupled to movable ring portion 172. (An exemplary disk shaped pattern is described below in reference to FIG. 18.). Or the marker may be applied to the front surface of the second wheel 132, in which case the sensor can be mounted on the rear of the bracket 162, or on a separate bracket coupled to movable ring portion 172.

Although the exemplary embodiment of FIGS. 16A, 16B and 17 is an optical bar code 135, other markers may be used. For example, instead of bar codes, the marker may contain machine readable characters. Alternative embodiments include areas having a plurality of respectively different gray scale measurements, or a plurality of respectively different colors.

Although the optical bar code 135 is read by sensing reflected light, it would also be possible to replace the white regions of the pattern with transparent regions. Then the pattern could be illuminated from inside the axle, without using the scanner 136 to provide illumination. Techniques for processing light from a backlit pattern are discussed in greater detail below, with reference to FIGS. 18–23.

The optical bar code system described above maintains the desired freedom from mechanical links encumbering the rolling array assembly 110, so that the assembly is free to roll around the tracks 152, 154.

Angular Position Sensing Using an Optical Encoding Disk

As noted above, the optical sensor 136 is active. It shines a light on the bar code 135, receives a reflected pattern, and transmits a signal representing the pattern back (for example, using an optical link) to a receiver for use in processing the signals returned by the radar array 112. Alternative systems transmit the raw light data back for processing in the system signal processing apparatus.

Figure 19:
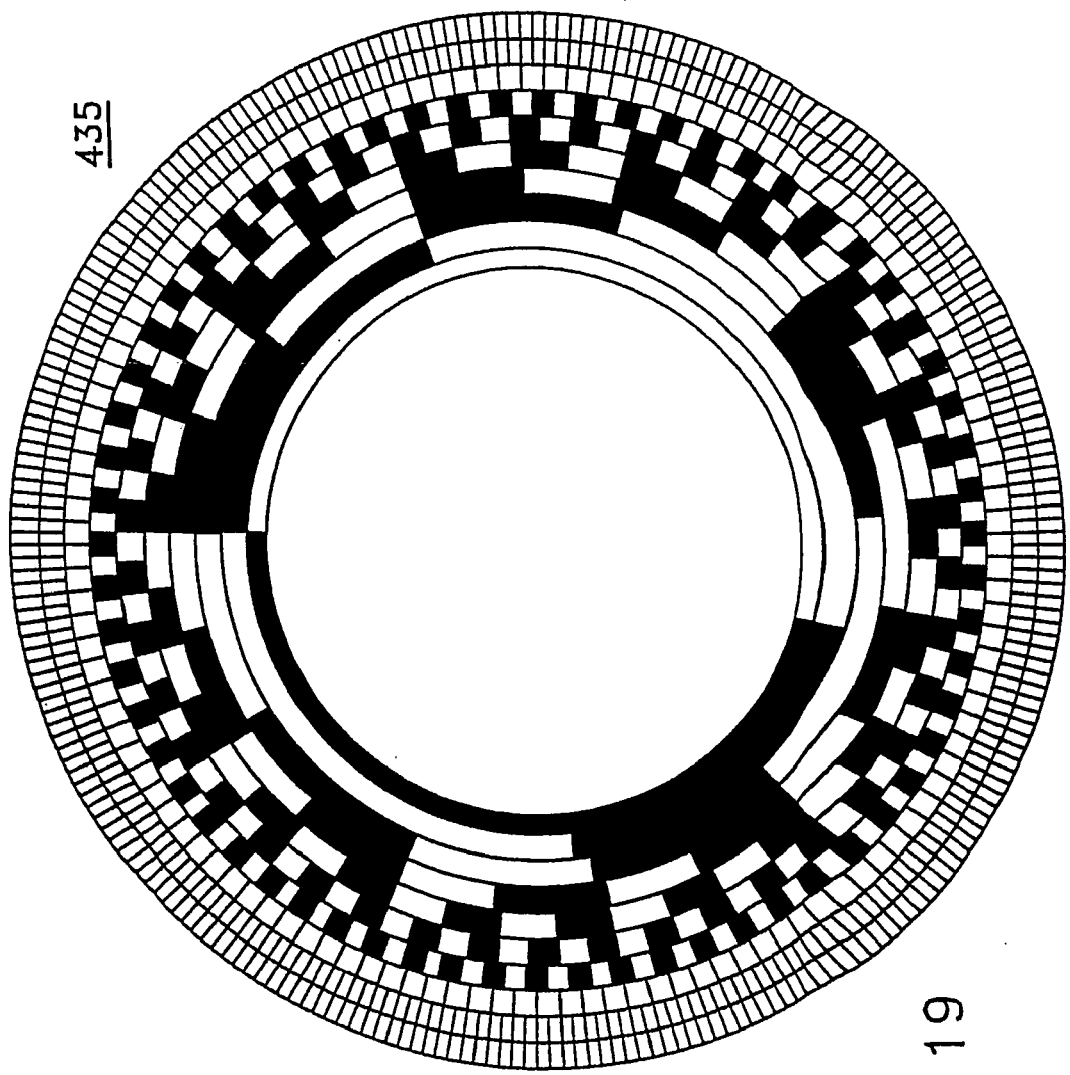
FIG. 19 is a front elevation view of the optical encoding disk of FIG. 18.

FIGS. 18–24 shows a radar array assembly 410 having a variation of the angular position sensing system using an optical encoding disk 435. Components in system 410 that can be the same as the components of FIGS. 3–9 have the same reference numerals, and descriptions of these common elements are not repeated. The marker in assembly 410 is a pattern on an optical encoding disk 435 that is mounted to the axle 430 and lies in a plane orthogonal to the axle. As best seen in FIG. 19 (in which radial dimensions are exaggerated for ease of viewing), the optical encoding disk 435 has a binary pattern similar to the pattern 135 of FIG. 17, rearranged in polar coordinates.

The first ring has two bars, the second ring has 4 bars, and so on. The angle resolution (in degrees) is equal to $360/2^b$, where b is the number of rings. With nine rings of bar codes, resolution down to 0.7 degrees is achieved. In practice, 12 or 13 columns or more may be used, to achieve precision of 0.09 or 0.04 degrees respectively. The bar code at any angular position is determined by reading radially across the bar code 435. The corresponding rotation angle is easily determined from this binary representation of the angle.

The disk pattern 135 has an inherent advantage over the rectangular pattern 135, in that, as the radius of a ring of bars increases, the circumference of that ring increases proportionately. By placing the least significant bits (bars) of the pattern on the outermost ring, a greater width is provided for each bar. This makes it inherently easier to have clearly defined bars in the least significant bit position, even when there is a larger number of rings (i.e., greater bit precision). Although it is possible to arrange the disk with the most significant bits on the outside rings and the least significant bits on the inside, such configurations are less preferred.

Another difference between the exemplary optical encoding disk 435 and the pattern 135 is the presence of transparent regions in the disk 435. Instead of black and white regions, the disk 435 has opaque (preferably black) regions and transparent regions. The disk 435 may be, for example, a transparent film on which an opaque pattern is printed, or an opaque layer deposited and etched. Alternatively, the disk 435 may be a photographically developed film.

Because the optical encoding disk 435 is flat, it is easy to shine a collimated light through the transparent regions of the disk, throughout the range of rotation angles of the optical disk. Because transmitted (and not reflected) light is used, there is no need to illuminate the optical encoding disk 435 with a scanner. Instead, the light pattern can be read directly using the disk reader 436. As in the case of the axle mounted bar code of FIG. 17, only one reading device 436 is needed for operation. A second reading device 436 may be provided for redundancy.

The optical reader 436 is best seen in FIGS. 21–24. The optical reader 436 includes a light source 440 that directs light through the transparent regions of the disk 435, and a passive optical receiver 442. Light that is incident on the opaque regions is blocked. In the example shown in FIG. 24, the light source 440 is an optical fiber source array comprising a plurality of optical fibers 441, each transmitting a collimated beam of light to the surface of the optical encoding disk 435. The passive optical receiver 442 is an optical fiber receive array comprising a plurality of optical fibers 443, each aligned with a respective one of the optical transmit fibers 441. Each receive fiber 443 is positioned to receive an individual beam of light from a corresponding light source fiber 441 when a transparent bar on the optical encoding disk 435 passes between that source fiber-receive fiber pair.

Figure 21:
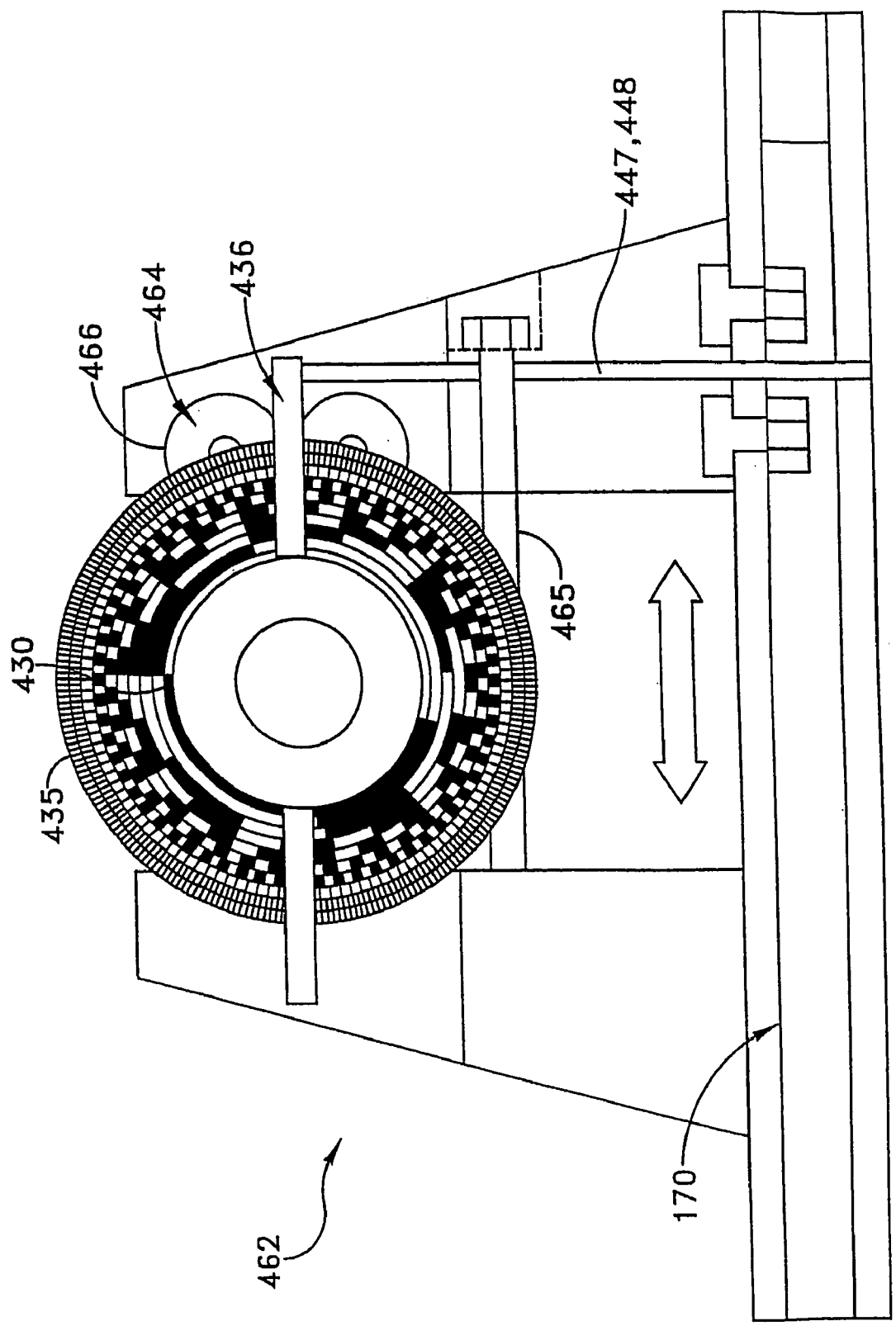
FIG. 21 is a front elevation view of the bracket assembly of FIG. 20.
Figure 22:
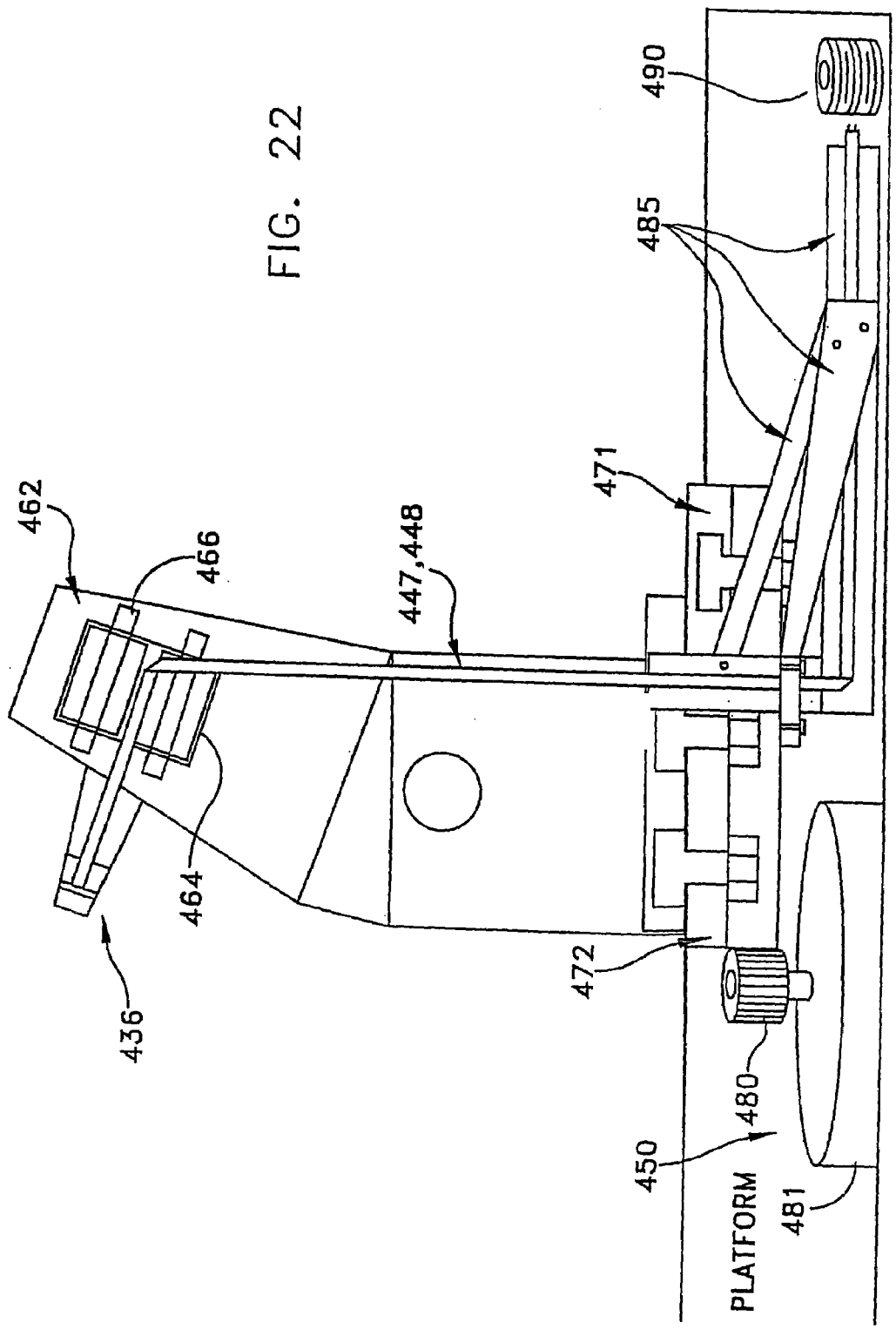
FIG. 22 is an enlarged detail of FIG. 20.
Figure 23:
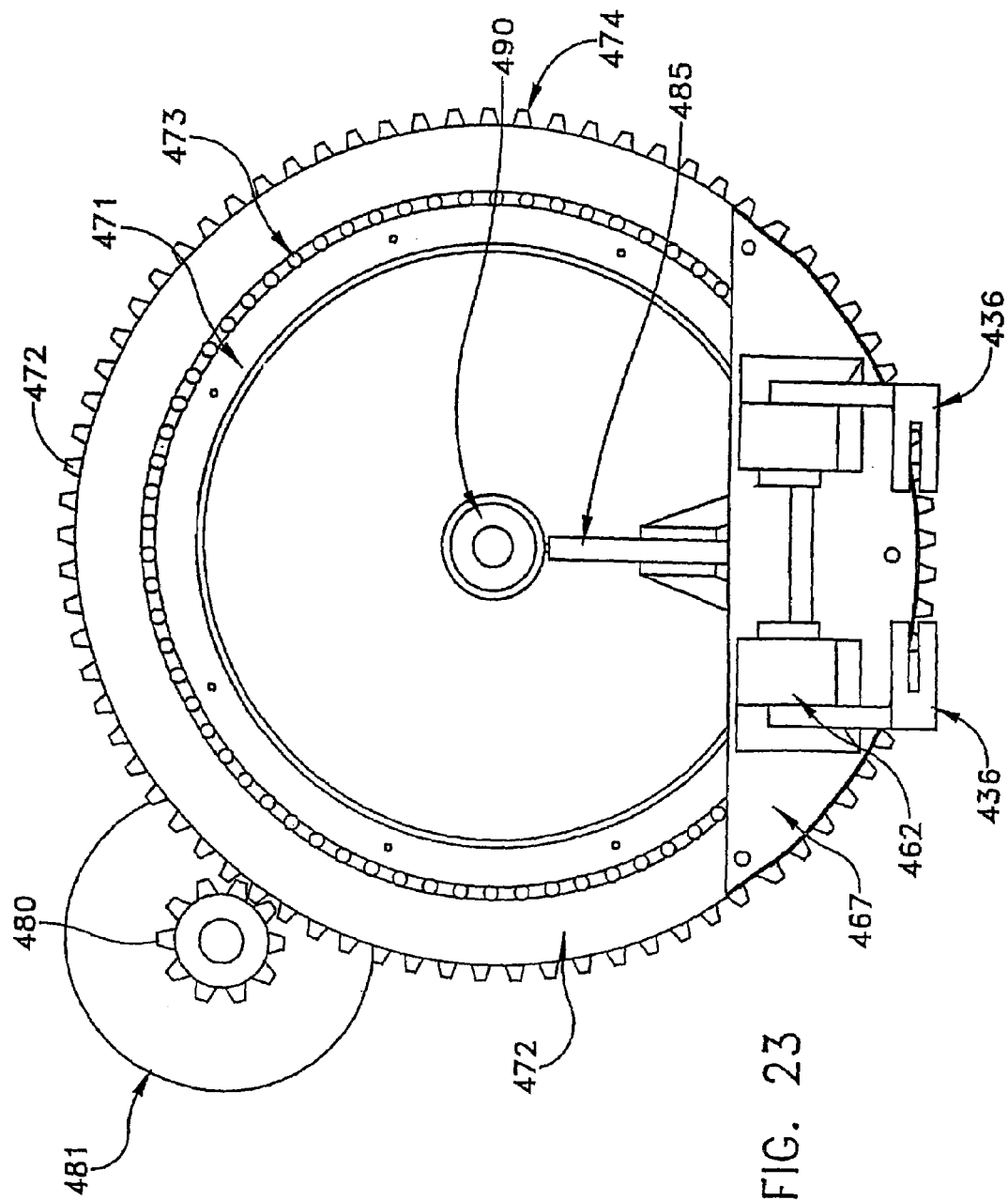
FIG. 23 is a plan view of the assembly of FIG. 20.

As shown in FIGS. 21–23, the exemplary optical reader 436 is located on a portion 462 of the drive mechanism. More specifically, in a drive mechanism that includes at least one bracket 462 portion that pushes against the axle 430 in a tangential direction, the optical sensor 436 can advantageously be located on the bracket portion.

Figure 29:
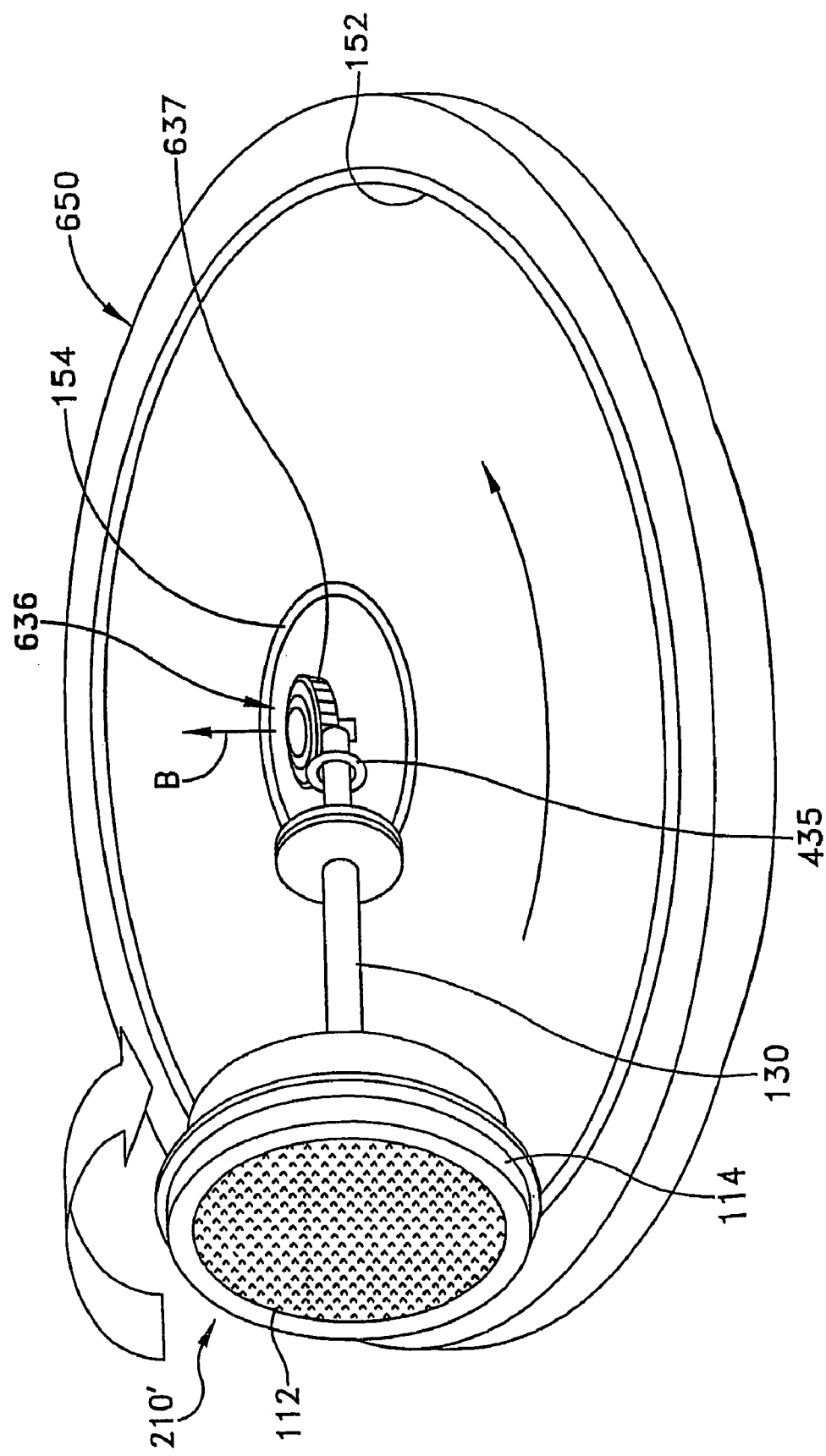
FIG. 29 shows a variation of the system, including a central stationary optical reader for reading the optical encoding disk of FIG. 19.

In the gravity drive systems shown in FIGS. 10–15, or other systems that do not include brackets 462, other types of angle sensing mechanisms may be used. For example, FIG. 29 shows a system 210', which is a variation of the gravity driven system 210 of FIGS. 10–15. The optical disk 435 of FIG. 19 has been added to System 210'. An optical coupler 636 mounted on platform 650 reads the code on the optical disk 435 to determine the rotational position of array assembly 210 as the array assembly 210' revolves around the optical coupler. The optical coupler 636 may include, for example, a plurality of scanners or bar code readers 637 arranged around its circumference. The sensors 637 may also be used to determine the azimuth position of the array assembly 210'. The sensors 637 each have respective fixed azimuth positions with respect to the platform 650, so identification of the sensor that is currently scanning the disk 435 also identifies the azimuth position.

Figure 30:
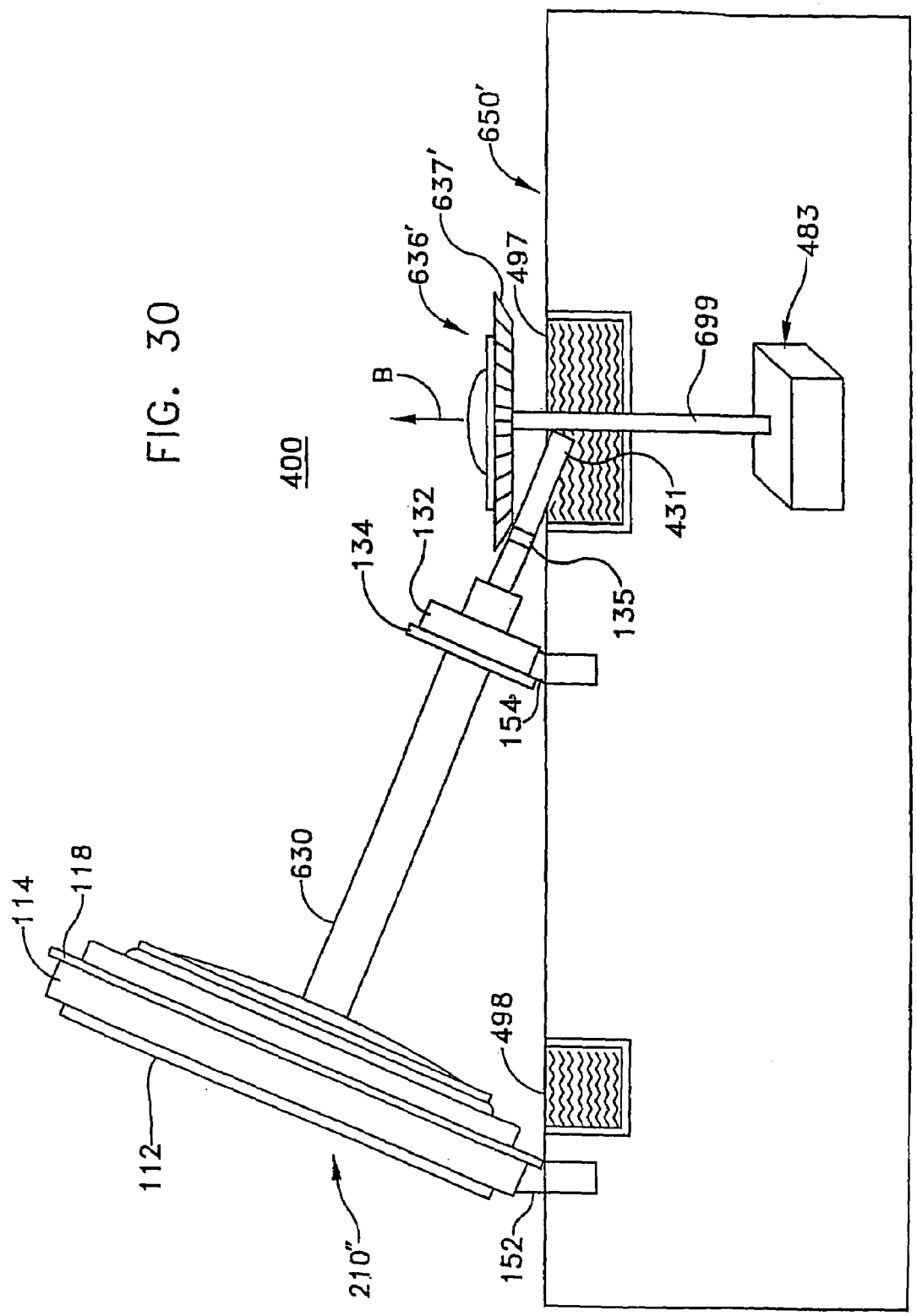
FIG. 30 shows a another variation of the system, including a second central stationary optical reader for reading the axle mounted bar code of FIG. 16B.

FIG. 30 shows another system 210" which is a variation on the system shown in FIG. 29. In system 210", the gravity drive system of FIGS. 10–15 is used in conjunction with the axle mounted bar code 135 of FIGS. 16A and 16B. A bar code reader 636' is mounted at the axis "B" of the platform 650'. The optical reader 636' of FIG. 30 is similar to the reader 636 of FIG. 29, except that the orientation of the sensors 637' is optimized for reading the bar code 135 from the axle, instead of from the optical encoding disk 435. An optical coupling 636' similar to coupling shown in FIG. 30 may be used to read a bar code (not shown) mounted on the cone shaped housing 715 or the frustum shaped housing of the array assembly shown in FIG. 33.

Figure 31:
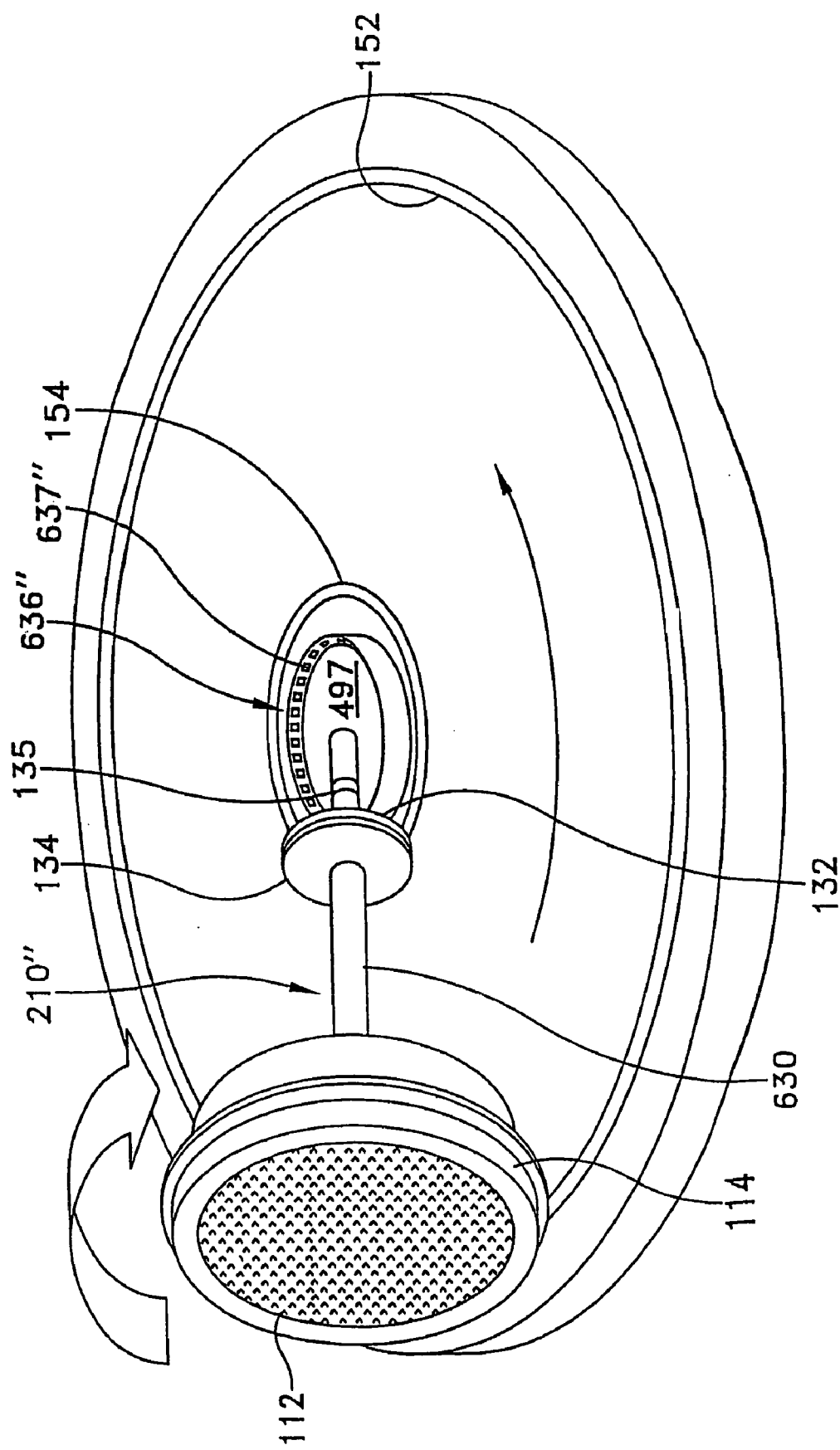
FIG. 31 is an isometric view showing another variation of the system, including a third central stationary optical reader for reading the axle mounted bar code of FIG. 16B.
Figure 32:
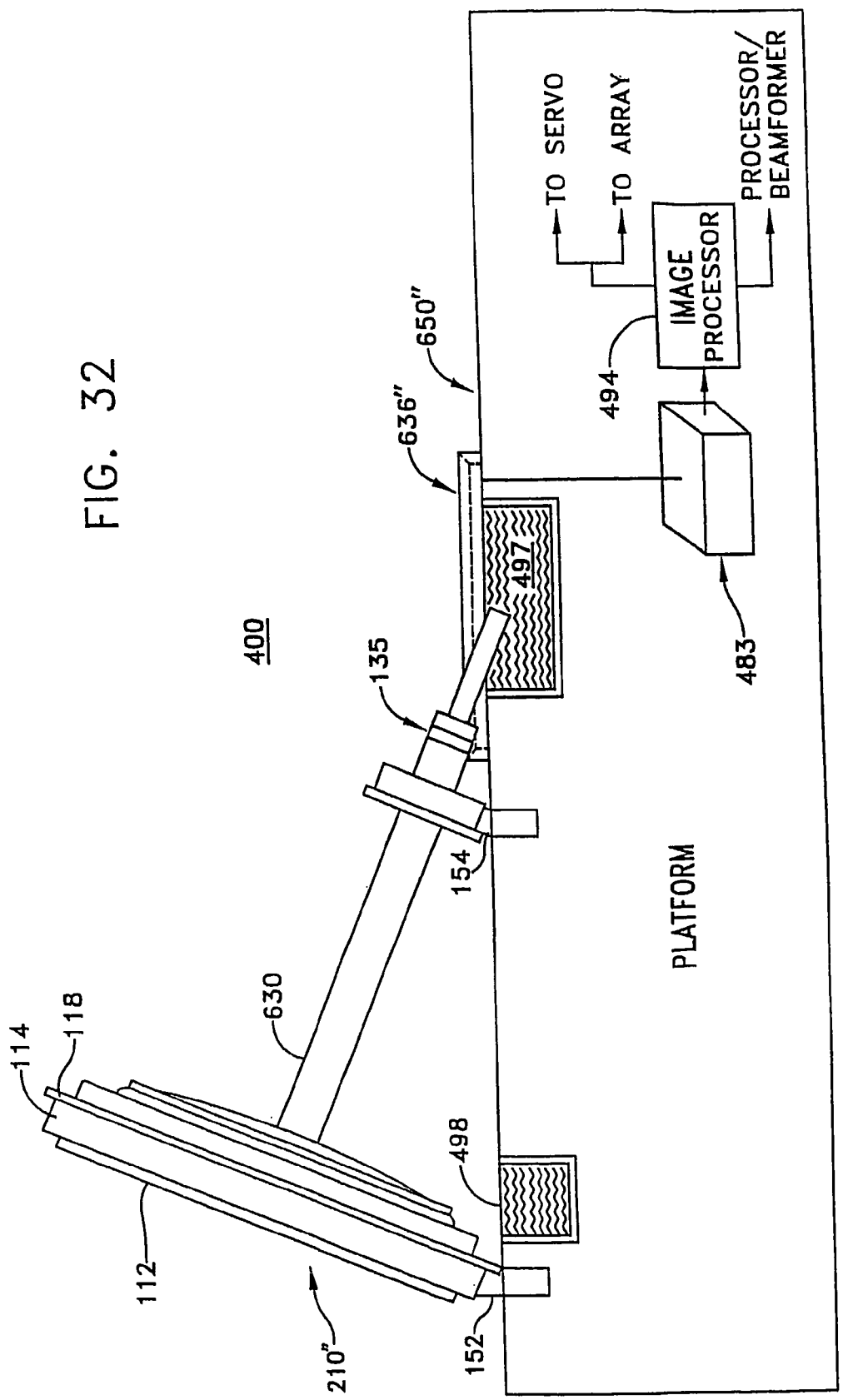
FIG. 32 is a side elevation view of the system of FIG. 31.

Alternatively, FIGS. 31 and 32 show an optical reader 636" that is located below the axle 630, around the circumference of the reservoir 497, approximately at the level of the platform 650". As shown in FIG. 31, a plurality of optical sensors 637" arranged in a ring on the tilted top (inner) surface of the optical reader 636". The optical sensors face upwards towards the axle mounted bar code 135, and read the bar code at the bottom of the axle 630. The configuration of FIGS. 31 and 32 would not require a shaft to extend through the reservoir 497 (which is described in greater detail below with reference to the thermal control system). Because the optical reader 636" is mounted to the platform, it provides has a more stable mechanical mount, and may provide more accurate readings than the optical readers of FIGS. 29 and 30. An optical reader 636" may be mounted on the surface of the platform 650" as shown, or may be partially or completely imbedded in platform 650".

Alternatively, a bar code pattern (or other machine readable pattern) may be placed on the inner circumference of the wheel 114, and a sensor such as a scanner (not shown) may be placed on a pivotally mounted plumb line or member hanging downwardly from the axle 130 within the array. The sensor would at all times be directed radially downward toward the bar code pattern on the inner surface of the wheel 114 at the point of contact with the platform. Because the sensor would point downward at all times, while the barcode inside the circumference rotates, the sensor would provide a reference direction, from which the rotation angle of the array could be measured using the internal bar code.

One of ordinary skill can readily develop other alternative mechanisms for determining the angular rotation of the array 112.

Passive Fiber Optical Link

Figure 24:
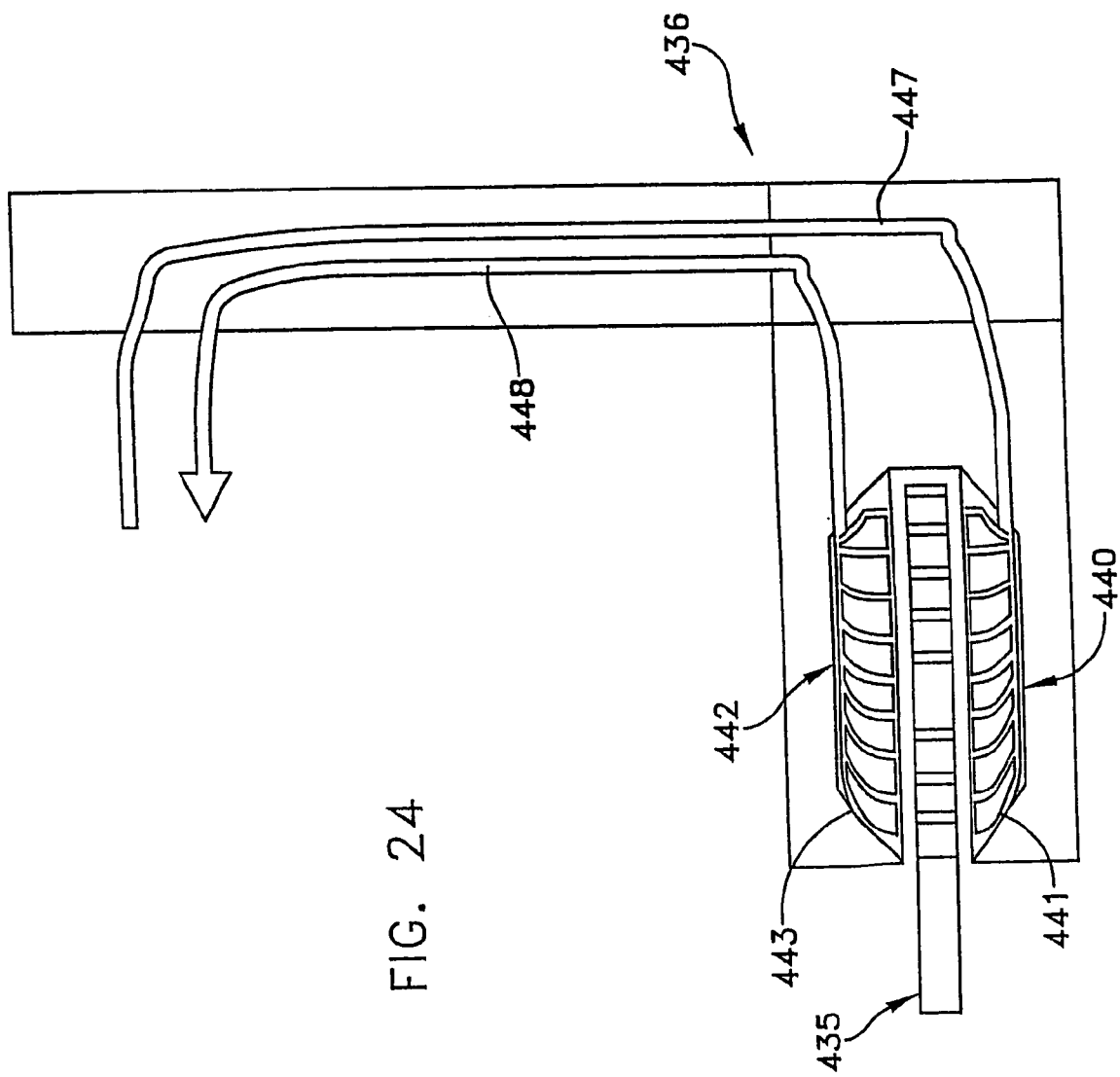
FIG. 24 is a cutaway plan view of the optical reader of FIG. 23.

As shown in FIG. 24, two bundles 447, 448 of fibers 441, 443 respectively pass through the housing of optical reader 436, to be transmitted to the signal processing apparatus. Transmission of the array rotation angle data through an optical link while the array assembly 410 is rolling and revolving presents additional design considerations, which are addressed below.

FIGS. 20–27 show a passive fiber optical link between the optical reader 436 and the signal processing apparatus (not shown) for the radar array 112. The exemplary fiber optic link transfers the light to and from the optical encoding disk 435 without adding any mechanical connections between the azimuth drive mechanism 160 and the optical source 482 or receiver 483. One complicating factor is that the radar array assembly 410 is rotating and revolving.

The system comprises at least one optical fiber (e.g., 447, 448) that revolves around an axis "B" when the array assembly 410 that includes a radar array 112 revolves around the axis "B". In the exemplary embodiment, there is a bunch of transmit fibers 447 and a bunch of receive fibers 448. The optical fibers 447, 448 receive a light pattern from the optical encoding disk 435 that specifies information from the array assembly. The system also includes a stationary device 490 that remains optically coupled to the revolving optical fibers 447, 448 for receiving the light pattern while the optical fiber(s) revolve around the axis "B". (Although the information in the exemplary embodiment specifies a position coordinate of the radar array—namely the roll angle of the radar array—a passive fiber link as described herein could also be used to transmit other information to and from the array assembly 410).

In FIG. 23, the movable portion 472 of gear assembly 470 is the outer ring, and pinion gear 480 is positioned outside of the movable gear 472. This clears the inside of the inner ring 471 (in this case, the fixed ring), so that the movable fibers 441, 443 and their support bracket 485 have unobstructed ability to sweep through the full range of azimuth angles without interference from the pinion gear 480 or motor 481.

For azimuth drive systems using the bullring gear 470 and pinion gear 480 arrangement, it is convenient to run the passive optical fiber link through the drive bracket assembly 462 for several reasons. The bracket assembly 462 maintains a position near to the axle 430 of the array assembly 410, and is a convenient mounting location for the optical reader 436. The bracket assembly 462 mounts to the bullring gear 470 and rotates with the gear, so that the positional relationship between the fiber bundles 447, 448 and the array assembly 410 are constant. Also, by running the optical fibers 447, 448 through the bracket assembly 462, interference between the fiber link and any of the components of the support platform 450 or any of the components of the radar array assembly 410 are avoided. Nevertheless, other fiber routing schemes are contemplated, as discussed further below.

The embodiment of FIGS. 20–27 avoids mechanical links in the optical fiber link. A device referred to herein as an "optical slipring" 490 provides one means of coupling a revolving fiber 447, 448 to a stationary fiber 487, 488 without a mechanical coupling. The optical slipring 490 is analogous to an electrical slipring that transmits power and/or signals from a stationary set of lines to a rotating set of lines. The optical slipring 490 is a bi-directional, all optical device. The exemplary optical slipring has the ability to handle multiple fibers, but other variations having any number of one or more fibers are contemplated.

The exemplary multi-layered optical slipring is mounted concentrically with the azimuth drive assembly. This positioning facilitates the ability for the movable fiber bundles 447, 448 to remain in constant optical communication with the optical slipring 490 as the array assembly 410, the movable ring portion 472 and the movable fiber bundles 447, 448 all sweep through the entire range of azimuth angles from zero to 360 degrees.

Figure 25A:
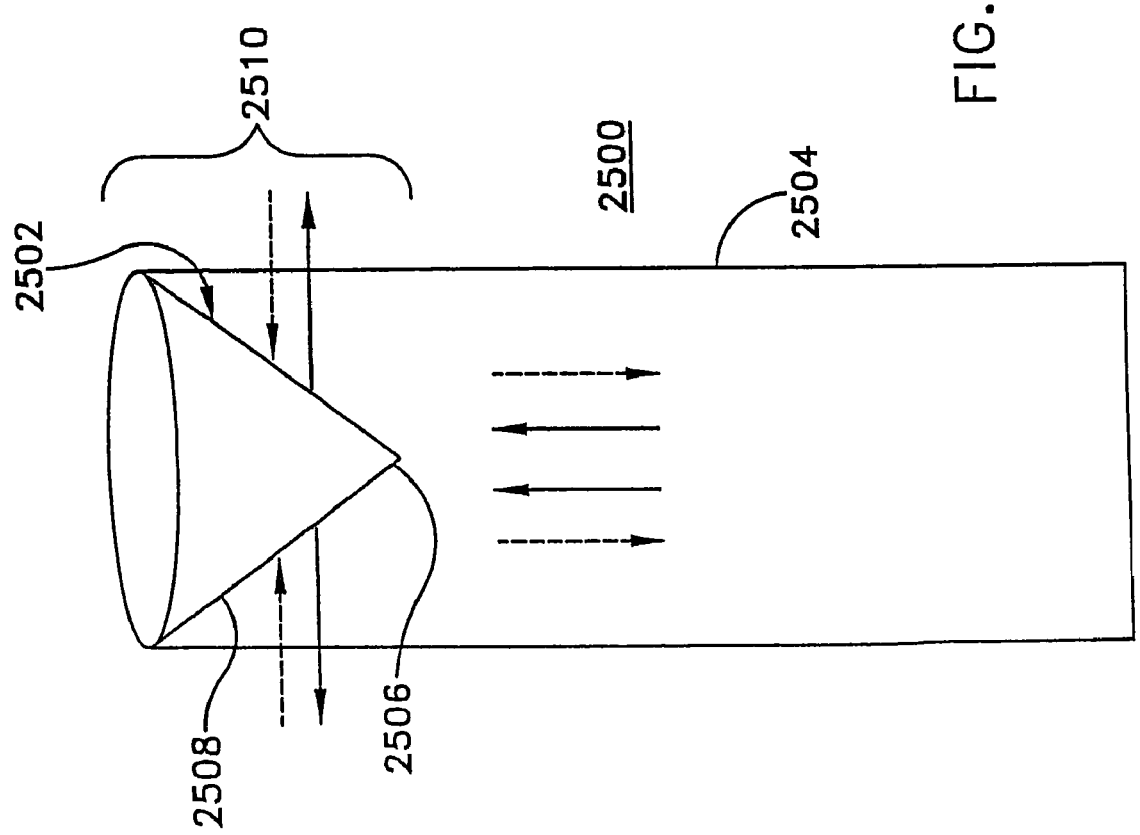
Figure 25C:
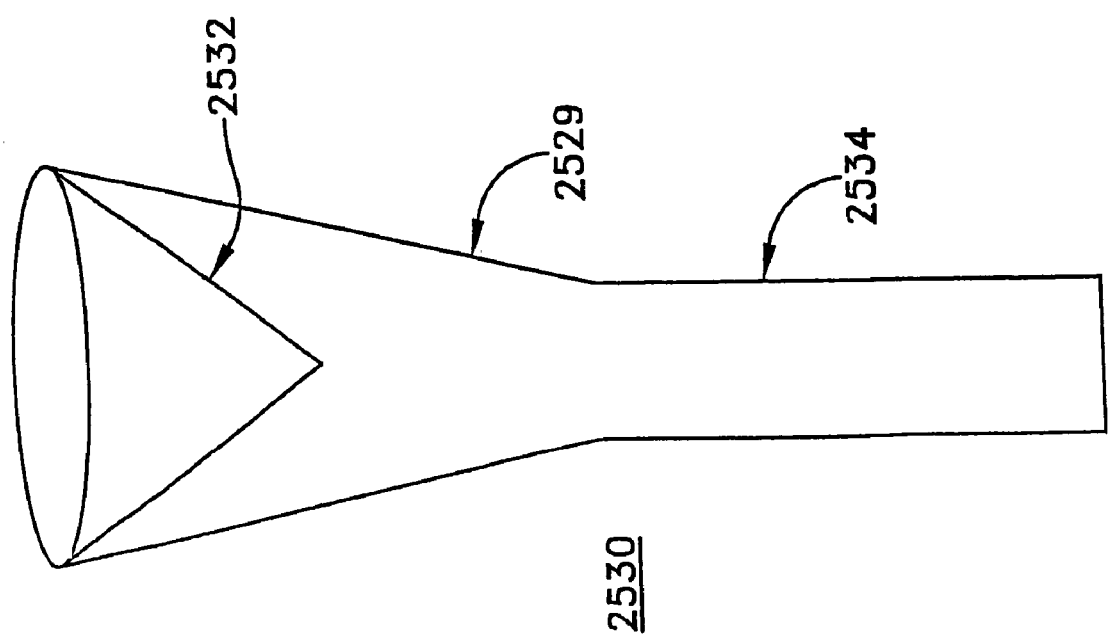

The optical slipring 490 uses the ability of a conical reflector to re-direct light. FIGS. 25A–25C show three interfaces between an optical fiber and a conical reflector. FIG. 25A shows a simple interface 2500, in which the optical fiber 2504 has the same diameter as the base of the conical reflector 2502. In such an interface, light moving vertically toward the apex 2506 of the conical reflector 2502 (indicated by solid arrows) is reflected and output horizontally (radially) in all angular directions. Light coming in horizontally from any radial direction towards the side 2508 of the conical reflector 2502 (indicated by dashed arrows) is reflected and output downward. This interface 2500 provides a conical reflector 2502 with a first optical path 2504 facing the apex 2506 of the conical reflector, and a second optical path 2510 perpendicular to the first optical path. The second optical path extends to a side surface 2508 of the conical reflector 2502 and has a 360 degree field of view. The device 2500 is essentially a single fiber optical slipring.

FIG. 25B shows another interface 2520. In FIG. 25B, if the fiber 2524 has a diameter that is smaller than the base of the conical reflector 2522, a selfloc lens 2525 can be used to diverge the light from being transmitted from the fiber to the reflector, or converge light being transmitted from the reflector to the fiber.

FIG. 25C shows another variation of the interface 2530. As shown in FIG. 25C, if the fiber 2534 has a diameter that is smaller than the base of the conical reflector 2532, a tapered optical fiber coupler 2529 can connect the fiber to the conical reflector.

Although a single fiber device 2500 as shown in FIGS. 25A–25C can transmit light in either direction, practical systems require a light source at one end and a receiver at the other end, and thus use separate lines for transmitting and receiving the light.

Figure 26:
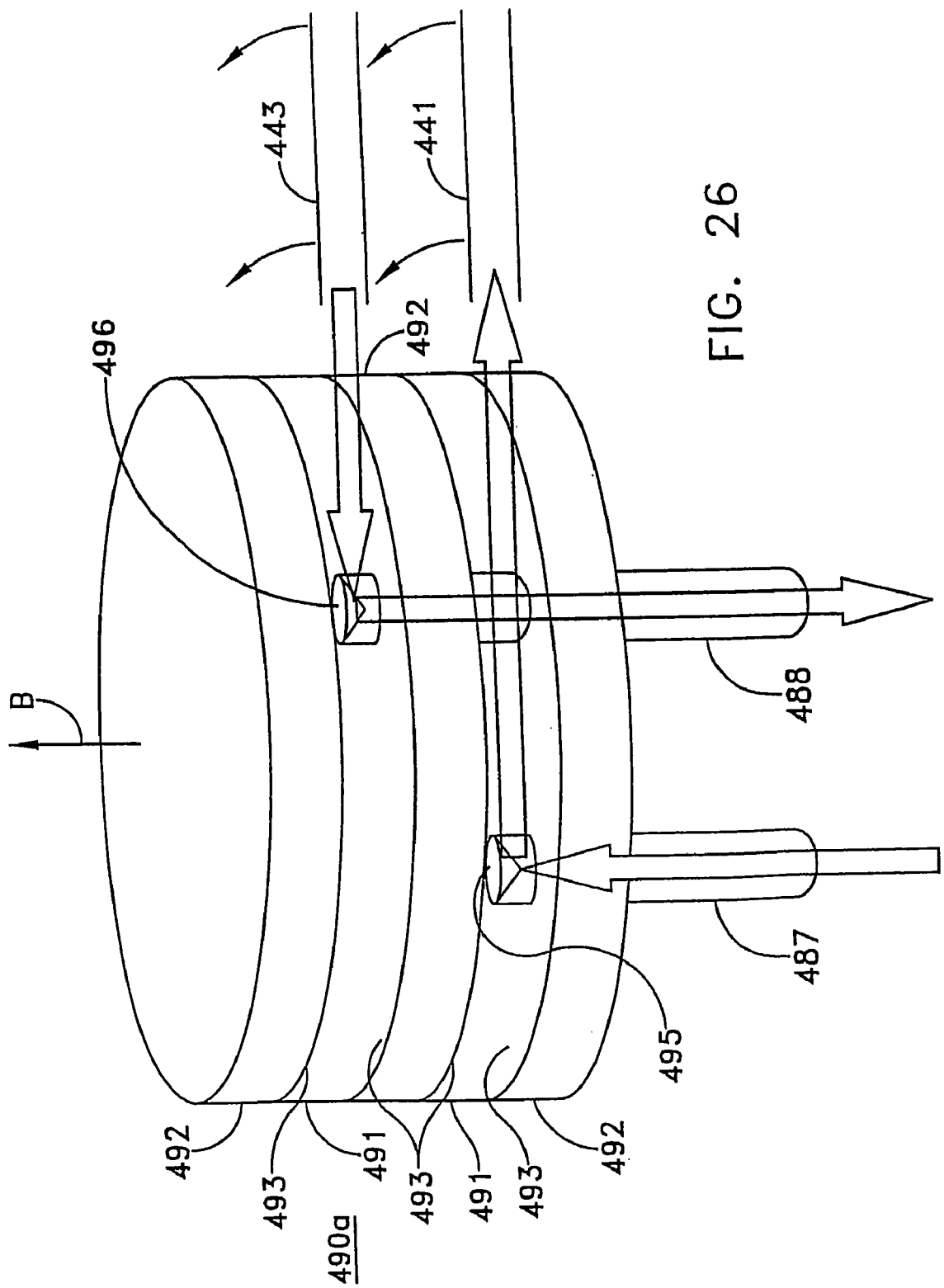
FIG. 26 shows a simplified optical slipring including two conical reflector interfaces of the type shown in one of FIGS. 25A–25C

FIG. 26 is a diagram of a simple multi-layer, full duplex optical slipring 490a. Although optical slipring 490a interfaces to fewer fibers 487, 488 than the optical slipring 490 shown in FIGS. 20 and 22, its function is identical. Optical slipring 490a has a plurality of disc shaped or annular transparent layers 491, with layers 492 therebetween. Transparent layers 491 may be made from conventional materials, such as glass or other materials suitable for use in optical fibers. Preferably, each layer 492 has a reflective surface 493 facing the transparent layer, to maximize the light that is re-directed and transmitted from the optical slipring 490a. The reflective surface may be disk shaped or annular. Each optical fiber 487, 488 terminates in a respectively different transparent layer 491.

Optical slipring 490a has a plurality of conical reflectors 495, 496 positioned at respectively different levels. Each conical reflector 495, 496 is at least partially located within a respective one of the transparent layers. At least the apex of each conical reflector 495, 496 is located within a transparent layer. (The base of each conical reflector can, but need not, be within a transparent layer, and can extend into a separation layer above the layer 491 in which the apex is located). The conical reflectors 495, 496 are aligned with respective input fibers 487, 488. None of the plurality of reflectors 495, 496 is axially aligned with any other one of the plurality of reflectors, in either the vertical or horizontal directions. For example, reflector 495 is coupled to fiber 487, and reflector 496 is coupled to fiber 488. Although FIG. 26 shows conical reflectors of the type shown in FIG. 25A, conical reflectors of the types shown in FIG. 25B or 25C may be substituted.

The interface from the stationary components (i.e., light source 482 and receiver 483) to the optical slipring 490a includes a first plurality of optical paths, 487 and 488 each facing the apex of a respective one of the conical reflectors 495, 496.

The interface from the moving components (e.g., sensor 436) to the optical slipring 490a include a second plurality of optical paths perpendicular to the first plurality of optical paths 487, 488. The second plurality of optical paths include the transparent layers 491. Each of the second plurality of optical paths 441, 443 extends from the outer circumference of a transparent layer 491 to a side surface of a respective one of the plurality of conical reflectors 495, 496 and has a 360 degree field of view.

The interface from the moving components also includes a plurality of movable optical fibers 441, 443, each capable of maintaining an optical coupling to a respective one of the second optical paths 491 during movement of that movable optical fibers. This is easily achieved if the optical slipring 490a is located along the central axis "B" of the system, and the movable fibers 441, 443 are radially aligned with the center of the transparent layers at all times.

The conical reflectors 495, 496 may be encapsulated within the transparent layer 491, so there is no air break or gap between the conical reflector and the transparent material of layer 491. To the extent that the separation layers 492 (with reflective surfaces 493) extend all the way to each fiber, they improve the optical isolation between the transparent layers.

Figure 27:
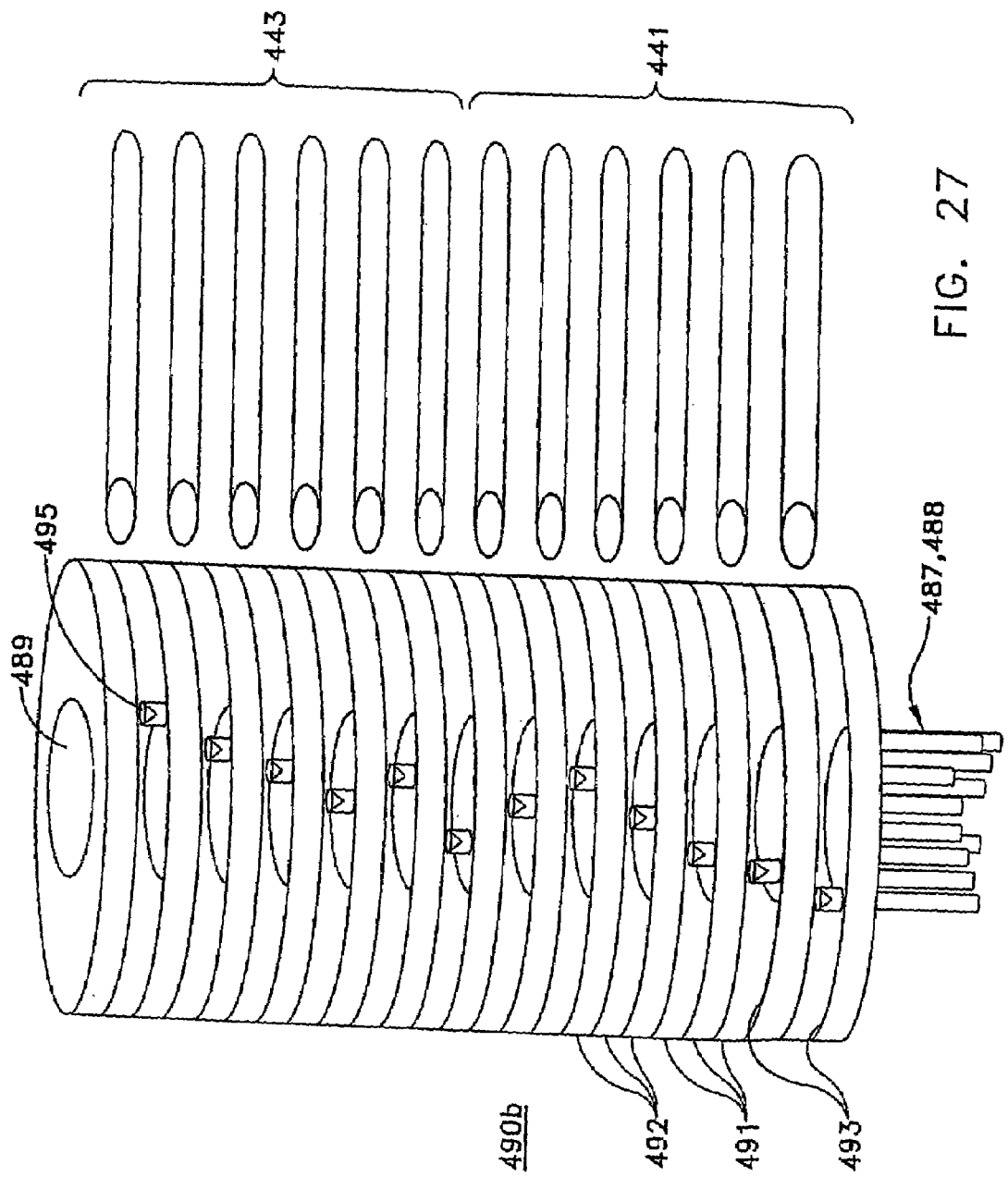
FIG. 27 is an enlarged view of an optical slipring having many fibers.

Alternatively (as shown in FIG. 27), the layers may be annular, with a cylindrical passage 489 therethrough. This passage may contain air, which minimizes undesirable refraction. The intent is that a portion of the light coming in from movable fiber 443 reaches the side wall of the conical reflector 496, and is reflected in the direction of the apex of reflector 496, so that a portion of the light reaches fiber 488. FIG. 26 shows the reflection while the movable fiber 443 is precisely aligned with the conical reflector 443. As the movable fiber 443 revolves around the optical slipring 490a, with the fiber radially oriented toward the axis "B," and the conical reflectors clustered near to the axis "B," the movable fiber 443 will not always point precisely at the conical reflector 496. Nevertheless, a sufficient amount of light from fiber 443 is dispersed through transparent layer 491 (and/or reflected from surfaces 493) so that a detectable light is reflected towards fiber 488.

Similarly, the light that is transmitted from fiber 487 to conical reflector 495 is scattered horizontally in all radial directions. A portion of this light will reach fiber 441.

FIG. 27 shows another optical slipring 490b, having multiple fibers 441 for transmitting light from the light source 482 (which may be a light emitting diode or laser) to the optical encoding disk 435, and multiple fibers 443 for transmitting light from the optical encoding disk 435 to the optical receiver 483. Although only six fibers are shown for each direction, any number of fibers may be used. Given the exemplary ten-bit resolution of the optical disk 435, a corresponding optical slipring 490 would have ten fibers in each direction. A separate fiber 441 supplies light to each respective ring of the optical encoding disk 435. A separate fiber 443 returns the signal (light or no light) from each respective ring of the disk 435. Thus, optical slipring 490 should have twice as many fibers as the number of rings (bits of precision) for optical encoding disk 435.

Although the exemplary embodiment uses the optical slipring 490 beneath the platform 150 in combination with the bullring gear azimuth drive, there are other applications for the optical slipring. For example, in another embodiment (not shown) a light source could be pivotably suspended on a plumb line or member beneath the axle mounted bar code 135 of FIG. 16A. If the bar code 135 consists of transparent and opaque regions, then the light pattern shining through the bar code could be directed on an optical slipring inside the axle. Then the angle position signals could be transmitted down the length of the axle, if desired.

Figure 28:
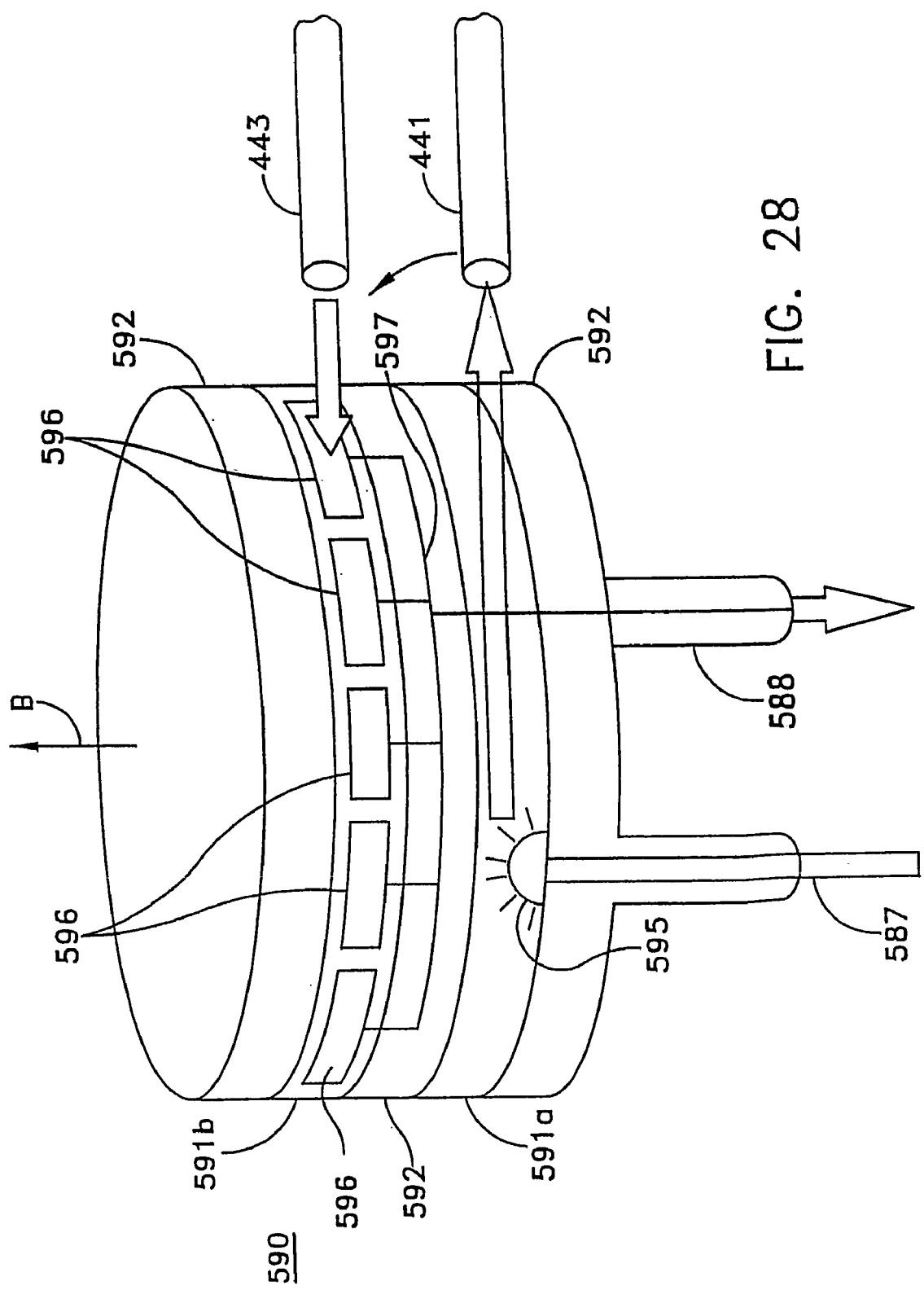
FIG. 28 is a simplified electrical-optical slipring that can be used in place of the optical slipring of FIG. 20.

Reference is now made to FIG. 28. Although the exemplary device 490 is all optical, other variations are contemplated. For example, the optical slipring 490 may be replaced by optical-electrical slipring 590. Instead of having a conical reflector for each transparent layer, a respective light emitting diode 595 may be provided in each of the transparent light emitting layers 591a to transmit light in all directions. A plurality of photo detectors 596 may be placed around the circumference of each receiving layer 591b, which may or may not be transparent. Then electrical signals could be transmitted via line 587 to the optical-electrical device 590 (in place of transmitting light beams from light source 482) and a receiving line 588 can carry an electrical signal to an electrical, circuit, or processor (not shown) in place of the fiber optic receiver 483. In this variation, the signals between the bar code reader 436 and the electrical-optical slipring 590 via lines 441 and 443 are all optical. Meanwhile, all signals between the electrical-optical slipring 590 and the signal processing apparatus via lines 587 and 588 are all electrical. Note that this variation only affects the stationary components of the system 400. The movable fibers 447, 448 and other moving components of the array assembly 410 and angle sensing system remain unchanged.

Although the example of FIGS. 20–24 features an optical encoding disk, the light transmission technique of FIGS. 25A–27 may also be used with a backlit version of the axle-mounted bar code of FIGS. 16A and 17.

Thermal Control

Referring again to FIG. 20, the axle 430 has an extended tube 431 that extends into a cool liquid reservoir 497. The tube 431 can take in the cool liquid, circulate the liquid among the radar array assembly 410 to cool the assembly, and return heated liquid to the reservoir 497. Alternatively, a separate return path may be provided by allowing the fluid to drain from a rear portion 499 of the array assembly into a fluid return 498. One of ordinary skill can readily configure the liquid intake, circulation, and exhaust components interior to the axle 430 and tube 431, and the array 412. This configuration is advantageous because it provides cooling without running direct pipes through the platform to the array 112. No rotary fluid joints are needed. By centrally locating the reservoir 497, the tube 431 can access the reservoir at all azimuth angles.

Preferably, if the reservoir 497 is included, the optical slipring 490 is located beneath the reservoir.

In the embodiment of FIG. 30, where the reservoir 497 is included, but the optical coupler 636' is used, and optical slipring 490 is not present, the optical coupler 636' may be above the reservoir, with the receiver 483 below the reservoir. Because optical coupler 636' is stationary, it is easy to seal the entrance where the tube 699 of the optical reader passes through the reservoir 497.

Although the optical readers 636' and 636" of FIGS. 30–32 are shown in combination with the thermal cooling reservoir 497, these optical readers may also be used in systems that use other thermal control systems.

Although the exemplary embodiments include specific combinations of subsystems, the various components described above may be combined in other ways. In general, with adaptations, any of the subsystems (azimuth drive, angle sensing, light transmission, cooling) may be used in combination with any other subsystem. Although the exemplary azimuth drive, position sensing, light transmission and cooling subsystems are shown in examples that include the two wheel configuration of the array assembly, these subsystems may also be adapted for use in a single wheel embodiment, an embodiment having more than two wheels, or embodiments having the cone or frustum shaped housing.

Signal Processing

In processing signals from an array of sensing elements, the spacing of the elements is an important factor in achieving directivity and the ability to electronically scan without the appearance of large grating lobes. If the elements are spaced too widely, then grating lobes can occur, especially if the beam is scanned off the array normal. In conventional radar systems, the element spacing usually places a constraint on how far off axis a beam may be steered before grating lobes appear.

The rotating array allows a reduction in the number of radiating elements needed to achieve a given set of system performance requirements. The signal processing takes advantage of the rotational and translational motion of a rolling array 112 to permit achievement of performance targets using an array that is more sparsely populated when compared to traditional arrays. Processing of signals is performed individually for each element, or for small sub-arrays of elements (e.g., a two-element by two-element sub-array) to maintain the processing control to form beams with the array in motion. With the array in motion, each element moves while signals from a given target are being received, thus providing a wider spatial sample than an otherwise stationary array would provide.

Figure 44:
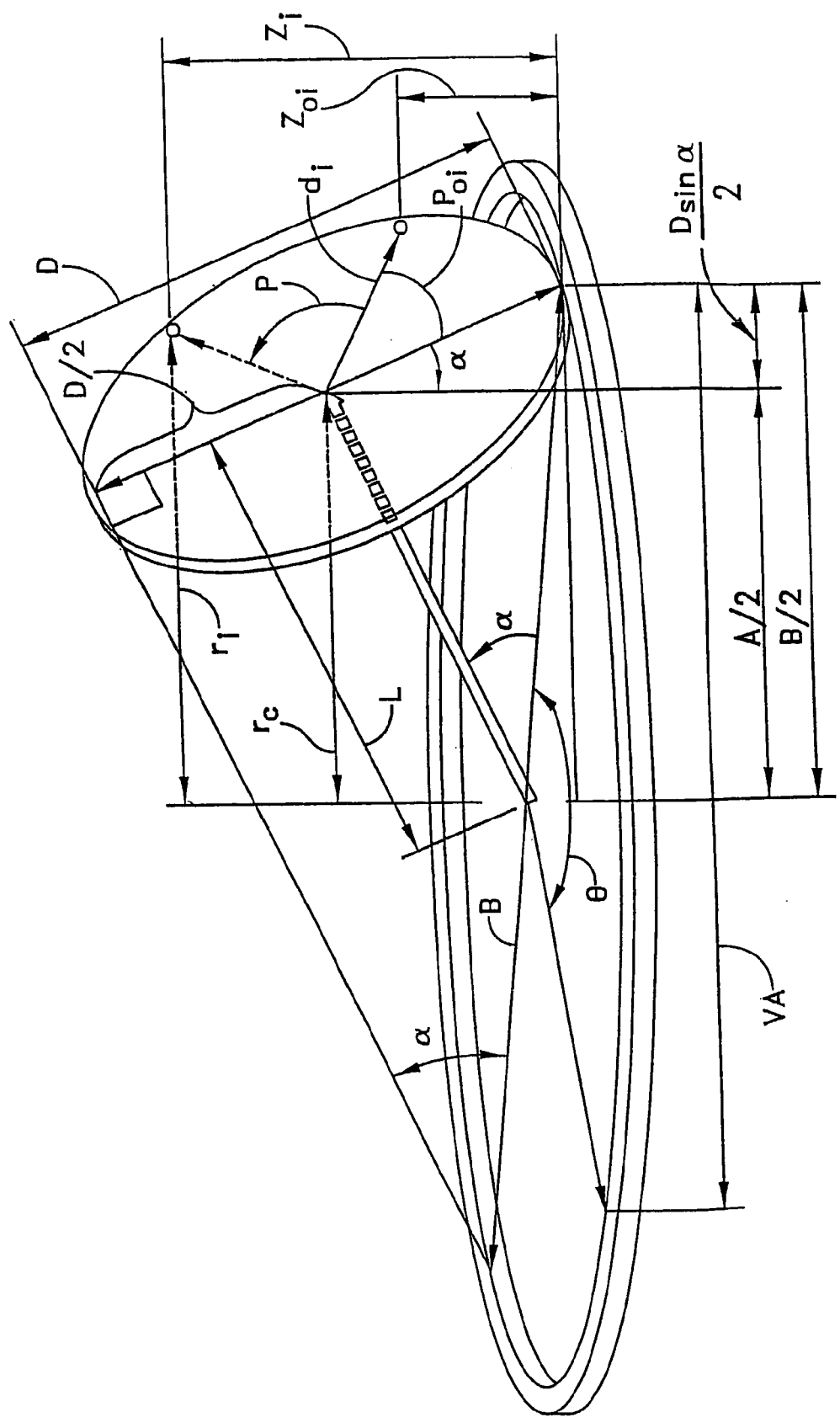
FIG. 44 shows geometrical parameters used in motion compensation.

FIG. 44 shows the geometrical relationship of various parameters that are considered in the signal processing. Each element i has a respectively different position function that can be roughly visualized as the projection of an inflected cycloid onto the side of a cone. A cycloid is a curve generated by a point in the plane of a circle when the circle is rolled along a straight line, keeping always in the same plane. A prolate or inflected cycloid is formed when the generating point lies within the circumference of the generating circle. Elements further from the center of the array have a greater range of movement in the vertical (Z) direction. If the wheels 114 and 132 were equally sized (or if axle 130 has infinite length) then the path traced by each element would be an inflected cycloid. Because the rotating array has a non-zero elevation angle α, the circle (i.e., wheel 132) does not remain in the same plane, and the motion resembles the projection of the cycloid on a cone.

The position $(r_i, \theta, z_i)$ of a given element i in cylindrical coordinates as a function of the rotation of the array about its axis and angle of revolution about the track are readily determined.

In addition, each array element 112e has a respectively different motion vector. The motion vectors can be calculated by numerical methods from the position vectors. Because the angles ρ and θ are measured by sensors, the position at any time can be calculated, and the change in position can be used to determine the velocity component in each direction. Alternatively, equations describing the velocity as a function of time can be readily derived. The motion vectors are used for performing array motion compensation, and for doppler processing.

Figure 40B:
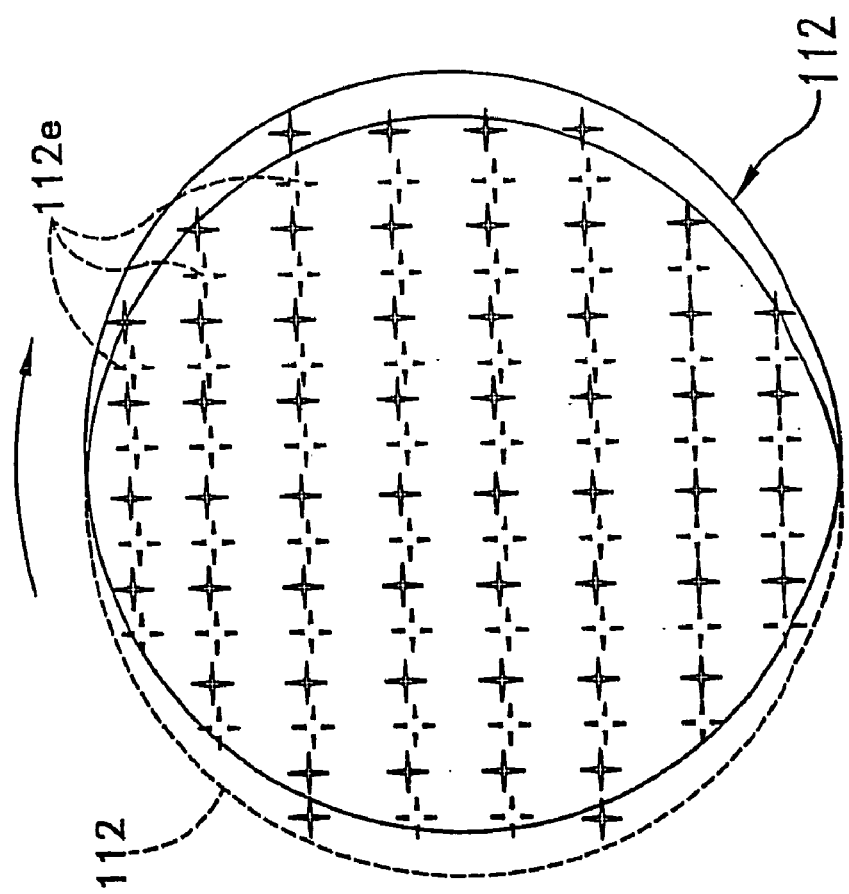
FIGS. 40A and 40B show motion of individual array elements during rotation of the array.
Figure 40A:
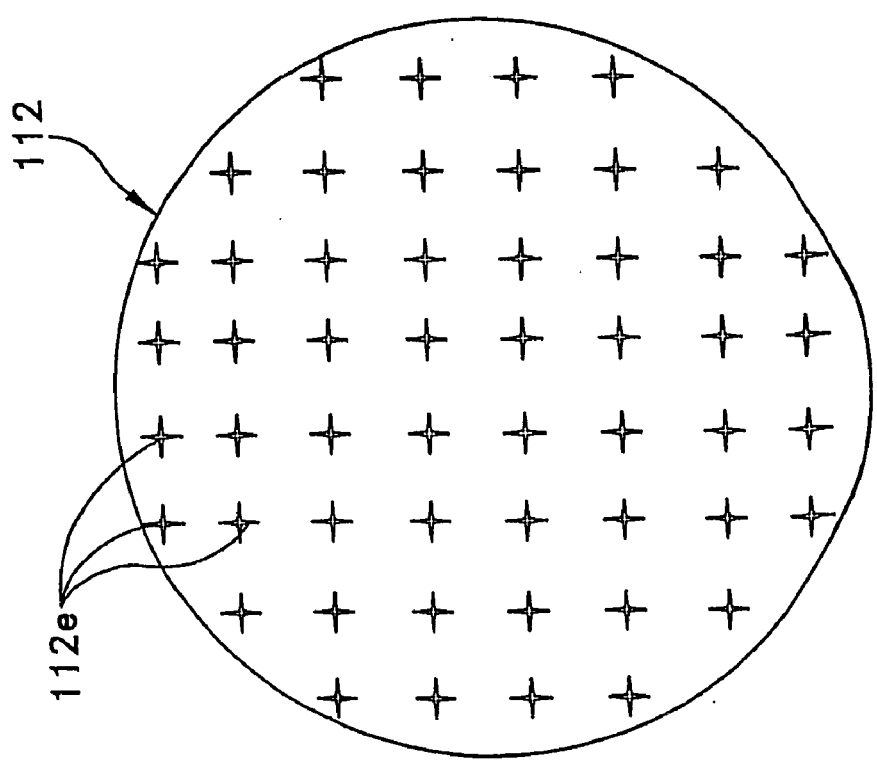

FIGS. 40A and 40B illustrate how the movement of individual elements 112e can improve performance for a sparsely populated array. FIG. 40A shows the elements 112e at an initial rotation angle $\rho_0$ of the array. FIG. 40B shows the original positions in phantom, and shows new positions after a small rotation with solid symbols. The same elements 112e now occupy positions in between the original positions of the elements shown in phantom. Close inspection reveals that the new positions fill in spaces between columns of elements and spaces between rows of elements. The echo returns are collected from each element in a plurality of different positions, to reduce grating lobes in magnitude relative to grating lobes that would be produced by an otherwise identical array that does not rotate about its axis. By collecting signal returns in a multiplicity of rotational positions, it is possible to achieve a result similar to that which could be achieved by a more densely populated motionless array (i.e., reduced grating lobes).

The exemplary embodiment includes a method of processing radar signals, comprising the steps of: receiving echo returns from a radar beam using a plurality of radiating elements, each radiating element having a respectively different motion vector from every other one of the plurality of radiating elements; and performing motion compensation on the echo returns.

The role of the motion compensation in beamforming can be understood as follows. If the array 112 is held still, and the beam is directed normal to the array, all of the radiating elements 112e are excited in phase. If the array is held still, but the beam is directed off-normal at a constant azimuth and elevation angle with respect to the array normal, the phases of the radiators are progressively shifted between each successive radiator, to electronically steer the beam. Now, consider an array that rotates about its axis 130 (without considering revolution of the array about the track). If the array 112 rotates while the beam maintains a constant azimuth and elevation angle with respect to a stationary coordinate system, the phase of the energy transmitted by each element 112e is adjusted so that the beam formed by summing the energy from each rotated element still has the desired azimuth and elevation angles. The result is similar to applying a coordinate transformation to the phase of each respective element 112e. In combining the signals from all of the elements, the coefficients that are used for each given element vary with the position and velocity of that element over time.

At any given time, the motion vectors of each element in the array are different. For each element, the motion vector lies in the plane of the array, along a tangent to a circle having a radius equal to the distance of that element from the center of the array. For any group of elements lying along the same radial line emanating from the center of the array, the motion vectors have the same direction, but respectively different magnitudes. For any group of elements lying along a circle having its center at the array axis, the motion vectors all have the same magnitude and respectively different directions. Thus, the doppler shift due to motion of each element (or each sub-array) is different, and is accounted for in the processing. This is of greatest significance for elements that are furthest from the center of the array (and thus have the largest motion vectors). This effect can also be more significant when the beam is steered at large angles away from the normal to the plane of the array (so that the component of the motion vector parallel to the line of sight to the target is greater).

Figure 41:
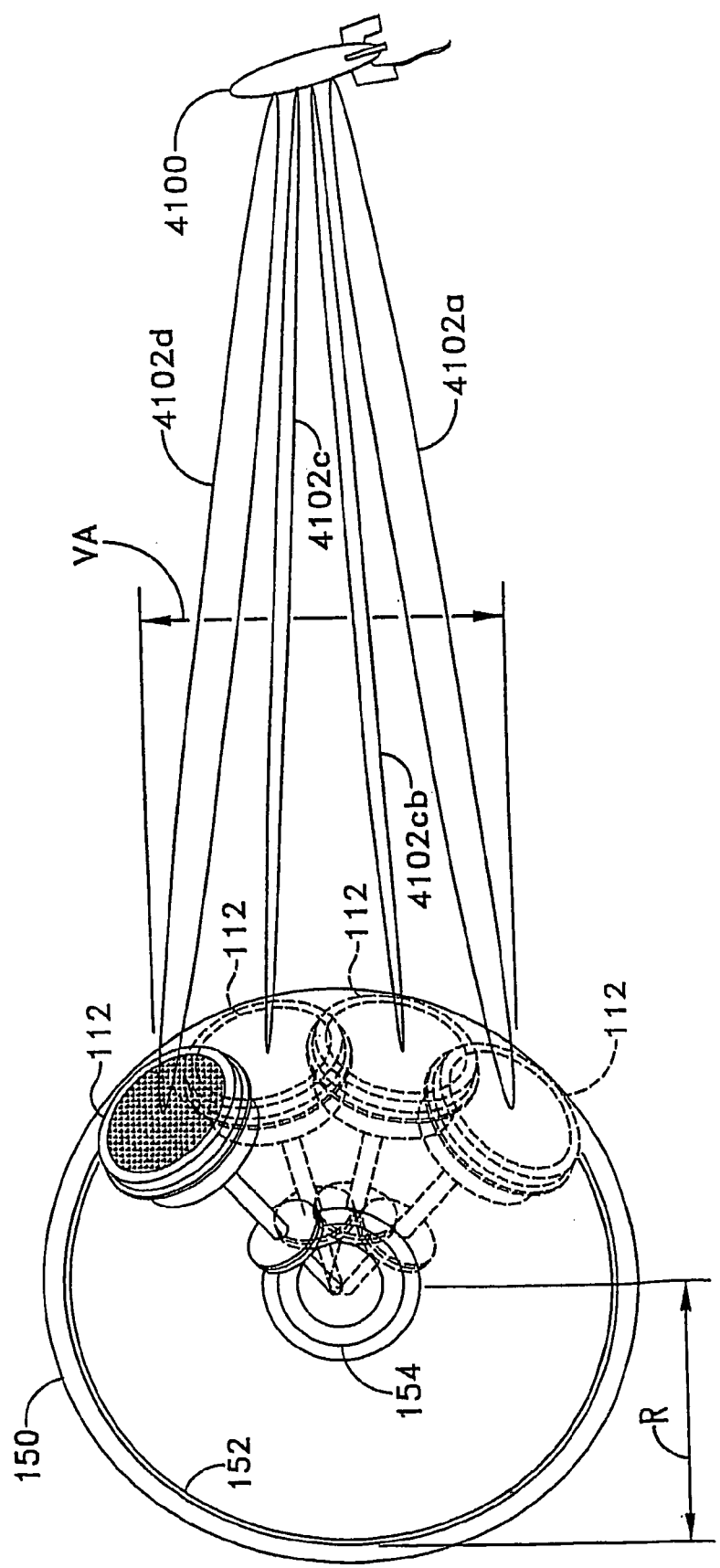
FIG. 41 shows how an array sweeps through an azimuthal angle while a target is in the field of view, forming a virtual aperture.

FIG. 41 shows another aspect of the array motion. As the array 112 rotates about its axle and revolves about the platform 152, the beam is steered towards the target 4100 of interest. The steerable beams 4102a–4102d coupled with the rolling array design extends the aperture by providing different "looks" at a given target. The array 112 subtends an area which is considerably larger than the array itself while keeping a given target within the field of view. This provides an effectively larger aperture than the basic array, which is referred to herein as a "virtual aperture" (VA). Echoes received by a plurality of different elements that pass through the same height at different times (and different locations along the tangential direction) can be processed as though they were received by a row of elements having the same height.

The virtual aperture is analogous to spotlight mode synthetic aperture radar (SAR) in that the look angle of the real antenna changes as the array revolves through an arc. In a typical SAR system, the radar collects data while flying a distance up to several hundred meters and then processing the data as if it comes from a physically long antenna. The distance the aircraft flies in synthesizing the antenna is known as the synthetic aperture. A narrow synthetic beamwidth results from the relatively long synthetic aperture, which yields finer resolution than is possible from a smaller physical antenna.

The main difference between SAR and a "virtual array radar" (VAR) is that in SAR, the motion of the array is substantially a translation without a rotation. A row of the synthetic array can be formed from echoes received by one element at a plurality of different times. The VAR adds rotation of the array 112 about its own axis 130. To construct a virtual row of elements, echoes from many different elements or sub-arrays are used at respectively different times. For example, the topmost row in the VAR would be formed by echoes received from the topmost element 112e or sub-array at certain discrete times/positions during each rotation where one of the elements reaches the highest point.

(Each of the elements having the maximum radial distance from the center of the array would contribute to the topmost element of the VAR at a different time). In between these discrete positions/times, the elements having the maximum radial distance from the center of the array pass through a continuum of positions, and echoes received at any of these positions may be used to form an intermediate row in the VAR having a height that is in between the heights of actual rows in the physical array 112. Because the array rotates and revolves, these intermediate virtual elements are present regardless of how the array elements are arranged on the array face (e.g., elements arranged along a rectangular grid or along a plurality of concentric circles).

Analogously to a synthetic aperture, the virtual aperture VA is defined by the distance through which the array 112 translates during its revolution, while still being able to direct its beam towards a given target. The VA is determined by the radius of the track 152. As the radius of the track 152 increases, the VA increases approximately in direct proportion to the radius, increasing spatial resolution. The VA may be approximated by the chord of a circle of diameter D, where the chord connects the points of minimum and maximum revolution of the array 112 at which the array can direct beams 4102a and 4102d, respectively, at the target 4100. If the array revolves through an azimuth angle 2 between transmitting beams 4102a and 4102d, then the VA is derived as follows, with reference to FIG. 44:

$$A = 2L\cos\theta$$

$$B = \frac{D}{\sin\alpha}$$

$$L = \frac{B\cos\alpha}{2} = \frac{D\cos\alpha}{2\sin\alpha} = \frac{D}{2\tan\alpha}$$

therefore, $$A = \frac{2D\cos\alpha}{2\tan\alpha} = \frac{D\cos\alpha}{\tan\alpha}$$

$$VA = D\sin(\theta/2) = D\left(\frac{\cos\alpha}{\tan\alpha}\right)\sin\left(\frac{\theta}{2}\right)$$

$$VA/D = \frac{\cos\alpha}{\tan\alpha}\sin\frac{\theta}{2}$$

where:
B=track diameter
D=Array Diameter
A=2 times the projection of D on B
L=Array Axle Length
$\alpha$=Tilt Angle of Array
$\theta$=Scanning Angle Span
VA=Length of Virtual Aperture spanned by $\theta$.

Preferably, VA is at least three times the greatest distance between any two radiating elements 112e in the array 112. More preferably, VA is four to five times the greatest distance between any two radiating elements. Given a desired $VA_{desired}$ and a maximum desired value ($\theta/2$) off the array normal that a beam is to be steered, the minimum track diameter $D_{MIN}$ to provide the desired virtual aperture is easily calculated by $$D_{MIN} = \frac{VA_{desired}}{\left(\frac{\cos\alpha}{\tan\alpha}\right)\sin\left(\frac{\theta}{2}\right)}$$

Figure 45:
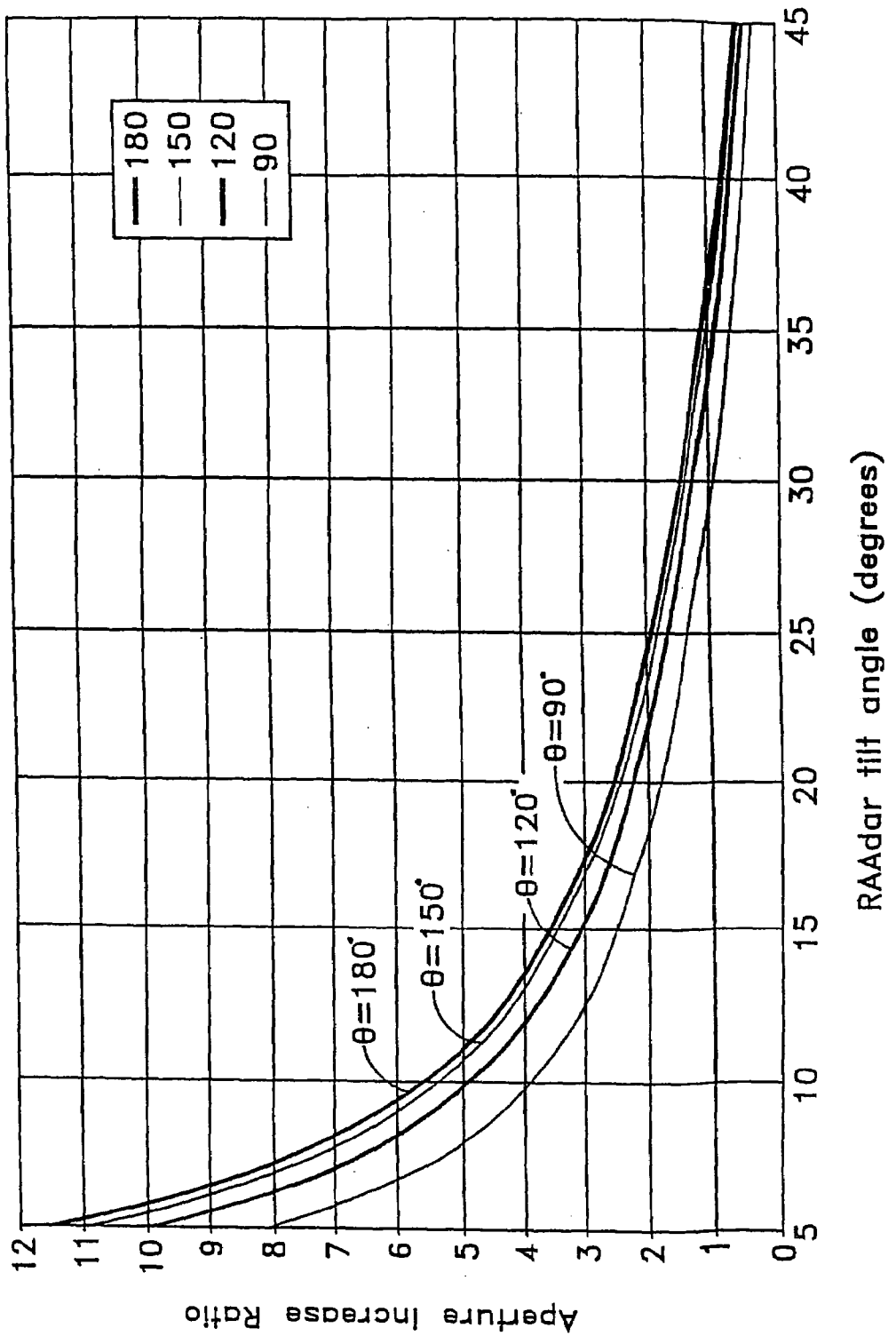
FIG. 45 is a diagram showing the aperture increase ratio as a function of the array tilt angle for various azimuth scan angles.

FIG. 45 is a diagram showing how the aperture increase ratio of VA/D varies with the elevation tilt angle $\alpha$ of the array and the scanning angle span $\theta$.

Sampling array elements at different points in time corresponds to also sampling the elements at different points in space, because the array is constantly in rotational and translational motion. By processing an array of signals sampled at a plurality of points along the array travel path, beams are formed with an effective increase in the number of spatial samples used to form them.

Figure 42:
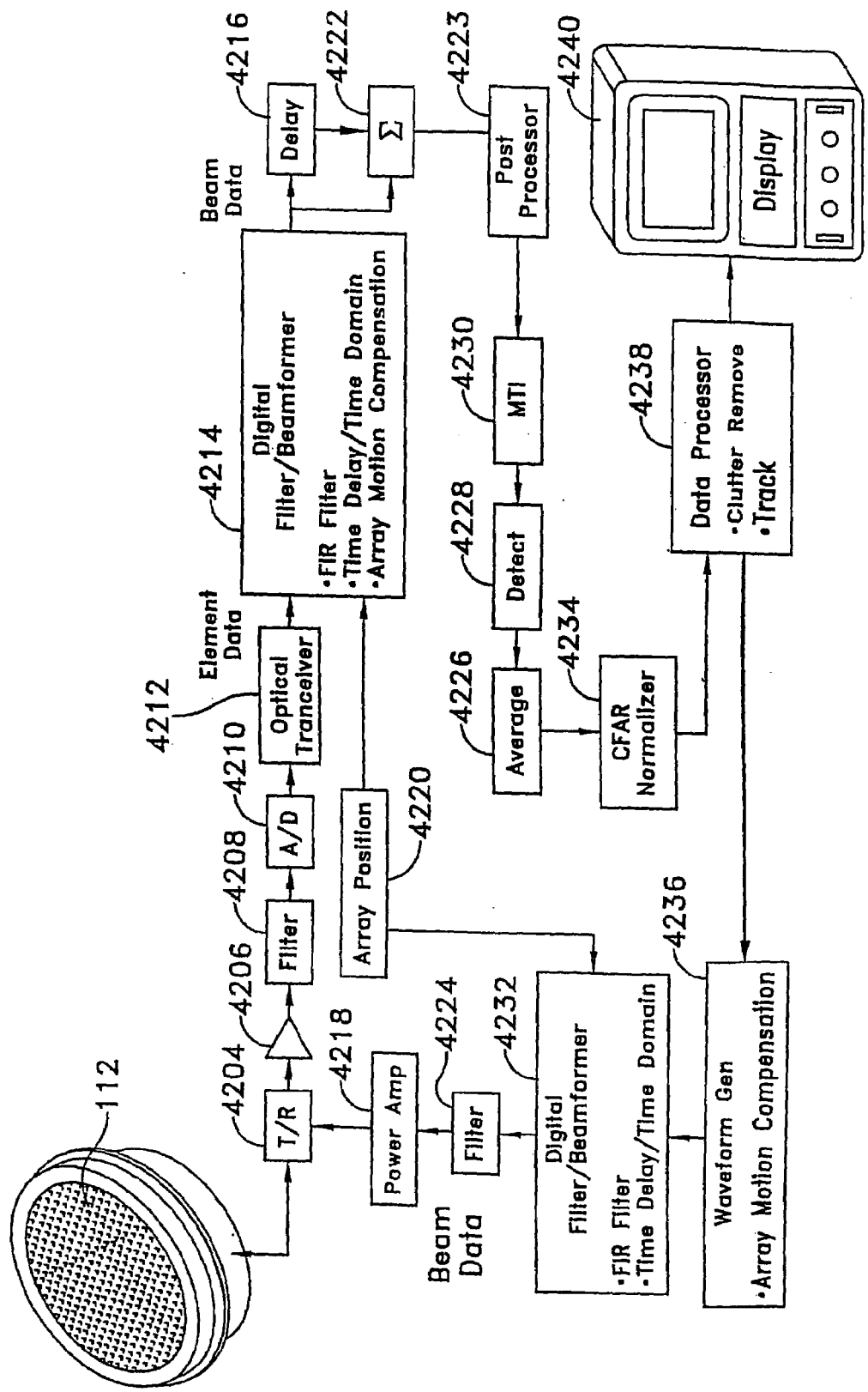
FIG. 42 is a block diagram of the signal processing for a rolling axle array system.

FIG. 42 is a block diagram of an exemplary signal processing system.

Array 112 provides the received echo signals to transmit/receive hardware block 4204. The received signals are conditioned including amplification in amplifier 4206, filtering in filter 4208, and conversion to digital format in analog to digital converter (ADC) 4210. These functions may be provided by conventional signal conditioning circuitry. Transceiver 4212 receives incoming echo return data. The array position angle 4220 and the array rotation angle are provided by the image processor 494 (FIG. 32). The digital data from block 4210, the rotation angle and the azimuth position from array 4220 are fed to the motion compensation function of the digital filter/beamformer 4214.

Block 4214 includes the digital filter and beamformer functions. These include a finite impulse response (FIR) filter, time delay and time domain transform, and array motion compensation. The FIR filter, time delay and time domain functions may be similar to those performed in conventional phased arrays. The time delay in block 4214 is for the application of phase correction to the returns received by different elements having different locations within the array, which may have undergone phase distortion, so as to focus the array (i.e., doppler processing).

The array motion compensation of block 4214 modifies the individual element (or sub-array) data received by block 4214. A processor determines a respective position of each of a plurality of radiating elements included in a radar array. Each radiating element has a respectively different motion vector from every other one of the plurality of radiating elements. Motion compensation techniques to compensate for array motion have been employed in Sonar systems, for example, to take out array motion due to motion of a ship or submarine. The motion of the individual elements within the rotating radar array 112 is more specific and predictable than with a ship motion, and compensation can be performed more predictably than in sonar systems, for example. The azimuth and rotation angle measurements allow compensation for the motion. U.S. Pat. No. 4,244,026 is incorporated by reference herein for its teachings on motion compensation in sonar systems, using techniques that can be adapted for motion compensation in block 4214. U.S. Pat. Nos. 5,327,140 and 6,005,509 are incorporated by reference herein for their teachings on motion compensation in synthetic aperture radar systems, using techniques that can alternatively be adapted for motion compensation in block 4214.

A delay block 4216 and summation block 4222 form the virtual aperture by integrating the returns received from the array 112 at different times and different azimuth positions (as shown in FIG. 41). The delay block 4216 can place the received returns into a plurality of range bins. When the echoes received by all of the elements are integrated, the signal portions add coherently and the noise portions tend to cancel, producing the equivalent of a narrow antenna beam. Thus, the sum that is built up in each range bin is close to representing the total return from a single range/azimuth resolution cell.

A post processor 4223 match filters the pulse over the duration (several micro-seconds or milliseconds) of the pulse, to provide good range resolution.

Block 4230 is a Moving Target Indicator (MTI) filter that eliminates stationary targets, primarily ground clutter.

Block 4228 detects the magnitude of the total return from each single resolution cell (or sub-array).

If non-coherent averaging is desired from pulse to pulse, averaging block 4226 performs that function.

Block 4234 is the Constant Fault Alarm Rate (CFAR normalizer). CFAR 4234 estimates the fluctuating background noise of the radar return and makes it flat. So then when a threshold is set, allowing use of a fixed threshold to provide a constant fault alarm rate.

Block 4238 provides data processing functions for clutter mapping and tracking. This can be performed using conventional processing. The output of block 4238 is displayed on a display 4240, and can be output to other systems (not shown).

On the transmit side, the transmit waveform generator 4236 may also include array motion compensation. The position and motion of each element is determined for use by the transmit beamformer 4232, so that the transmitted beam can be steered appropriately, while the array rotates.

Once the motion compensation is performed by block 4236, the digital filter/beamformer 4232, filter 4224, power amplifier 4218 and transmit/receive hardware 4204 can apply conventional processing to form a beam for transmission.

Figure 43:
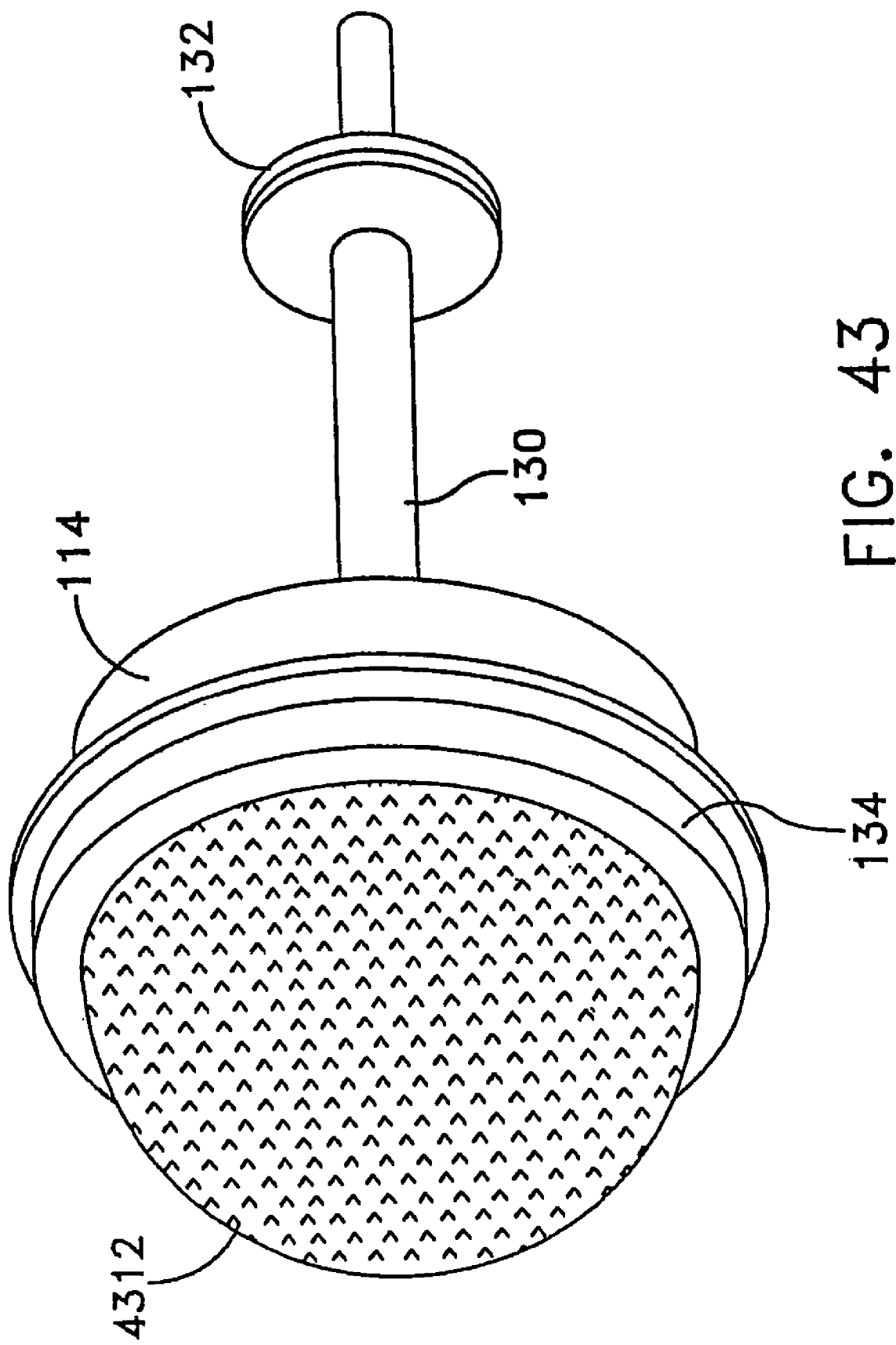
FIG. 43 shows a variation of a rolling array configuration that can increase the system scanning capabilities and the size of the virtual aperture for a given track radius by employing a three-dimensional array, for example.

FIG. 43 shows how the use of a three-dimensional array 4312 in conjunction with the rolling axle array provides more flexibility in the control of the size of the virtual aperture. Each radiating element is aligned in a respectively different direction. The various radiating elements have respectively different normals. For any given target a subset of the radiating elements can be found for which the target lies on or near the normal from that element.

The system takes advantage of the rotational and translational motion of the rolling axle array 112 to provide the ability to beamform and scan with reduced grating lobes The array has its elements more widely spaced than is typical, while still being able to scan over the same field of view as a densely populated array. This is accomplished by processing the extended spatial sampling achievable with an array in motion. This will reduce costs and maintenance of the arrays and associated electronics by reducing the number of array element channels that are required for any given performance requirement. By using a virtual aperture that is substantially larger than the diameter of the array 112, performance equivalent to a larger array is achieved.

Figure 52:
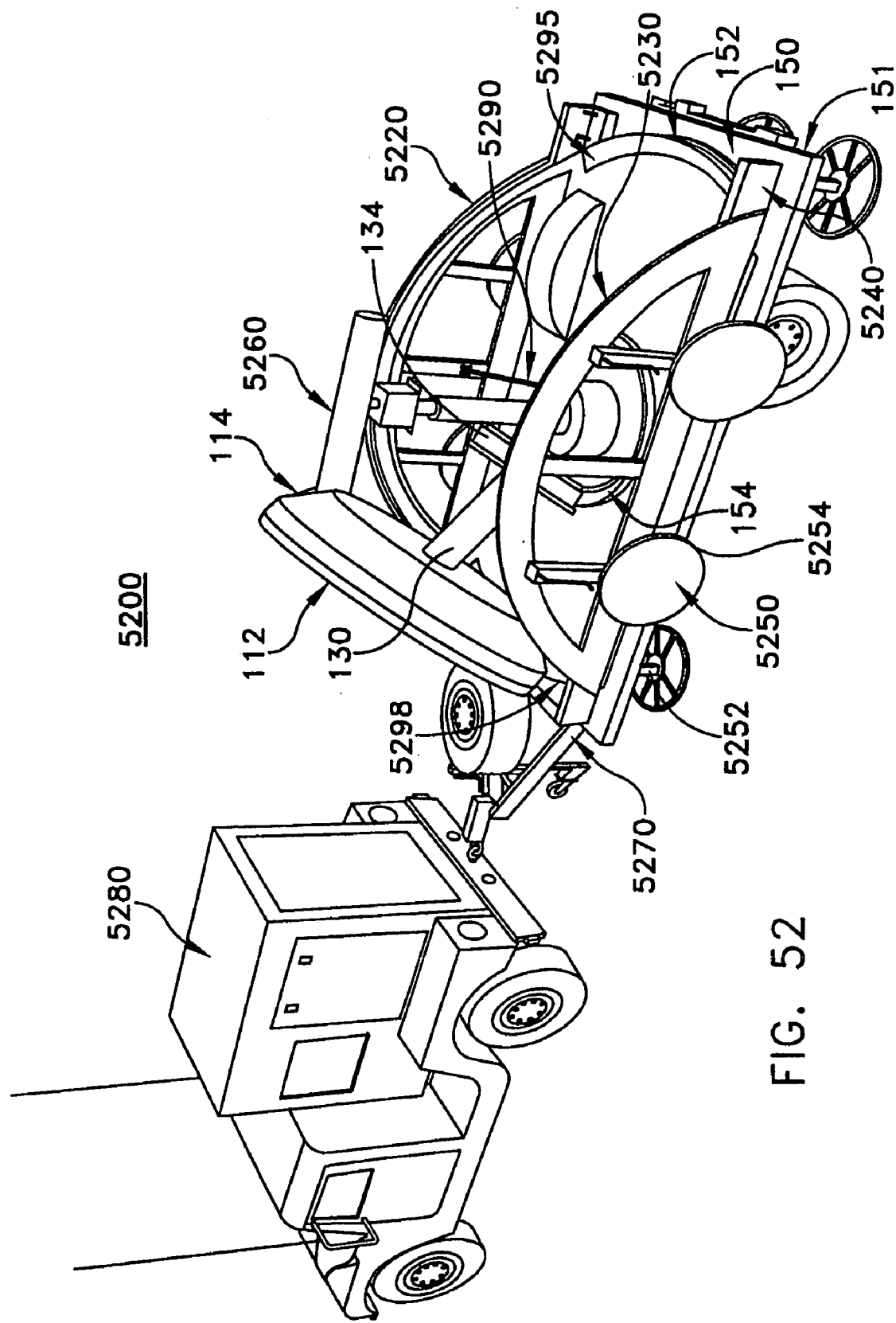
FIG. 52 illustrates a transportable rolling radar array system with segments of the track folded for transportation.
Figure 53:
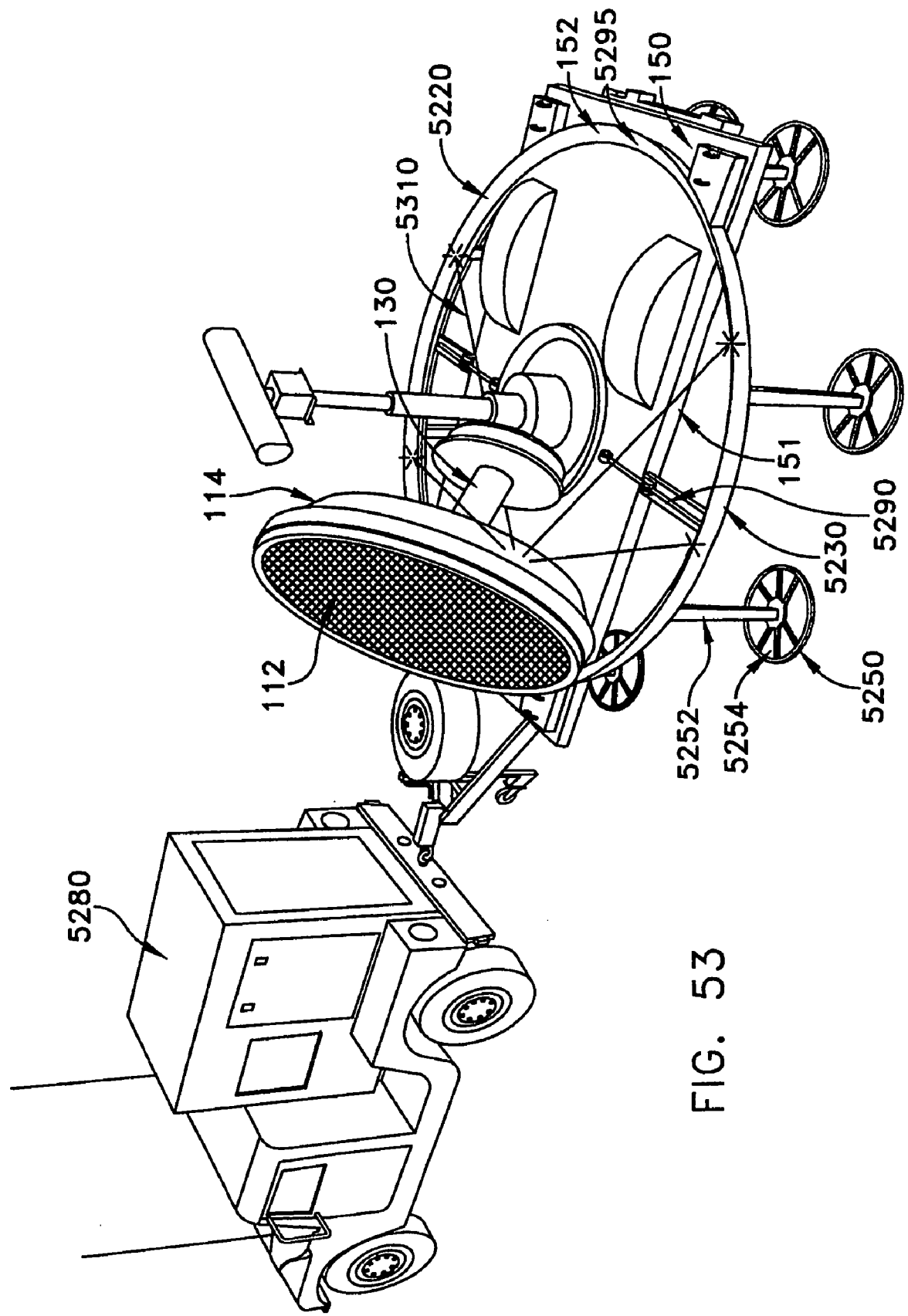
FIG. 53 illustrates a transportable rolling radar system, with segments of the track unfolded, in an operational configuration.

Now referring to FIG. 52, a transportable rolling radar system 5200, shown in a folded position for transportation, has a base 150 with a peripheral edge 151. A radar array wheel 114 is attached to an axle 130. As the radar array wheel 114 rolls on a circular track 152, it also rotates about the axle 130. A radar array 112 is mounted on the wheel 114 and it may also rotate about the axle 130. At least one segment of the circular track 152 can be folded and deployed and at least one other segment of the track 152 is rigidly mounted on the base 150. Illustrated as only an exemplary embodiment, the track 152 has two segments 5220 and 5230 which can be folded and deployed, while two segments 5295 and 5298 are rigidly mounted on the base 150. When in a deployed position, as illustrated in FIG. 53, the foldable segments 5220 and 5230 extend beyond the peripheral edge 151. The foldable segments 5220 and 5230 do not extend beyond the peripheral edge 151 when in a folded position, as illustrated in FIG. 52.

A second circular track 154, which is concentric with the first circular track 152, is mounted on the base 150. A second wheel 134 is also mounted on the axle 130 and revolves on the second track 154.

In an exemplary embodiment, the foldable segments 5220 and 5230 of the track are connected to the fixed segments 5295 and 5298 of the track 152 via hinges 5240. In an exemplary embodiment, adjustable supports 5250 are attached to the base 150 as well as to the foldable segments 5220 and 5230 of the track 152. At least one of the supports 5250 has a longitudinal member 5252 and a flat, load-bearing, and load-spreading member 5254 and preferably all of the supports 5250 have the longitudinal member 5252 and a flat, load-bearing and load-spreading member 5254. The supports 5250 provide support and level the foldable segments 5220 and 5230 when the mobile radar system 5200 is in an operational mode.

An independently rotating IFF antenna 5260 may be provided. The IFF antenna 5260 can operate at a stowed level as well as in an extended position, extending above the radar wheel.

A hitching mechanism 5270 may be provided on the base 150 for transporting the radar system 5200. As an example, a High Mobility Multipurpose Wheeled Vehicle 5280 is shown in FIG. 52 which can be used to transport the radar system 5200 to a desired location for deployment. In this merely illustrative embodiment, the system 5200 includes a pair of wheels 5210.

A hydraulic mechanism 5290, for example, may be used to fold and to deploy the foldable segments 5220 and 5230 of the track 152. Note that other means of operating the foldable segments 5220 and 5230, including but not limited to, a gear system, a rack and pinion system, and a servo-motor, are also contemplated.

Now referring to FIG. 53, the segments 5220 and 5230 are shown in deployed position when the mobile radar array system 5200 is in an operational mode. In an exemplary embodiment, the hydraulic mechanism 5290 is used to fold and unfold the segments 5220 and 5230. The adjustable supports 5210 provide support and level the segments 5220 and 5230 with the fixed segments of the track 152.

In an exemplary embodiment, a laser sighting system 5310 may be provided to ensure the foldable segments 5220 and 5230 are properly leveled and aligned with the fixed segments 5295 and 5298. It is to be understood that other well known means of verifying the proper positioning of the foldable segment may also be employed.

When the rolling radar system is to be transported to a desired location, preferably the foldable segment is folded. Various means of transportation may be employed to transport the system. As an example, a High Mobility Multipurpose Wheeled Vehicle (HMMWV) can be used to tow the radar system using a hitching mechanism attached to the base. Once the radar system is at the desired location, the folded segment is deployed so as to form a complete circular leveled track. A laser sighting system may be used to verify that the deployed segment is properly positioned in proper alignment with the fixed segment of the circular track. Supports may be used to support as well as to level the deployed segment. Supports may have adjustable heights to facilitate proper leveling on an uneven or non-horizontal terrain.

It will be apparent to those skilled in the art that modifications and variations may be made in the apparatus and process of the present invention without departing from the spirit or scope of the invention. It is intended that the present invention cover the modifications and variations of this invention provided they come within the scope of the appended claims and their equivalents.

What is claimed is:

1. A transportable platform for use in a rolling radar array system having an array mounted on a first side of a wheel, comprising:
 a base having a peripheral edge;
 a first circular track mounted on said base;
 a second circular track, concentric with said first circular track, having a first segment mounted on said base, and a second segment foldably mounted on said base for moving between a folded position and a deployed position, said second segment extending beyond said edge when in said deployed position.

2. The transportable platform of claim 1, wherein said second segment is hingedly mounted on said base.

3. The transportable platform of claim 1, further comprising a plurality of supports depending from said base and said second segment.

4. The transportable platform of claim 3, wherein at least one of said supports comprises:
 a longitudinal member; and
 a flat, load-bearing member attached to a first end of said longitudinal member.

5. The transportable platform of claim 4, wherein said longitudinal member has an adjustable height.

6. The transportable platform of claim 1, further comprising an IFF antenna mounted on said base.

7. The transportable platform of claim 1, wherein said platform further comprises means for folding and unfolding said foldable second segment of said second circular track.

8. The transportable platform of claim 7, wherein said means for folding and unfolding said foldable second segment of said second circular track is a hydraulic mechanism.

9. A radar antenna system, comprising:
 a radar array mounted on a first wheel, the first wheel having a circumferential portion shaped to engage a first circular track for revolving the radar array about the track, the first radar array having an axis normal to the first wheel, wherein the first wheel rotates about the axis as the radar array revolves around the track during operation; and
 a transportable platform comprising:
  a base having a peripheral edge;
  a second circular track mounted on said base;
  wherein said first circular track is concentric with said second circular track, and has a first segment mounted on said base, and a second segment foldably mounted on said base for moving between a folded position and a deployed position, said second segment extending beyond said edge when in said deployed position.

10. The radar system of claim 9, wherein said transportable platform further comprises a plurality of supports depending from said base and said foldable second segment.

11. The radar system of claim 10, wherein at least one of said supports comprises:
 a longitudinal member; and
 a flat, load-bearing member attached to a first end of said longitudinal member.

12. The radar system of claim 11, wherein said longitudinal member has an adjustable height.

13. The radar system of claim 9, further comprising an IFF antenna mounted on said base.

14. The radar system of claim 9, further comprising a sighting system for verifying the position of said foldable second segment, when said foldable second segment is deployed for operation.

15. The radar system of claim 14, wherein said sighting system is a laser sighting system.

16. A method for providing a transportable rolling radar system, said method comprising the steps of:
 providing a base having a peripheral edge;
 laying a first circular track on said base;
 laying a second circular track on said base, said second circular track being concentric with said first track, and having a first segment mounted on the base and having a second segment foldably mounted on said base for moving between a folded position and a deployed position, said second segment extending beyond said edge when in said deployed position; and
 mounting a radar array on a first wheel, the first wheel having a circumferential portion shaped to engage a first circular track for revolving the radar array about said second circular track, the first radar array having an axis normal to the first wheel, wherein the first wheel rotates about the axis as the radar array revolves around said circular track during operation.

17. The method of claim 16, said method further comprising the step of providing a mechanism for folding and unfolding said foldable second segment of second circular track.

18. The method of claim 17, wherein said mechanism is a hydraulic mechanism.

19. The method of claim 16, said method further comprising the step of providing a plurality of supports, said supports depending on said base and said foldable second segment.

20. The method of claim 19, wherein at least one of said supports comprises:
 a longitudinal member; and
 a flat, load-bearing member attached to a first end of said longitudinal member.

21. The method of claim 16, further comprising the step of providing a system for verifying location of said foldable second segment, when said foldable second segment is unfolded and said first wheel is rotating on said second circular track.

22. The method of claim 16, wherein said system for verifying position of said second segment of said track, when said segment is deployed, is a laser sighting system.

23. A method of using a transportable rolling radar system having an array mounted on a first side of a wheel, said method comprising the steps of:
 transporting a radar system to a desired location, said radar system comprising:
  a base having a peripheral edge;
  a first circular track mounted on said base;
  a second circular track, concentric with said first circular track, having a first segment mounted on said base, and a second segment foldably mounted on said base for moving between a folded position and a deployed position, said second segment extending beyond said edge when in said deployed position, while said second segment being in folded position during said step of transporting said radar system;
 moving said second segment to said deployed position; and
 operating said system such that said wheel rolls about said second circular track.

24. The method of claim 23 further comprising the step of using a plurality of supports to level said foldable segment and said base, at least one of said supports comprising:
 a longitudinal member; and
 a flat, load-bearing member attached to a first end of said longitudinal member.

25. The method of claim 23 further comprising the step of using a laser sighting system to verify a position of said second segment with respect to the position of said first segment.

* * * * *